US012672660B2

(12) United States Patent
Murphy et al.

(10) Patent No.: US 12,672,660 B2
(45) Date of Patent: Jul. 7, 2026

(54) EXTRACTION CELL

(71) Applicant: Starbucks Corporation, Seattle, WA (US)

(72) Inventors: Kieran Murphy, Seattle, WA (US); Elizabeth Guilherme, Seattle, WA (US); Jeffrey J. Chapman, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 280 days.

(21) Appl. No.: 18/303,840

(22) Filed: Apr. 20, 2023

(65) Prior Publication Data

US 2023/0345961 A1 Nov. 2, 2023

Related U.S. Application Data

(60) Provisional application No. 63/363,673, filed on Apr. 27, 2022.

(51) Int. Cl.
A23F 5/26 (2006.01)
(52) U.S. Cl.
CPC ..................................... A23F 5/26 (2013.01)
(58) Field of Classification Search
CPC .... A23F 5/26; A23F 5/267; A23F 3/18; A23F 5/262; A23F 3/40; A23F 5/243;
(Continued)

(56) References Cited

U.S. PATENT DOCUMENTS

| | | | |
|---|---|---|---|
| 2,236,059 A | 3/1941 | Heuser | |
| 2,888,349 A | 5/1959 | Morrow et al. | |

(Continued)

FOREIGN PATENT DOCUMENTS

| | | |
|---|---|---|
| CN | 1384712 | 12/2002 |
| CN | 1927009 A | 3/2007 |

(Continued)

OTHER PUBLICATIONS

Investigations Blog, The density of ground vs. unground coffee, 2010, p. 1-4. Web: https://investigationsblog.wordpress.com/2010/02/23/the-density-of-ground-vs-unground-coffee/ (Year: 2010).*

(Continued)

*Primary Examiner* — Erik Kashnikow
*Assistant Examiner* — Luis Eugenio Diou Berdecia
(74) *Attorney, Agent, or Firm* — Knobbe, Martens, Olson & Bear, LLP

(57) ABSTRACT

A method of preparing a white coffee extract can include loading extraction material into an extraction cell having a first portion and a second portion. The extraction material can include ground coffee with a density between 0.2 g/ml-0.4 g/ml and a mean particle diameter between 700 μm to 900 μm. The method can further include introducing a flow of extraction medium through the first portion of the extraction cell. The method can include, within less than 60 seconds of introducing a portion of the flow of extraction medium into the extraction cell, withdrawing from a filter at the second portion of the extraction cell, the white coffee extract that has been extracted from the extraction material by the portion of the flow of extraction medium introduced into the extraction cell. The extraction material can include ground white coffee.

19 Claims, 13 Drawing Sheets

(58) Field of Classification Search
CPC .......... A23F 5/265; A23F 5/483; A23F 3/163;
A23F 5/24; A23F 3/16; A23F 3/423;
A47J 31/0615; A47J 31/0663; A47J
31/3671; A47J 31/0605; A47J 31/002;
A47J 31/407; A47J 31/401; A47J 31/402;
A23V 2250/2108
USPC .................. 426/594, 115, 80, 597, 655, 425,
426/431–435, 524; 99/279, 280, 283,
99/299, 300, 302 R, 303, 323, 323.1;
222/55–57, 59, 71, 129, 146.1, 146.2,
222/146.4, 146.5, 146.6, 190, 319, 394,
222/395; 141/9, 11, 18, 21, 22, 70, 82,
141/102, 105, 106, 113, 115, 126;
165/104.33, 132, 80.4; 62/3.64, 457.4,
62/64, 63, 3.6, 3.2
See application file for complete search history.

(56) References Cited

U.S. PATENT DOCUMENTS

| | | |
|---|---|---|
| 3,224,880 A | 12/1965 | Ike |
| 3,607,280 A | 9/1971 | Durchholz et al. |
| 3,620,758 A | 11/1971 | Friedman |
| 3,661,774 A | 5/1972 | Masologites |
| 3,700,466 A | 10/1972 | Bergeron et al. |
| 3,830,940 A | 8/1974 | Sivetz |
| 3,928,636 A | 12/1975 | Katz |
| 4,088,794 A | 5/1978 | Katz et al. |
| 4,254,694 A | 3/1981 | Illy |
| 4,397,100 A | 8/1983 | Dickey et al. |
| 4,544,567 A | 10/1985 | Gottesman |
| 5,302,407 A | 4/1994 | Vetterli |
| 5,637,343 A | 6/1997 | Ryan, Jr. |
| 6,062,127 A | 5/2000 | Klosinski et al. |
| 6,548,094 B2 | 4/2003 | Kalenian |
| 6,962,725 B2 | 11/2005 | McFadden, Sr. et al. |
| 7,419,692 B1 | 9/2008 | Kalenian |
| 7,544,378 B2 | 6/2009 | Yamada |
| 7,849,784 B2 | 12/2010 | Adler |
| 8,515,574 B2 | 8/2013 | Studor et al. |
| 8,770,092 B2 | 7/2014 | Ruckstuhl |
| 8,940,175 B2 | 1/2015 | Khamizov et al. |
| 8,997,633 B2 | 4/2015 | Bishop et al. |
| 9,179,798 B2 | 11/2015 | Albanese |
| 9,345,359 B2 | 5/2016 | Carmichael |
| 9,364,115 B2 | 6/2016 | Remo et al. |
| 9,375,112 B2 | 6/2016 | Norton et al. |
| 9,480,359 B1 | 11/2016 | Kalenian |
| 9,877,608 B2 | 1/2018 | Doglioni Majer et al. |
| 10,034,486 B2 | 7/2018 | Smits et al. |
| 10,104,900 B2 | 10/2018 | Paul |
| 10,130,898 B2 | 11/2018 | Corey |
| 10,226,058 B2 | 3/2019 | Ingold |
| 10,278,533 B2 | 5/2019 | Angell et al. |
| 10,306,904 B1 | 6/2019 | De Aldecoa Bueno |
| 10,463,054 B2 | 11/2019 | DeVane |
| 10,646,066 B2 | 5/2020 | Kim et al. |
| 10,757,955 B2 | 9/2020 | Yang et al. |
| 10,863,754 B2 | 12/2020 | Ragnarsson |
| 11,154,157 B2 | 10/2021 | Murphy et al. |
| 11,154,457 B2 | 10/2021 | Sanders et al. |
| 12,004,530 B2 | 6/2024 | Murphy et al. |
| 12,035,728 B2 | 7/2024 | Murphy et al. |
| 12,048,310 B2 | 7/2024 | Murphy et al. |
| 2004/0018273 A1 | 1/2004 | David et al. |
| 2004/0177765 A1 | 9/2004 | Halliday |
| 2005/0095341 A1 | 5/2005 | Sher et al. |
| 2005/0178793 A1 | 8/2005 | Cheng et al. |
| 2006/0257547 A1* | 11/2006 | Honda ...................... A23F 3/18 |
| | | 426/655 |
| 2008/0280023 A1 | 11/2008 | Kalenian |
| 2010/0272857 A1 | 10/2010 | Nagao et al. |
| 2012/0021108 A1 | 1/2012 | Baumann et al. |

| | | |
|---|---|---|
| 2012/0070543 A1 | 3/2012 | Mahlich |
| 2013/0180407 A1 | 7/2013 | Colleoni |
| 2014/0109771 A1 | 4/2014 | Nakao et al. |
| 2014/0255563 A1 | 9/2014 | Rondelli |
| 2015/0282664 A1 | 10/2015 | Savage et al. |
| 2016/0037961 A1 | 2/2016 | Digiuni |
| 2016/0270421 A1 | 9/2016 | Gamble |
| 2016/0270586 A1 | 9/2016 | Corey |
| 2016/0270587 A1 | 9/2016 | Yu et al. |
| 2016/0271531 A1 | 9/2016 | Nazzer |
| 2016/0338375 A1 | 11/2016 | DeVane |
| 2016/0353761 A1 | 12/2016 | Paul |
| 2017/0303731 A1* | 10/2017 | Tan ........................... A23F 5/26 |
| 2017/0311619 A1* | 11/2017 | Wei ........................... A23F 3/34 |
| 2017/0347827 A1 | 12/2017 | Almblad |
| 2018/0007926 A1 | 1/2018 | Arroyo et al. |
| 2018/0098658 A1* | 4/2018 | Angell .................... A47J 31/44 |
| 2018/0213824 A1 | 8/2018 | Schacht et al. |
| 2018/0368612 A1 | 12/2018 | Stein |
| 2019/0053657 A1* | 2/2019 | Murphy .................. A23F 5/243 |
| 2019/0191913 A1 | 6/2019 | Richardson |
| 2019/0290048 A1 | 9/2019 | Albanese |
| 2020/0015622 A1 | 1/2020 | Truninger et al. |
| 2020/0121115 A1* | 4/2020 | Oh ........................ A47J 31/407 |
| 2020/0154727 A1* | 5/2020 | Celli ......................... A23F 5/10 |
| 2020/0154930 A1 | 5/2020 | Rivera |
| 2020/0170442 A1 | 6/2020 | Rivera |
| 2020/0268196 A1 | 8/2020 | Granzeier |
| 2022/0007880 A1 | 1/2022 | Murphy et al. |
| 2022/0053966 A1 | 2/2022 | Murphy et al. |
| 2022/0125068 A1 | 4/2022 | Murphy et al. |
| 2022/0408963 A1 | 12/2022 | Murphy et al. |
| 2024/0130391 A1 | 4/2024 | Murphy et al. |
| 2024/0284929 A1 | 8/2024 | Murphy et al. |
| 2025/0072444 A1 | 3/2025 | Murphy et al. |
| 2025/0081981 A1 | 3/2025 | Murphy et al. |

FOREIGN PATENT DOCUMENTS

| | | |
|---|---|---|
| EP | 0844195 B1 | 5/1998 |
| EP | 2036466 A1 | 3/2009 |
| EP | 2190330 B1 | 1/2011 |
| EP | 2241228 B1 | 11/2011 |
| EP | 3437526 B1 | 5/2020 |
| EP | 3808185 A1 | 4/2021 |
| FR | 2653641 A1 | 5/1991 |
| GB | 2066096 A | 7/1981 |
| JP | 2003-529336 | 10/2003 |
| JP | 2010-214250 A | 9/2010 |
| JP | 2012-514482 | 6/2012 |
| KR | 10-2002-0052194 A | 7/2002 |
| KR | 10-1659321 B1 | 9/2016 |
| WO | WO 2016/164796 A1 | 10/2016 |
| WO | WO 2016/207846 A1 | 12/2016 |
| WO | WO 2019/036486 A1 | 2/2019 |
| WO | WO 2019/166785 A1 | 9/2019 |
| WO | WO 2019/245632 A1 | 12/2019 |
| WO | WO 2020/125644 A1 | 6/2020 |
| WO | WO 2022/093627 A1 | 5/2022 |
| WO | WO 2023/211748 A1 | 11/2023 |

OTHER PUBLICATIONS

Foodbeast_Starbucks Has Developed a Completely Brand New Way to Brew Coffee_2017, p. 1-4. Web: https://www.foodbeast. com/news/starbucks-cold-pressed-espresso/ (Year: 2017).*
Coffee Brewing Methods. Cold Brew Coffee, dated 2017, https:// coffee-brewing- methods.com/entity/cold-brew/, for purposes of examination consider printed from the internet on Jun. 21, 2017.
"Caveman Recipes Tait Fletcher shows you how to make Cold Brew from the Caveman Cold Brew Concentrate." (5 pages), for purposes of examination consider printed from the internet on Jun. 20, 2017.
Amazon, "Coffee Maker STARESSO Manual Coffee Machine with Espresso Cappuccino Quick Cold Brew All in One"; for purposes of examination consider retrieved from the internet on Sep. 8, 2020.
Starbucks Stories & News, "Starbucks Unveils New Cold-Pressed Espresso"; https://stories.starbucks.com/press/2017/starbucks-unveils-

(56) References Cited

OTHER PUBLICATIONS new-cold-pressed-espresso/, dated Sep. 12, 2017; for purposes of examination consider retrieved from the internet on Nov. 18, 2021.

Amy Hansen, "Everything You Need to Know About the New Starbucks Cold-Pressed Espresso"; https://thefreshtoast.com/drink/everything-you-need-to-know-about-the-new-starbucks-cold-pressed-espresso/, dated Sep. 18, 2017; for purposes of examination consider retrieved from the internet on Dec. 30, 2021.

"Kompresso", Cafflano; https://web.archive.org/web/20210827200623/https://www.cafflano.com/product/kompresso/10/?cate_no=59&display_group=1, dated as being available on Aug. 27, 2021 by Internet Archive Way Back Machine.

Brian Bennett, "FirstBuild Prisma coffee maker makes cold brew in ten minutes"; CNet; https://web.archive.org/web/20180829003338/https://www.cnet.com/reviews/firstbuild-prisma-cold-brew-coffee-maker-preview/, dated as being available on Aug. 29, 2018 by Internet Archive Way Back Machine.

"Cold-brew "espresso"—Tips and Techniques"; Home-Barista.com; https://www.home-barista.com/tips/cold-brew-espresso-t49613.html, dated Nov. 26, 2017 through Nov. 28, 2017; for purposes of examination consider retrieved from the internet on Nov. 18, 2021.

"Prisma Cold Brew Coffee", Indiegogo; https://web.archive.org/web/20200813210222/https://www.indiegogo.com/projects/prisma-cold-brew-coffee#/, dated as being available on Aug. 13, 2020 by Internet Archive Way Back Machine.

Christine Seah, How to Make Cold Brew Coffee in 60 Seconds (No Nitrous Involved); Perfect DailyGrind; https://web.archive.org/web/20150729062756/http://www.perfectdailygrind.com/, dated as being available on Jul. 29, 2015 by Internet Archive Way Back Machine.

"Cafflano Kompresso Review: Make Great Coffee Anywhere"; Roasty Coffee; https://web.archive.org/web/20200922045730/https://www.roastycoffee.com/cafflano-kompresso-review/, dated as being available on Sep. 22, 2020 by Internet Archive Way Back Machine.

Staresso, "User Manual SP-200"; for purposes of examination consider retrieved from the internet on Sep. 4, 2020.

Symon, "Prisma Cold Brew Coffee Maker," for purposes of examination consider retrieved from the internet on Sep. 8, 2020.

Coffee Addict, "Staresso Espresso Coffee Maker"; True Coffee Addict; https://web.archive.org/web/20190222014545/https://truecoffeeaddict.com/staresso-portable-coffee-maker/, dated as being available on Feb. 22, 2019 by Internet Archive Way Back Machine.

Daniel Kennedy, "FAQ about the Nanopresso!"; Wacaco; https://www.wacaco.com/blogs/news/faq-about-the-nanopressso, dated Sep. 1, 2018; for purposes of examination consider retrieved from the internet on Dec. 31, 2021.

Daniel Kennedy, "Nanopresso Hacks"; Wacaco; https://web.archive.org/web/20200810153702/https://www.wacaco.com/blogs/news/nanopresso-hacks, dated as being available on Aug. 10, 2020 by Internet Archive Way Back Machine.

"Nanopresso"; Wacaco; https://web.archive.org/web/20200630175213/https://www.wacaco.com/pages/nanopresso, dated as being available on Jun. 30, 2020 by Internet Archive Way Back Machine.

Scott Gilbertson, "The Best Portable Espresso Makers"; Wired; https://web.archive.org/web/20190902210836/https://www.wired.com/story/best-portable-espresso-makers/, dated as being available on Sep. 2, 2019 by Internet Archive Way Back Machine.

"Pressurised Cold Brewing" http://www.jimseven.com/2010/08/20/pressurised-cold-brewing/, for purposes of examination, dated Aug. 20, 2010, for purposes for examination consider retrieved from the internet on Jun. 21, 2017.

Anonymous, "Moka pot—Wikipedia"; dated Jul. 5, 2017, XP055883834, URL: https://web.archive.org/web/20170705110305/https://en.wikipedia.org/wiki/Moka_pot, for purposes of examination consider retrieved from the internet on Jan. 26, 2022.

Kurtheckman, "Coffee Grounds Density"; dated Oct. 19, 2016, XP055883731, https://www.vcalc.com/wiki/Kurtheckman/Coffee+Grounds+Density, for purposes of examination consider retrieved from the internet on Jan. 25, 2022.

Charrondiere et al., "FOA/INFOODS Database"; Density Database Version 2.0, (2012).

Koch et al., "Closed pod containing a powdery substance", PTO Translation (May 27, 1998).

International Search Report and Written Opinion in PCT application No. PCT/US2018/046738, mailed on Oct. 9, 2018, in 11 pages.

International Preliminary Report on Patentability and Written Opinion in PCT application No. PCT/US2018/046738, dated Feb. 18, 2020, in 17 pages.

International Search Report and Written Opinion issued for International Application No. PCT/US2021/056072, mailed Feb. 7, 2022 in 16 pages.

International Preliminary Report on Patentability and Written Opinion issued for International Application No. PCT/US2021/056072, dated May 2, 2023, in 19 pages.

International Search Report and Written Opinion in application No. PCT/US2023/019204, mailed on Jun. 29, 2023, in 11 pages.

International Preliminary Report on Patentability and Written Opinion in application No. PCT/US2023/019204, dated Oct. 29, 2024, in 8 pages.

Zhu et al., "Chemical Reaction Engineering Analysis", Higher Education Press, Dec. 2002, 1st Edition, p. 83.

* cited by examiner

EXTRACTION CELL

CROSS-REFERENCE TO RELATED APPLICATION(S)

This application claims the benefit of U.S. Provisional Application No. 63/363,673, filed Apr. 27, 2022, which is hereby incorporated by reference in its entirety.

BACKGROUND

Field

The present disclosure relates to systems and methods for preparing edible extracts, such as systems and methods for preparing edible extracts from a cold or ambient solvent under pressure. In certain embodiments, the disclosure relates to systems and apparatus for preparing a cold pressed espresso. In certain embodiments, the disclosure relates to systems and apparatus for preparing a cold pressed espresso with white coffee.

Description of the Certain Related Art

Certain brewed beverages are prepared by extracting seeds, leaves, berries, or other plant matter containing desirable flavors, aromas, or compounds in a suitable solvent. However, the process of extracting the desirable components from the plant matter can be time consuming, and the strength of the final extract is closely related to the proportion of total dissolved solids (TDS) extracted by the solvent. Accordingly, high temperatures are often employed to increase the rate of extraction, and reduce the time required to obtain a high TDS. For example, espressos are commonly prepared by extracting roasted, ground coffee or espresso beans in near-boiling water at high pressure. Other techniques require multiple rounds of extraction to increase the yield of the extraction process. However, high temperatures and repeated extractions can sometimes result in undesirable compounds being extracted from the plant material, such as acids and tannins, which can negatively affect the final beverage quality. Conversely, extractions performed at low temperatures often lack the strength of their high-temperature counterparts, exhibiting a lower TDS content. Such extracts may be perceived as "weak," or lacking in flavor, and fail to replicate the intense characteristics of extracts achieved at high temperatures.

SUMMARY

The systems, methods and devices of this disclosure each have several innovative aspects, no single one of which is solely responsible for the desirable attributes disclosed herein.

In one aspect, a method of preparing an extract includes loading extraction material into an extraction cell having a first portion and a second portion with ground coffee at a density of between 0.2 g/ml-0.4 g/ml and the ground coffee having a mean particle diameter between 200 µm to 400 µm. The method can further include introducing a flow of extraction medium through the first portion of the extraction cell, within less than 75 seconds of introducing a portion of the flow of extraction medium into the extraction cell, withdrawing from a filter at the second portion of the extraction cell, extract that has been extracted from the extraction material by the portion of the flow of extraction medium introduced into the extraction cell.

In some configurations, the yield of the extract is between 16% and 18%. In some configurations, the yield of the extract is between 15% and 20%. The extract can have a concentration between 6.5 and 8.5 Brix. The extract can have a concentration between 6.5 and 10 Brix. The extraction medium can be not heated before it is introduced into the extraction cell. The extraction medium can be water having a temperature between 15° C. and 30° C. The extraction medium can be water having a temperature between 10° C. and 30° C. The extract that has been extracted from the extraction material by the portion of the flow of extraction medium introduced into the extraction cell can be retrieved between 15 and 75 seconds after introduction of the portion of the flow of extraction medium is introduced into the extraction cell. The extract that has been extracted from the extraction material by the portion of the flow of extraction medium introduced into the extraction cell can be retrieved between 15 and 60 seconds after introduction of the portion of the flow of extraction medium is introduced into the extraction cell. The extract can be retrieved through the filter at the second portion of the extraction cell within 75 seconds of introduction of the flow of extraction medium through the first portion of the extraction cell. The extract can be retrieved through the filter at the second portion of the extraction cell within 60 seconds of introduction of the flow of extraction medium through the first portion of the extraction cell. Introducing extraction medium through the first portion of the extraction can include introducing the extraction medium at a flow rate that achieves plug flow. In some configurations, the extraction material has not been subjected to prior extractions. An internal chamber of the extraction cell can have a length and an average width along the length and where the ratio of the length to average diameter is between 0.75:1 and 2:1. Loading extraction material into the extraction cell can include loading between 6 to 8 grams of ground coffee into the extraction cell. Loading extraction material into the extraction cell can include loading between 6 to 9 grams of ground coffee into the extraction cell. Loading extraction material into the extraction cell can include providing a density of between 0.2 g/ml to 0.4 g/ml of ground coffee into the extraction cell. Introducing a flow of extraction medium through the first portion of the extraction can include introducing the extraction medium at a flow rate of between 20 ml/min to 40 ml/min. The first portion can be a bottom portion of the device and the second portion can be a top portion of the device. The extraction medium can flow upwardly through the extraction cell from the first portion to the second portion. The filter at the second portion can have a mean aperture diameter of 20 µm to 90 µm. The extraction cell can include 6 to 8 grams of ground coffee. The extraction cell can include 6 to 9 grams of ground coffee. The extraction cell can include between 0.2 g/ml-0.4 g/ml of ground coffee. The extraction cell can include coffee beans ground with a mean particle diameter of 200 µm to 400 µm, 250 µm to 500 µm, or 270 µm to 370 µm.

In one aspect, a method of preparing an extract includes providing an extraction cell having a first portion and a second portion, the extraction cell filled with ground coffee at a density of between 0.2 g/ml-0.4 g/ml and the ground coffee having a mean particle diameter between 200 µm to 400 µm. The method can further include introducing a flow of extraction medium through the first portion of the extraction cell, within less than 75 seconds of introducing a portion of the flow of extraction medium into the extraction cell, withdrawing from a filter at the second portion of the extraction cell, extract that has been extracted from the extraction material by the portion of the flow of extraction medium introduced into the extraction cell.

In some configurations, the method can further include loading the extraction material into the extraction cell. In some aspects, the yield of the extract is between 16% and 18%. In some configurations, the yield of the extract is between 15% and 20%. The extract can have a concentration between 6.5 and 8.5 Brix. The extract can have a concentration between 6.5 and 10 Brix. The extraction medium can be not heated before it is introduced into the extraction cell. The extraction medium can be water having a temperature between 15° C. and 30° C. The extraction medium can be water having a temperature between 10° C. and 30° C. The extract that has been extracted from the extraction material by the portion of the flow of extraction medium introduced into the extraction cell can be retrieved between 15 and 75 seconds after introduction of the portion of the flow of extraction medium is introduced into the extraction cell. The extract that has been extracted from the extraction material by the portion of the flow of extraction medium introduced into the extraction cell can be retrieved between 15 and 60 seconds after introduction of the portion of the flow of extraction medium is introduced into the extraction cell. The extract can be retrieved through the filter at the second portion of the extraction cell within 75 seconds of introduction of the flow of extraction medium through the first portion of the extraction cell. The extract can be retrieved through the filter at the second portion of the extraction cell within 60 seconds of introduction of the flow of extraction medium through the first portion of the extraction cell. Introducing extraction medium through the first portion of the extraction can include introducing the extraction medium at a flow rate that achieves plug flow. In some configurations, the extraction material has not been subjected to prior extractions. An internal chamber of the extraction cell can have a length and an average width along the length and where the ratio of the length to average diameter is between 0.75:1 and 2:1. Loading extraction material into the extraction cell can include loading between 6 to 8 grams of ground coffee into the extraction cell. The extraction cell can include 6 to 8 grams of ground coffee. Loading extraction material into the extraction cell can include loading between 6 to 9 grams of ground coffee into the extraction cell. The extraction cell can include 6 to 9 grams of ground coffee. Loading extraction material into the extraction cell can include providing a density of between 0.2 g/ml to 0.4 g/ml of ground coffee into the extraction cell. The extraction cell can include a density of between 0.2 g/ml to 0.4 g/ml of ground coffee. Introducing a flow of extraction medium through the first portion of the extraction can include introducing the extraction medium at a flow rate of between 20 ml/min to 40 ml/min. The first portion can be a bottom portion of the device and the second portion can be a top portion of the device. The extraction medium can flow upwardly through the extraction cell from the first portion to the second portion. The filter at the second portion can have a mean aperture diameter of 20 μm to 90 μm. The extraction cell can include 6 to 8 grams of ground coffee. The extraction cell can include 6 to 9 grams of ground coffee. The extraction cell can include between 0.2 g/ml-0.4 g/ml of ground coffee. The extraction cell can include coffee beans ground to a mean particle diameter of 200 μm to 400 μm, 250 μm to 500 μm, or 270 μm to 370 μm.

In another aspect, a method of preparing an extract can include loading extraction material into an extraction cell and introducing a flow of extraction medium at a temperature between 15° C. and 30° into the extraction cell. The method can further include, within less than 75 seconds of introducing the flow of extraction medium into the extraction cell, withdrawing from the extraction cell, extract that has been extracted from the extraction material by the extraction medium. The extract can have a concentration of the extraction material between 6.5 and 8.5 Brix and a yield of the extract can be between 16% and 18%. The extract can have a concentration of the extraction material between 6.5 and 10 Brix. The yield of the extract can be between 15% and 20%. In some configurations, withdrawing from the extraction cell can include withdrawing the extract through a filter.

In another aspect, a method of preparing an extract can include providing an extraction cell with an extraction material positioned therein, and introducing a flow of extraction medium at a temperature between 15° C. and 30° into the extraction cell. The method can further include, within less than 75 seconds of introducing the flow of extraction medium into the extraction cell, withdrawing from the extraction cell, extract that has been extracted from the extraction material by the extraction medium. The extract can have a concentration of the extraction material between 6.5 and 8.5 Brix and a yield of the extract can be between 16% and 18%. The extract can have a concentration of the extraction material between 6.5 and 10 Brix. The yield of the extract can be between 15% and 20%. In some configurations, withdrawing from the extraction cell can include withdrawing the extract through a filter. The method can further include loading the extraction material into the extraction cell.

In yet another aspect, an extraction cell for preparing an extract can include a bottom portion, a top portion having a cross-sectional width and a cross-sectional area, a side wall extending between the bottom portion and bottom portion, the side wall having a length, an inlet on the bottom portion for introducing an extraction medium, an outlet disposed on the top portion for removing an extract from the extraction cell, and a filter positioned at the outlet, the filter having an area that is 10% to 20% of the cross-sectional area of the top portion of the extraction cell. The aspect ratio of the length to the cross-sectional width can be between 0.75:1 to 2:1.

In some configurations, the aspect ratio of the length to the cross-sectional width is 1:1. The filter can have a mean aperture diameter of 20 μm to 90 μm. The extraction cell can include 6 to 8 grams of ground coffee. The extraction cell can include 6 to 9 grams of ground coffee. The extraction cell can include between 0.2 g/ml-0.4 g/ml of ground coffee. The extraction cell can include coffee beans ground to a mean particle diameter of 200 μm to 400 μm, 250 μm to 500 μm, or 270 μm to 370 μm.

In one aspect, a method of preparing an extract can include loading extraction material into an extraction cell having a first portion and a second portion with ground coffee and introducing a flow of extraction medium through the first portion of the extraction cell. The method can further include, within less than 30 minutes of introducing a portion of the flow of extraction medium into the extraction cell, withdrawing from a filter at the second portion of the extraction cell, extract that has been extracted from the extraction material by the portion of the flow of extraction medium introduced into the extraction cell.

In some configurations, a yield of the extract is between 17% and 21%. The extraction medium can be water having a temperature between 18° C. and 24° C. The extraction medium can be water having a temperature between 10° C. and 30° C. The extract that has been extracted from the extraction material by the portion of the flow of extraction medium introduced into the extraction cell can be retrieved between 16 minutes and 20 minutes after introduction of the portion of the flow of extraction medium is introduced into the extraction cell.

The extract that has been extracted from the extraction material by the portion of the flow of extraction medium can be introduced into the extraction cell is retrieved between 20 minutes and 27 minutes after introduction of the portion of the flow of extraction medium is introduced into the extraction cell. The extract can be retrieved through the filter at the second portion of the extraction cell within 20 minutes of introduction of the flow of extraction medium through the first portion of the extraction cell. The extract can be retrieved through the filter at the second portion of the extraction cell within 15 minutes of introduction of the flow of extraction medium through the first portion of the extraction cell.

In another aspect, the extraction medium can flow continuously through the extraction cell. The extraction medium can flow substantially continuously through the extraction cell. A constant or substantially constant flow rate of extraction medium into the extraction cell can be maintained during an extraction process. A constant or substantially constant flow velocity can be maintained across the radial axis of the chamber during an extraction process.

In one aspect, a method of preparing an extract can include providing an extraction cell having a first portion and a second portion, the extraction cell having ground coffee positioned therein. The method can include introducing a flow of extraction medium through the first portion of the extraction cell. The method can further include, within less than 30 minutes of introducing a portion of the flow of extraction medium into the extraction cell, withdrawing from a filter at the second portion of the extraction cell, extract that has been extracted from the extraction material by the portion of the flow of extraction medium introduced into the extraction cell.

In some configurations, the method can further include loading the extraction material into the extraction cell. a yield of the extract is between 17% and 21%. The extraction medium can be water having a temperature between 18° C. and 24° C. The extraction medium can be water having a temperature between 10° C. and 30° C. The extract that has been extracted from the extraction material by the portion of the flow of extraction medium introduced into the extraction cell can be retrieved between 16 minutes and 20 minutes after introduction of the portion of the flow of extraction medium is introduced into the extraction cell.

The extract that has been extracted from the extraction material by the portion of the flow of extraction medium can be introduced into the extraction cell is retrieved between 20 minutes and 27 minutes after introduction of the portion of the flow of extraction medium is introduced into the extraction cell. The extract can be retrieved through the filter at the second portion of the extraction cell within 20 minutes of introduction of the flow of extraction medium through the first portion of the extraction cell. The extract can be retrieved through the filter at the second portion of the extraction cell within 15 minutes of introduction of the flow of extraction medium through the first portion of the extraction cell.

In another aspect, the extraction medium can flow continuously through the extraction cell. The extraction medium can flow substantially continuously through the extraction cell. A constant or substantially constant flow rate of extraction medium into the extraction cell can be maintained during an extraction process. A constant or substantially constant flow velocity can be maintained across the radial axis of the chamber during an extraction process.

In one aspect, a method of preparing an extract includes loading extraction material into an extraction cell having a first portion and a second portion with ground coffee at a density of between 0.2 g/ml-0.4 g/ml and the ground coffee having a mean particle diameter between 200 µm to 400 µm. The method can further include introducing a flow of extraction medium through the first portion of the extraction cell at a first flow rate and withdrawing from a filter at the second portion of the extraction cell, extract that has been extracted from the extraction material by the flow of extraction medium introduced into the extraction cell. The flow of extraction medium can substantially continuously flows upwardly through the extraction cell from the first portion to the second portion, such that a flow rate of the flow of extraction medium does not change more than 50% from the first flow rate. The flow of extraction medium can substantially continuously flows upwardly through the extraction cell from the first portion to the second portion, such that a flow rate of the flow of extraction medium does not change more than 80% from the first flow rate.

In some aspects, the yield of the extract is between 17% and 19%. The extract can have a concentration between 6.5 and 12 Brix. The extraction medium can be not heated before it is introduced into the extraction cell. The extraction medium can be water having a temperature between 15° C. and 30° C. The extraction medium can be water having a temperature between 10° C. and 30° C. The method can further include wherein introducing extraction medium through the first portion of the extraction includes introducing the extraction medium at a flow rate that achieves plug flow. The extraction material can not be subjected to prior extractions. An internal chamber of the extraction cell can have a length and an average width along the length and where the ratio of the length to average diameter can be between 0.75:1 and 2:1. The filter at the second portion can have a mean aperture diameter of 20 µm to 90 µm. A density of the extraction material in the extraction cell can be between 0.2 g/ml-0.4 g/ml of ground coffee. The extraction material can have coffee beans ground to a mean particle diameter of 200 µm to 400 µm, 250 µm to 500 µm, or 270 µm to 370 µm. A constant or substantially constant flow rate of extraction medium into the extraction cell can be maintained during an extraction process. A constant or substantially constant flow velocity can be maintained across the radial axis of the chamber during an extraction process. The extract can be extracted less than 75 seconds of introducing the flow of extraction medium through the first portion of the extraction cell. The extract can be extracted less than 30 minutes of introducing the flow of extraction medium through the first portion of the extraction cell. In some examples, the flow rate of the flow of extraction medium does not change more than 70% from the first flow rate. In some examples, the flow rate of the flow of extraction medium does not change more than 50% from the first flow rate.

In one aspect, a method of preparing an extract includes providing an extraction cell having a first portion and a second portion, the extraction cell can be filled with ground coffee at a density of between 0.2 g/ml-0.4 g/ml and the ground coffee having a mean particle diameter between 200 µm to 400 µm. The method can further include introducing a flow of extraction medium through the first portion of the extraction cell at a first flow rate and withdrawing from a filter at the second portion of the extraction cell, extract that has been extracted from the extraction material by the flow of extraction medium introduced into the extraction cell. The flow of extraction medium can substantially continuously flows upwardly through the extraction cell from the first portion to the second portion, such that a flow rate of the flow of extraction medium does not change more than 50% from the first flow rate. The flow of extraction medium can substantially continuously flows upwardly through the extraction cell from the first portion to the second portion, such that a flow rate of the flow of extraction medium does not change more than 80% from the first flow rate.

In some aspects, the method can further include loading the extraction material into the extraction cell. In some examples, the yield of the extract is between 17% and 19%. The extract can have a concentration between 6.5 and 12 Brix. The extraction medium can be not heated before it is introduced into the extraction cell. The extraction medium can be water having a temperature between 15° C. and 30° C. The extraction medium can be water having a temperature between 10° C. and 30° C. The method can further include wherein introducing extraction medium through the first portion of the extraction includes introducing the extraction medium at a flow rate that achieves plug flow. The extraction material can not be subjected to prior extractions. An internal chamber of the extraction cell can have a length and an average width along the length and where the ratio of the length to average diameter can be between 0.75:1 and 2:1. The filter at the second portion can have a mean aperture diameter of 20 μm to 90 μm. A density of the extraction material in the extraction cell can be between 0.2 g/ml-0.4 g/ml of ground coffee. The extraction material can have coffee beans ground to a mean particle diameter of 200 μm to 400 μm, 250 μm to 500 μm, or 270 μm to 370 μm. A constant or substantially constant flow rate of extraction medium into the extraction cell can be maintained during an extraction process. A constant or substantially constant flow velocity can be maintained across the radial axis of the chamber during an extraction process. The extract can be extracted less than 75 seconds of introducing the flow of extraction medium through the first portion of the extraction cell. The extract can be extracted less than 30 minutes of introducing the flow of extraction medium through the first portion of the extraction cell. In some examples, the flow rate of the flow of extraction medium does not change more than 70% from the first flow rate. In some examples, the flow rate of the flow of extraction medium does not change more than 50% from the first flow rate.

In yet another aspect, an extraction cell for preparing an extract can include a bottom portion, a top portion having a cross-sectional width and a cross-sectional area, a side wall extending between the bottom portion and bottom portion, the side wall having a length, an inlet on the bottom portion for introducing an extraction medium, and an outlet disposed on the top portion for removing an extract from the extraction cell. An aspect ratio of the length to the cross-sectional width can be between 0.75:1 to 2:1.

In some aspects, the aspect ratio of the length to the cross-sectional width is 1:1. The filter can have a mean aperture diameter of 20 μm to 90 μm. A density of the extraction material in the extraction cell can be between 0.2 g/ml-0.4 g/ml of ground coffee. The extraction cell can include coffee beans ground to a mean particle diameter of 200 μm to 400 μm, 250 μm to 500 μm, or 270 μm to 370 μm.

In one aspect, a method of preparing an extract includes providing a capsule extraction cell having a first portion and a second portion, the capsule extraction cell holding extraction material of ground coffee having a mean particle diameter between 200 μm to 400 inn. The method can further include introducing a flow of extraction medium through the first portion of the capsule extraction cell. The method can further include, within less than 3 minutes of introducing a portion of the flow of extraction medium into the capsule extraction cell, withdrawing from a filter at the second portion of the capsule extraction cell, an extract that has been extracted from the extraction material by the portion of the flow of extraction medium introduced into the capsule extraction cell.

In some configurations, the yield of the extraction is between 10% and 20%. The extract can have a concentration between 3.0 and 7.0 Brix. The method can further include diluting the extract with a second flow of extraction medium. The diluted extract can have a concentration between 1.0 and 2.0 Brix. The extraction medium can not be heated before the extraction medium is introduced into the capsule extraction cell. The extraction medium is water having a temperature between 15° C. and 30° C. The extraction medium can be water having a temperature between 10° C. and 30° C. In some aspects, introducing extraction medium through the first portion of the extraction can include introducing the extraction medium at a flow rate that achieves plug flow. The extraction material can not be subjected to prior extractions. In some examples, an internal chamber of the capsule extraction cell has a length and an average width along the length and where the ratio of the length to diameter of the second portion is between 0.75:1 and 2:1. The capsule extraction cell can include between 10 grams to 20 grams of ground coffee into the capsule extraction cell. In some examples, introducing a flow of extraction medium through the first portion of the extraction can include introducing the extraction medium at a flow rate of between 15 ml/min to 50 ml/min. The first portion can be a bottom portion of the device and the second portion can be a top portion of the device. The extraction medium can flow upwardly through the capsule extraction cell from the first portion to the second portion. The filter at the second portion can have a weight of 30 g/m² to 100 g/m². The capsule extraction cell includes coffee beans ground to a mean particle diameter of 200 μm to 400 μm, 250 μm to 500 μm, or 270 μm to 370 μm.

In another aspect, a method of preparing an extract can include introducing a flow of extraction medium at a temperature between 15° C. and 30° into a capsule extraction cell, the capsule extraction cell comprising extraction material. The method can further include, within less than 3 minutes of introducing the flow of extraction medium into the capsule extraction cell, withdrawing from the capsule extraction cell, an extract that has been extracted from the extraction material by the extraction medium. The extract can have a concentration of the extraction material of between 3.0 and 7.0 Brix and a yield of the extract can be between 10% and 20%.

In some aspects, withdrawing the from the capsule extraction cell can include withdrawing the extract through a filter. The method can further include piercing the capsule extraction cell with a needle to create an inlet for the flow of extraction medium. The method can further include sealing the capsule extraction cell with a gasket.

In yet another aspect, an extraction cell for preparing an extract can include a bottom portion with a first cross-sectional width and a first cross-sectional area. The extraction cell can further include a top portion having a second cross-sectional width and a second cross-sectional area. The extraction cell can also include a side wall extending between the bottom portion and bottom portion, the side wall having a length. The extraction cell can further include an inlet on the bottom portion for introducing an extraction medium. The extraction cell can also include an outlet disposed on the top portion for removing an extract from the extraction cell. The method can also include a filter positioned at the outlet, the filter having an area that is 10% to 20% of the cross-sectional area of the top portion of the extraction cell. The first cross-sectional width can be greater than the second cross-sectional width. The first cross-sectional area can be greater than the second cross-sectional area. An aspect ratio of the length to the second cross-sectional width can be between 0.75:1 to 2:1.

In some configurations, the aspect ratio of the length to the second cross-sectional width can be 0.75:1. The filter can have a weight of 30 g/m$^2$ to 100 g/m$^2$. The extraction cell can include 10 to 20 grams of ground coffee. The extraction cell can include coffee beans ground to a mean particle diameter of 200 μm to 400 μm, 250 μm to 500 μm, or 270 μm to 370 μm.

In yet another aspect, a method of preparing a white coffee extract can include loading an extraction material into an extraction cell having a first portion and a second portion, wherein the extraction material comprises ground coffee with a density between 0.2 g/ml-0.4 g/ml and a mean particle diameter between 700 μm to 900 μm. The method can further include introducing a flow of extraction medium through the first portion of the extraction cell, within less than 60 seconds of introducing a portion of the flow of extraction medium into the extraction cell, withdrawing from a filter at the second portion of the extraction cell, the white coffee extract that has been extracted from the extraction material by the portion of the flow of extraction medium introduced into the extraction cell. The extraction material can include ground white coffee.

In some configurations, a yield of the extract is between 8% and 12%. The extract can have a concentration between 5.5 and 8.5 Brix. The extraction medium can not be heated before being introduced into the extraction cell. The extraction medium can be water having a temperature between 10° C. and 30° C. The white coffee extract that has been extracted from the extraction material by the portion of the flow of extraction medium introduced into the extraction cell can be retrieved between 40 and 60 seconds after introduction of the portion of the flow of extraction medium is introduced into the extraction cell. The method can further include introducing the extraction medium through the first portion of the extraction comprises introducing the extraction medium at a flow rate that achieves plug flow. The extraction material can not be subjected to prior extractions. An internal chamber of the extraction cell can have a length and an average width along the length. A ratio of the length to the average width of the extraction cell can be between 0.5:1 and 1:1. Loading the extraction material into the extraction cell can include loading between 15 to 30 grams of ground white coffee into the extraction cell. The density of the extraction material can be between 0.3 g/ml to 0.35 g/ml. Introducing the flow of extraction medium through the first portion of the extraction cell can include introducing the extraction medium at a flow rate of between 50 ml/min to 90 ml/min. The first portion can be a bottom portion of the extraction cell and the second portion can be a top portion of the extraction cell. The extraction medium can flow upwardly through the extraction cell from the first portion to the second portion. The filter at the second portion can have a mean aperture diameter of 80 μm to 175 μm. The method can further include starting a grinder before loading whole bean white coffee to the grinder to produce the ground white coffee.

In yet another aspect, an extraction cell for preparing a white coffee extract can include a bottom portion and a top portion having a cross-sectional width and a cross-sectional area. The extraction cell can include a side wall extending between the bottom portion and the top portion. The side wall can have a length. The extraction cell can include an inlet on the bottom portion for introducing an extraction medium and an outlet disposed on the top portion for removing an extract from the extraction cell. An aspect ratio of the length to the cross-sectional width can be between 0.5:1 to 1:1.

In some configurations, the aspect ratio of the length to the cross-sectional width can be 0.75:1. The top portion can include a filter. The filter can have a mean aperture diameter of 80 μm to 175 μm. The extraction cell can include an extraction material positioned in the extraction cell. The density of the extraction material in the extraction cell can be between 0.2 g/ml-0.4 g/ml of ground white coffee. The extraction cell can include white coffee beans ground to a mean particle diameter of 700 μm to 900 μm.

A beverage produced by a process that can comprise any one of the methods described above. A beverage product produced by a process consisting of any of the methods described above. A beverage product produced by a process consisting essentially of any of the methods described above.

BRIEF DESCRIPTION OF THE DRAWINGS

The drawings provided herein are not to scale. Various embodiments are depicted in the accompanying drawings for illustrative purposes, and should in no way be interpreted as limiting the scope of the embodiments. Various features of different disclosed embodiments can be combined to form additional embodiments, which are part of this disclosure.

DETAILED DESCRIPTION

Overview

Figure 1:
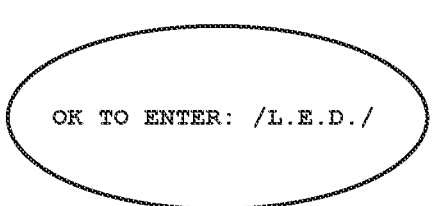
FIG. 1 schematically illustrates an embodiment of an extraction cell.
Figure 1:
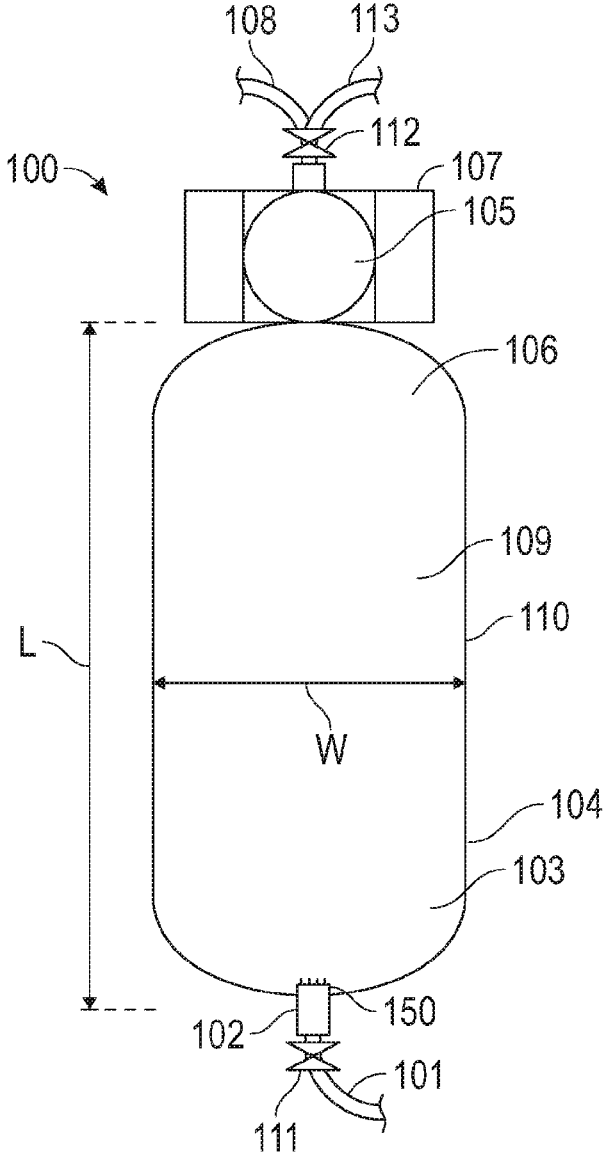

Various extraction systems and methods are described below to illustrate various examples that may achieve one or more desired improvements. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein.

Many of the embodiments described herein involve extracting coffee beans (e.g., espresso beans) to yield an extract, such as coffee extract, such as an espresso. For instance, in some embodiments, the material to be extracted also referred to herein as the "extraction material" may be coffee beverage such as espresso or coffee. The coffee beans can be any variety or species from any part of the world. For example, *Arabica, Robusta*, and any blend of *Arabica* and *Robusta* from any part of the world (such as Brazil, Indonesia, Central America, Africa, etc.). In some embodiments, the extraction material may be an edible substance and may also be, in whole or in part, at least one of green coffee cherries, red coffee cherries, coffee flowers, coffee cherry pulp, coffee cherry stalk, coffee cherry exocarp, or coffee cherry mesocarp. However, it should be appreciated that certain features and aspects of the embodiments disclosed herein may be applicable to other beverages besides coffee extracts, such as teas and other similar infusions and/juices. For example, in yet other embodiments, the extraction material may be green tea leaves and/or partially or totally dehydrated tea leaves. In still further embodiments, the extraction material may comprise fruits, nuts, or similar plant matter including vanilla beans, chocolate beans, hazelnuts, almond, macadamia, peanut, cinnamon, mint, apple, apricot, aromatic bitters, banana, blackberry, blueberry, celery, cherry, cranberry, strawberry, raspberry, juniper berry, brandy, cachaca, carrot, citrus, lemon, lime, orange, grapefruit, tangerine, coconut, menthol, ginger, licorice, milk, pecan, pistachio, walnut, peach, pear, pepper, among others. Thus, the description herein is not limited to espresso, coffee, coffee products, tea or tea products.

Likewise, certain implementations of the systems, methods, and compounds described herein refer to extract in the form of cold press extracts. In certain configurations, cold press extracts may be coffee extracts, tea extracts, juices and herbal extracts, among others. Moreover, this term cold press extract is applied broadly to refer to extracts prepared with the use of an extraction medium (also referred to herein as solvent) not exceeding 100° C. In certain embodiments, the cold press extract can be created during a process that does not utilize pressures exceeding 20 atmospheres. For instance, in certain configurations described herein, the extraction medium may be between 0° C. and 100° C. In certain embodiments, the temperature of the extraction medium may be between 10° C. and 30° C. and in certain embodiments between 15° C. and 30° C. and in certain embodiments between 15° C. and 30° C. In certain implementations, the extraction medium can be a liquid such as water but in certain implementations the extraction medium can be other liquids. In additional configurations, certain inert gasses may be used as well to displace the extraction medium. In certain implementations, the extraction medium is at ambient temperatures when added to the extraction cell as described below and/or added to the extraction cell without heating or otherwise actively changing the temperature of the extraction medium (e.g., water) from its source. In certain embodiments, the process for forming the cold press extract can be conducted at a pressure that can be between 0 bar(gauge) to 16 bar(gauge) and in certain configurations, the pressure can be between 0.5 to 2.5 bar (gauge) and in certain embodiments these pressures ranges can be used in combination with the temperature ranges described above for the extraction medium and/or described a method in which the extraction medium is not heated or otherwise actively changed in temperature of the extraction medium. Cold press extracts can advantageously be more nuanced and smooth compared to hot brewed coffee produced at higher temperatures.

Although certain aspects, advantages, and features are described herein, it is not necessary that any particular embodiment include or achieve any or all of those aspects, advantages, and features. For example, some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable. In certain examples, the systems and methods described herein can be used in a capsule or pod extraction cells, such as described in U.S. Provisional Patent Application No. 63/203,192, filed Jul. 12, 201, which is incorporated by reference herein in its entirety.

Example Embodiment Extraction Cell for Small Volumes

Figures 2A, 2B:
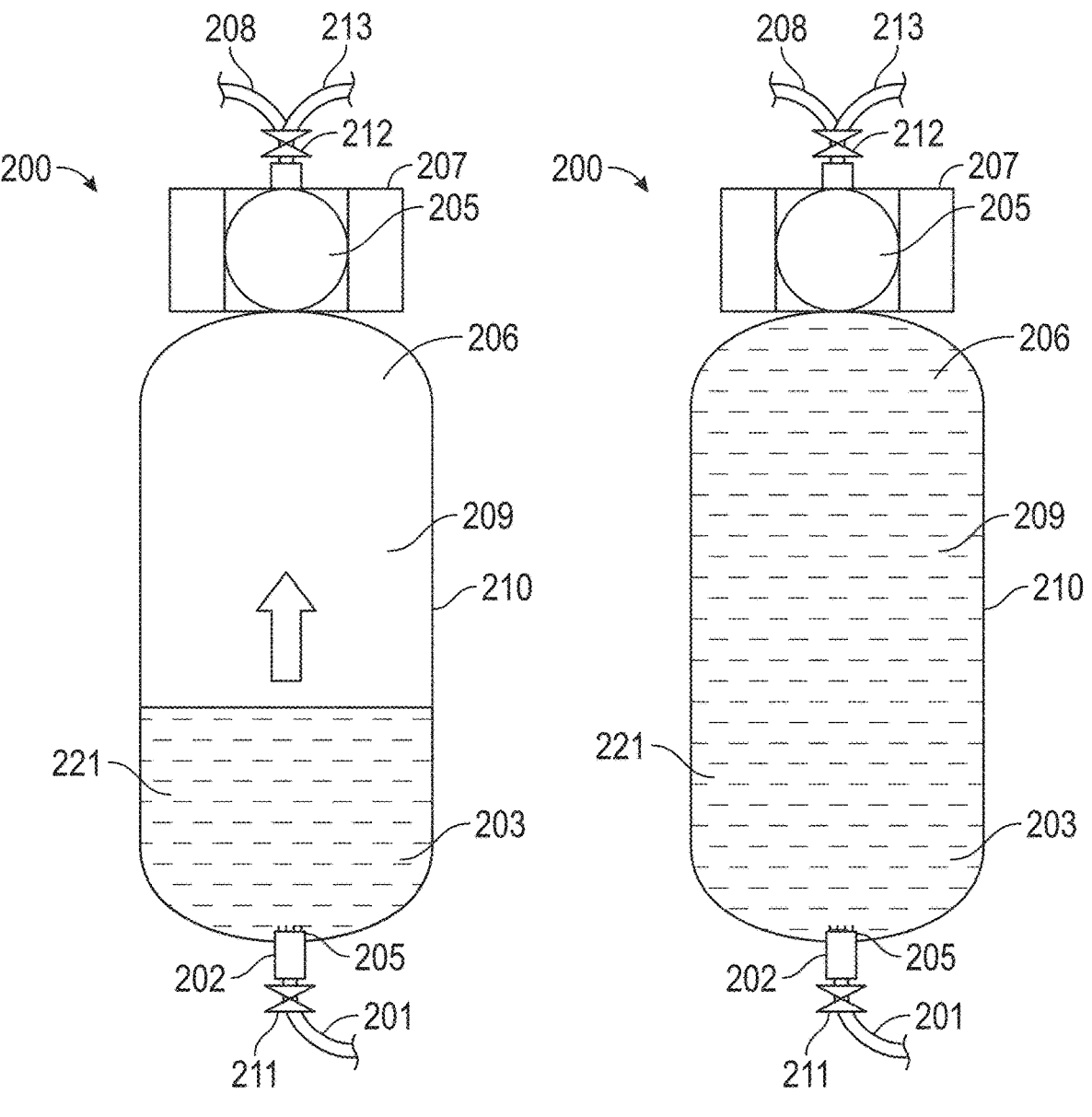
FIG. 2A-2D schematically illustrates an embodiment of a method of preparing an extract in an extraction cell.
Figures 2C, 2D:
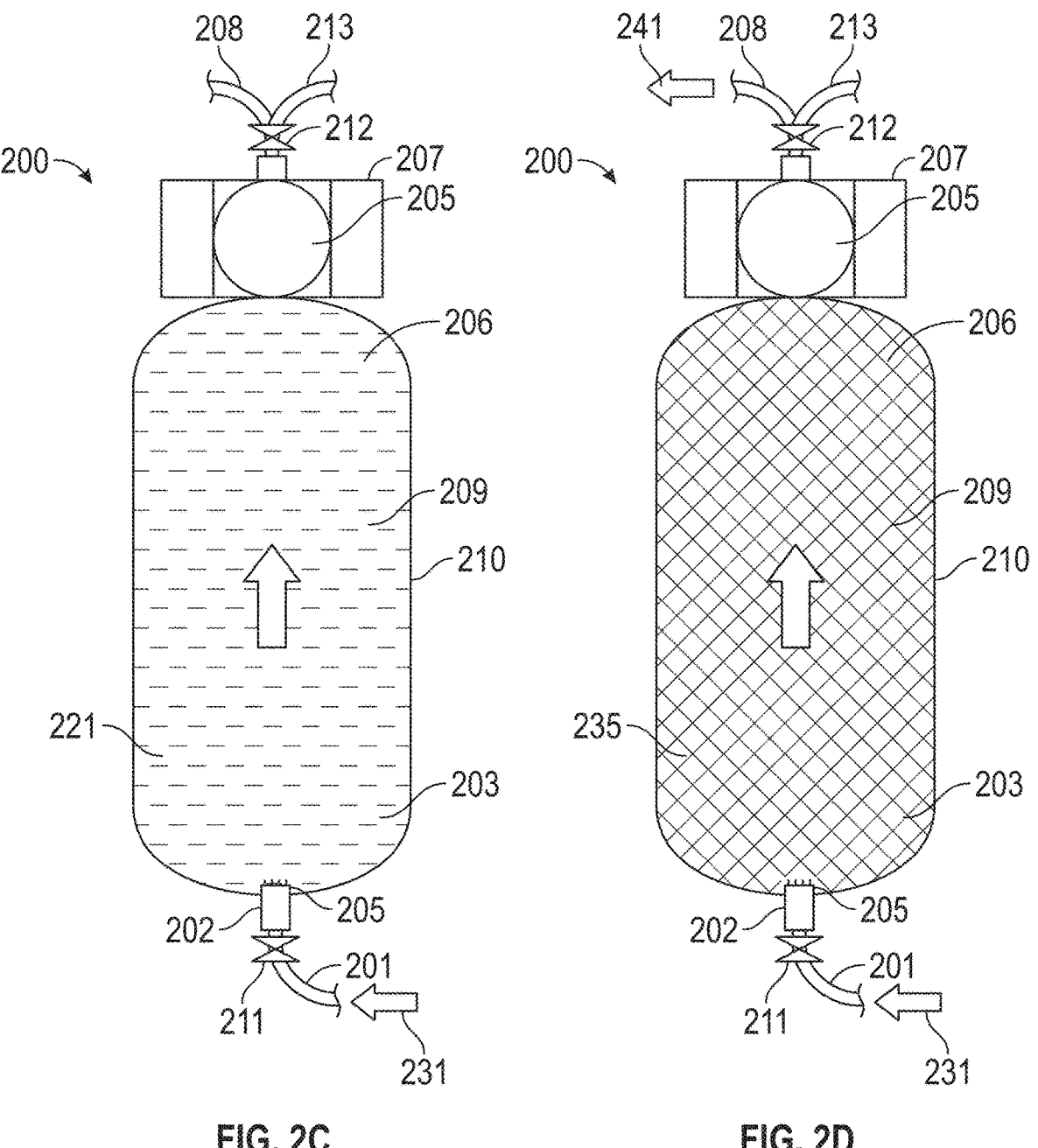
Figure 3:
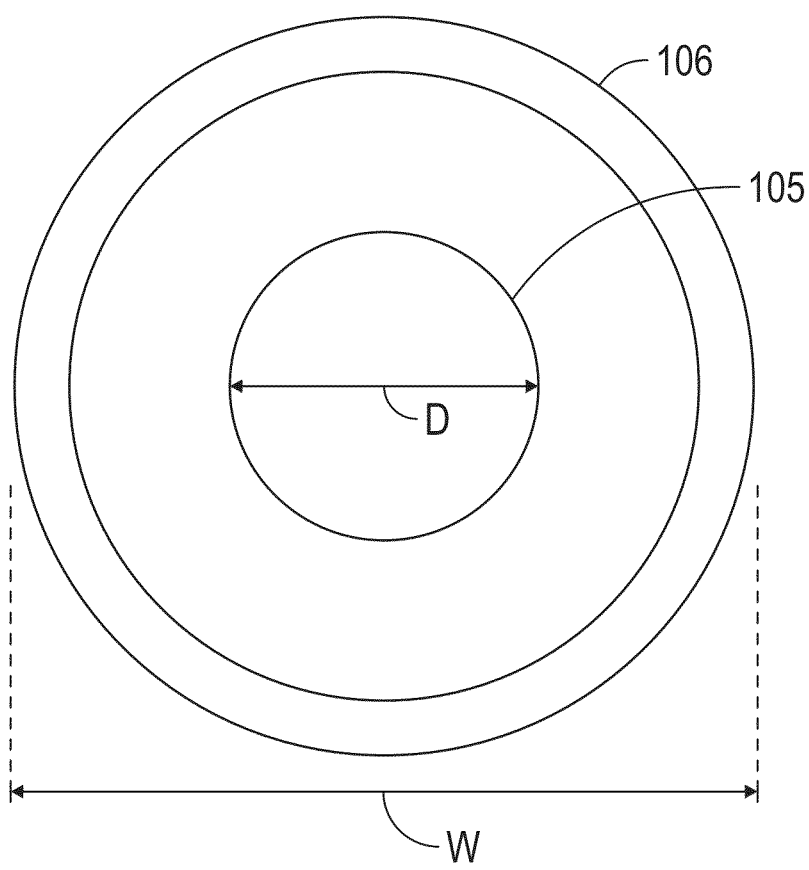
FIG. 3 schematically illustrates an interior view of the second portion and filter of the extraction cell of FIG. 1.

FIGS. 1-3 disclose an embodiment for an extraction cell 100 that can be advantageous for smaller volumes. FIG. 1 schematically illustrates an embodiment of an extraction cell 100. To facilitate presentation, the extraction cell 100 is frequently described in the context of an extraction material in the form of tea leaves or ground coffee beans, to brew an extract that is a tea or coffee extract with an extraction medium that is water. However, as noted above, certain features and aspects of the present disclosure can be applied in other contexts as well. For instance, the extraction cell 100 may also be used for extracting tea leaves to brew a tea extract, juice, or other similar infusions or other extraction materials or extraction mediums instead of water can be used in certain arrangements.

As shown, the extraction cell 100 of FIG. 1 includes a first portion 103, and a second portion 106. In the illustrated embodiment, both the first portion 103 and the second portion 106 are cylindrical. Joining the first portion 103 to the second portion 106 is a sidewall 104 such that the extraction cell 100 can have a cylindrical shape. In this manner, the first portion 103, the second portion 106, and the sidewall 104 serve to define a boundary between an exterior 110 of the extraction cell 100 and an interior 109 of the extraction cell 100, thereby forming a generally liquid tight enclosure that may be filled with a desired extraction material and a suitable extraction medium to form an extraction slurry. In the illustrated embodiment, the first portion 103 corresponds to a lower or bottom portion of the extraction cell 100 while the second portion 106 corresponds to an upper or top portion of the extraction cell 100. Accordingly, in the description herein the first portion 103 can also be referred to as the bottom portion or lower portion. In a similar manner, the second portion 106 can be referred to as the top portion or upper portion. As will be explained below, the illustrated arrangement has certain advantages. For instance, in some configurations, the second portion 106 may be removed either partially or completely to facilitate the introduction of a desired extraction material. For instance, in certain configurations, the second portion 106 may be implemented as a removable cover, sliding window, or flip top lid, though various other implementations are may be used. Moreover, in certain arrangements, the orientation of the extraction cell 100 can be modified such that the orientation of the first portion 103 and the second portion 106 are reversed or located in other positions such as positioning the extraction cell 100 on its side such that the first portion 103 and the second portion 106 are located at the same or near the same elevation. While the orientation can be modified from the orientation illustrated in FIG. 1, ascending flow of the extraction medium upward through the cell 100 has been found to have certain advantages in producing a more uniform and consistent product with reduced processing time. Thus, in certain configurations, at least one of the first portion 103, or sidewall 104 may be implemented as a removable cover, or equipped with a mechanism configured to create an opening through which an extraction material can be loaded into the interior 109 of the extraction cell 100. In other embodiments, the first and second portion can be permanently attached to each other or integrally formed with each other. It is also possible for the extraction cell 100 to have more than two portions.

The interior 109 of the extraction cell 100 can be characterized by a length L and an average width W along the length L. The length L and average width W of the extraction cell define an interior aspect ratio AR (aspect ratio=L/W) of the extraction cell 100. The interior aspect ratio AR of the extraction cell can allow a user to control the contact ratio of the extraction material in relation to the extraction medium. An advantage of certain embodiments of the extraction cell 100 in combination with the methods disclosed herein is that a cold press extract can be produced with no or very little steeping time. That is, in certain embodiments, the extraction medium continuously or substantially continuously flows through the extraction material in the extraction cell 100 from the inlet to the outlet. In some examples, the extraction medium flowing continuously or substantially continuously can be defined such that the flow rate does not change more than a certain percentage during the brew time. In some examples, the flow rate does not change more than a certain percentage from a maximum or initial flow rate of the flow of extraction medium introduced during the brew time or steep time. The brew time can be defined as the time from when the extraction medium is introduced to when the finished extract is withdrawn and collected. The steep time can be defined as the time it takes for an initial portion or aliquot of the extraction medium to travel through the initial portion of the extraction material in the cell 100 through the filter at the outlet of the cell. In some examples, there is no more than a 50% change (increase or decrease) in the initial or maximum flow rate during the brew time or steep time. For example, a flow rate begins at 80 ml/min and does not decrease lower than 40 ml/min during the brew time or steep time. In other examples, there is no more than a 60%, 70%, 80%, 90%, or 100% change in initial or maximum flow rate during the brew of steep time. In other examples, there is no more than a 60%, 70%, 80%, 90%, or 100% change from the initial or maximum flow rate during at least 60%, 70%, 80%, 90% or 100% of the brew time or steep time. As noted above, in some examples, the steep time may defined as the time it takes for an initial portion or aliquot of the extraction medium to travel through the initial portion of the extraction material in the cell 100 through the filter at the outlet of the cell 100. In some examples, flow of this portion or aliquot of extraction material through the extraction medium through the cell 100 is continuous or substantially continuous. The steep time may include time in which the extraction medium is not being continuously introduced or not flowing into the extraction cell 100. While there are advantages to having continuous or substantially continuous flow, in some examples, the steep time may include time in which the extraction medium is temporarily not moving through the extraction material. In addition, the steep time may include times when the flow rate is modulated or stopped for a short period of time. In this manner, the extraction cell 100 can be used to create a cold pressed extract "on demand." In certain configurations, the interior aspect ratio AR may range from 0.75:1 to 2:1 or any value between these ranges and in certain embodiments the interior aspect ratio is 1:1. Without being bound to any particular theory of operation, Applicants have found that such aspect ratios are surprisingly useful in producing sufficiently strong cold pressed extracts with little or no steep time. The interior 109 of the extraction cell 100 can also be characterized by a volume. The volume can range from 10 ml to 30 ml and in certain embodiments between 20 ml to 25 ml which can be used in combination with the interior aspect ratio AR described above. These ranges of measurements are particularly suitable for the extraction cell 100 for smaller volumes. The Example Embodiment Extraction Cell and Method for Larger Volumes sections address a system and methods of an extraction cell that is particularly advantageous for larger volumes.

The extraction cell 100 can be configured such that adjacent fluid layers do not substantially mix. The extraction cell 100 can be configured to induce plug flow. The term plug flow is used in accordance with its plain and ordinary meaning, referring to a fluid transport model wherein a constant flow velocity is maintained across the radial axis of the chamber. Due to the substantially constant velocity of flow, mixing between adjacent fluid layers is substantially avoided. In certain embodiments, there is less than 25% mixing between layers and in certain embodiments less than 10% mixing between layers. In this manner, extraction medium may be expelled from a chamber by introduction of subsequent liquid flowing through the extraction cell 100, without substantial mixing. For instance, in certain embodiments of the present disclosure, the contents of the extraction cell 100 are expelled by initiating a flow of extraction medium through the first portion 103. Where the extraction medium achieves a constant velocity across the width of the interior of the extraction cell 100, a plug flow can be induced, and the contents of the extraction cell 100 (i.e., the prepared extract) may be expelled from the extraction cell 100. Since the extraction medium can exhibit a substantially constant velocity across the width of the extraction cell 100, undesirable mixing between the flow of extraction medium and the prepared extract of the extraction cell 100 can be avoided, and the prepared extract will not be diluted by the subsequent or later flow of extraction medium.

The extraction cell 100 may be made from any suitable material. For instance, the first portion 103, the second portion 106, and the sidewall 104 may each independently comprise a metal, ceramic, plastic, glass, or other substantially solid compound. For instance, in some configurations, the first portion 103, the second portion 106, and the sidewall 104, may be constructed from a substantially opaque metallic compound. In additional configurations, at least the sidewall 104 or a portion of the sidewall 104 may be comprised of a substantially transparent or at least partially translucent compound, such as a glass or plastic. Advantageously, in such configurations, it may be possible for a user to view the contents of the extraction cell 100 and to determine the progress of the extraction based on the appearance of the contents residing within.

With continued reference to FIG. 1, in the illustrated embodiment, the first portion 103 includes an inlet 102 to allow an extraction medium to be introduced into the extraction cell 100 through the first portion 103 (which as explained above can be the bottom portion 103). The inlet 102 can be a generally hollow section of piping or tubing serving to produce an opening in the first portion 103. The inlet 102, in turn, can be in fluid communication with an inlet conduit 101. The inlet conduit 101 may similarly comprise a generally elongate, hollow section of piping or tubing serving to provide a path for the flow of a extraction medium (such as water or gas) towards the inlet 102 from any suitable source. In this manner, the inlet conduit 101 is in fluid communication with the interior 109 of the extraction cell 100 through the inlet 102. Thus, a supply of water—or any other extraction medium—may be introduced into the interior 109 of the extraction cell 100 through the first portion 103. While one inlet is illustrated, more than one inlet can be used or the inlet can be divided into sub-inlets.

One or more inlet valves 111 may be disposed along the inlet conduit 101 and/or at the inlet 102. In this manner, it is possible to control the flow of extraction medium into the interior 109 of the extraction cell 100. Suitable valves include, for instance, umbrella valves, duckbill valves, or any other suitable temporary closure mechanism. By modulating the inlet valves 111, the flow of water into the interior 109 of the extraction cell 100 may be initiated, halted, regulated, or otherwise controlled depending on the desired extraction characteristics. Likewise, in some configurations, the inlet conduit 101 may be fitted with a suitable valve or filter to serve as a backflow inhibitor. Thus, it is impossible to prevent plant material, solvent, or even the extract itself from flowing back through the inlet 102 towards the inlet conduit 101, even if the contents of the extraction cell are subjected to substantial back-pressure. For instance, in the embodiment illustrated in FIG. 1, the inlet 102 can be fitted with a coarse filter 150. In this manner, extraction material can be prevented from flowing back towards the inlet conduit 101. In certain configurations, the coarse filter 150 may have a mean aperture diameter ranging from 20 to 150 µm, such as between 40 to 70 µm or between 20 to 40 µm. These ranges of measurements are particularly advantageous for the extraction cell 100 for smaller volumes. The Example Embodiment Extraction Cell and Method for Larger Volumes sections will address a system and methods of an extraction cell that is particularly advantageous for larger volumes.

As shown in FIG. 1, the second portion 106 can also include an outlet 107. As with the inlet 102 discussed above, the outlet 107 can be in fluid communication with an extract outlet conduit 108. In some configurations, the outlet 107 may further be coupled with an air outlet conduit 113, as illustrated in FIG. 1. In this manner, both the extract outlet conduit 108, and air outlet conduit 113 are in fluid communication with the interior 109 of the extraction cell 100, thereby providing a path for both the air and extract residing within the interior 109 of the extraction cell 100 to be displaced or otherwise removed from the interior 109 of the extraction cell 100 through the second portion 106 of the extraction cell 100. In certain arrangements, separate conduits and outlets can be provided on the second portion 106 to provide a path for both the air and extract residing within the interior 109 of the extraction cell 100 and/or more than one outlet can be provided and/or the outlet can be divided into sub outlets. To prevent or control the expulsion of extract or air from the interior 109 of the extraction cell 100, one or more outlet valves 112 may be disposed within the outlet 107, the extract outlet 108, or the air outlet 113. The outlet valves 112 may also be used to prevent or control the expulsion of air from the interior 109 of the extraction cell 100. The one or more outlet valves 112 may include an umbrella valve, a duckbill valve, or other suitable temporary closure mechanism. In this manner, the flow of extract and/or air from the interior 109 of the extraction cell 100 may be initiated, halted, regulated, or otherwise controlled depending on the desired extraction characteristics. However, as noted above, in certain embodiments, the flow of extraction medium through the cell 100 can be continuously or substantially continuous. In such embodiments, the cell 100 need not include one or more outlet valves 112 or the outlet valves 112 can remain open during most processing steps.

In some configurations, at least one of the inlet valves 111 and the outlet valves 112 may be manually controlled. In certain configurations, at least one of the inlet valves 111 or the outlet valves 112 may be communicably coupled with a controller, as will be described in more detail with reference to FIG. 4. The controller may be manipulated by a user directly, or the controller may be communicably coupled with a user interface. In this manner, a user and/or a control system of the extraction cell 100 may manipulate or control the inlet valves 111 or outlet valves 112 to adjust certain extraction characteristics. For instance, in some embodiments, a user and/or control system of the extraction cell 100 may close the outlet valves 112 while the flow of solvent persists, thereby causing pressure within the interior 109 of the extraction cell 100 to build, and thus increasing the rate of extraction. In some configurations, the outlet valves 112 may remain closed until the desired pressure is built within the extraction cell 100 and the extraction medium has flowed upward and reached the second portion 106 or outlet 107. In some configurations, the outlet valves 112 may remain open as the pressure is built within the extraction cell 100. In some examples, the outlet valves 112 may remain open (or the cell may be provided without outlet valve) as flow of solvent occurs through the extraction cell 100. In some configurations, the pressure may not increase or may increase minimally by nature of the filter, grind size, fill rate, or filter back pressure.

In the illustrated embodiment, the second portion 106 can comprise a filter 105. The filter 105 can separate heterogeneous extraction slurry into its constituent components to yield a substantially homogeneous extract. The filter 105 can be positioned near or adjacent to the outlet 107. In certain configurations, the filter 105 shares substantially the same size and geometry as the outlet 107. The resultant extract may then be isolated and/or reserved for further processing, packaging, or consumption. The filter 105 may be any suitable filtration construction. For instance, in certain configurations the filter 105 may be a fine filter, mesh filter, membrane filter, or other suitable filtration apparatus. Moreover, in certain configurations, the filter 105 may be selected such that the aperture size or pore size will capture the extraction material without adversely impacting the flow of the extract as the mixture flows towards the water outlet conduit 108. Alternatively, the aperture size of the filter 105 can be selected such that the flow of extract out of the extraction cell 100 is significantly impeded. In this manner, significant back pressure may be built within the interior 109 of the extraction cell 100 as additional flow of extraction medium are flowed into the interior 109 of the extraction cell 100 through inlet 102, even when outlet 107 and extract conduit 108 are opened, or otherwise configured to receive a flow of extract. In some implementations, the filter 105 may have a mean aperture diameter of 20 μm to 90 μm, such as between 40 μm to 70 μm or between 20 μm or 40 μm. The mean aperture diameter of the filter 105 can be used in combination with the extraction cell 100 with aspect ratios and/or volume ranges described above.

FIG. 3 depicts an interior view of an embodiment of the extraction cell's 100 second portion 106. As can be seen in FIG. 3, the filter 105 can be disposed adjacent to the outlet such that the filter 105 covers the outlet substantially completely. In this manner, the spent coffee grounds may be separated from the extraction slurry such that only the substantially homogenous extract is permitted to flow through the filter 105, into the outlet, and towards the extract outlet conduit. In certain configurations, the filter 105 can have a diameter D that is approximately 20% of the width W of interior 109 of the extraction cell 100. In some embodiments, the diameter D of the filter is substantially equal to the diameter D of the outlet. Nevertheless, the diameter D of the filter 105 may be modified to accommodate the desired extraction characteristics. For instance, in certain configurations, the diameter of the filter 105 may be increased to reduce the back pressure exerted on the contents of the extraction cell. Alternatively, in certain configurations, the diameter D of the filter 105 may be reduced to slow the rate at which the extract may be displaced from the interior 109 of the extraction cell 100. The diameter of the filter 105 may be modified in isolation. However, in certain configurations, the diameter of the filter 105 may be modified in conjunction with corresponding modifications to the diameter of the outlet or cell. For example, in certain configurations the diameter D of the outlet and the filter 105 may have a diameter that is 10% to 35% of the cell inner diameter and in certain embodiments 20% of the cell inner diameter. In some examples, the area of the outlet and the filter 105 may have an area that is 10% to 35% of the area of the cell. These ranges are particularly advantageous for the extraction cell 100 for smaller volumes. The Example Embodiment Extraction Cell and Method for Larger Volumes sections will address a system and methods of an extraction cell that is particularly advantageous for larger volumes.

Likewise, the location of the filter 105 with respect to the second portion 106 may be varied. For instance, the filter 105 may be disposed substantially centered on the second portion 106. In alternate embodiments, the filter 105 may be offset such that the outer circumference of the filter intersects with the center of the second portion 106. The filter 105 diameter and/or area ratio described above can be used alone or in combination with the mean aperture diameter, the extraction cell 100 aspect ratios and/or volume ranges described above.

Additionally, the interior 109 of the extraction cell 100 may be fitted with one or more sensors to monitor the internal characteristics of the extraction cell 100. For instance, in certain configurations, the interior 109 of the extraction cell 100 may include a temperature sensor, which allows the user to monitor the temperature of the contents residing within the interior 109 of the extraction cell 100. Moreover, in certain configurations, it may be advantageous to dispose multiple pressure sensors within the interior 109 of the extraction cell 100 such that the internal pressure can be monitored. In certain configurations, the one or more sensors may be coupled with the controller to automate certain aspects of the extraction. For instance, in some configurations, a pressure sensor may be disposed within the extraction cell 100 and communicably coupled with a controller. In this manner, the pressure within the extraction cell 100 may be monitored as the cell fills with extraction medium. As noted herein, in certain embodiment, the flow into and out of the extraction cell 100 can be controlled manually and/or semi-manually.

With reference back FIG. 1, the flow may move through the material to create an extraction slurry within the interior 109 of the extraction cell 100. In this manner, the desirable compounds of the material to be extracted from the extraction material may be pulled into the extraction medium and dissolved to form an extract. The flow of extraction medium may be continuous to displace the extract from the interior 109 of the extraction cell 100. Embodiments and/or components the extraction cell 100 can be used in combination with the method described below, for example, with respect to FIGS. 2A-2D. In addition, the embodiments and/or components the extraction cell 100 can be used to create cold extracts according to the embodiments described below.

As described above, the flow of extraction medium can be stopped or discontinuous allowing the extraction slurry to steep within the interior 209 of the extraction cell 200. The stop time could be over a period ranging from 1 second to 20 seconds and could be broken up into segments within the overall steep time of the extraction medium through the cell 100, 200. The overall steep time can be regulated with the flow rate, such that within less than 75 seconds of introducing the flow of extraction medium into the extraction cell and in certain embodiments, less than 60 seconds, extract can be extracted from the extraction material by the extraction medium. These ranges are particularly advantageous for the extraction cell 100 for smaller volumes. These ranges of measurements are particularly advantageous for the extraction cell 100 for smaller volumes. The Example Embodiment Extraction Cell and Method for Larger Volumes sections will address a system and methods of an extraction cell that is particularly advantageous for larger volumes.

Example Embodiment Extraction Cell for Larger Volumes

FIGS. 1-3 can also disclose an embodiment for an extraction cell 100 that can be advantageous for larger volumes. The extraction cell 100 can be used to a produce extractions on a large scale, such as to produce high volume, which can eliminate outages at high volume, enable faster brewing, reduce the cost of goods, and reduce labor. This enables high concentrate to be extracted at a high yield. The optimal extraction cell is important to ensure that the extract can be brewed quickly, which still maintaining a high concentration. The scaled up large extraction cell can advantageously produce more consistent yields. The scaled up large extraction cell can also advantageously produce an increased yield. The increased yield could be caused by the fact that larger extraction cells require more time to fill and require higher flow rate of extraction medium compared to smaller cells, with flow rates faster per gram of coffee in the scaled up large extraction cell. The comparatively smaller filter can provide significantly more backpressure causing a positive impact on yield, thereby driving up the concentration of the extraction. Additionally, the increased yield can be caused by the scaled up large extraction cell requiring more time to fill, such that the extraction medium has more time to steep as it travels through the extraction cell, leading to a higher yield.

The extraction cell 100 can be similarly configured as described above, such as the extraction cell 100 described above in the context of a smaller volume. The interior 109 of the extraction cell 100 can be characterized by a length L and an average width W along the length L. The length L and average width W of the extraction cell define an interior aspect ratio AR (aspect ratio=L/W) of the extraction cell 100. The interior aspect ratio AR of the extraction cell can allow a user to control the contact ratio of the extraction material in relation to the extraction medium. An advantage of certain embodiments of the extraction cell 100 in combination with the methods disclosed herein is that a cold press extract can be produced with no or very little steeping time. That is, in certain embodiments, the extraction medium continuously or substantially continuously flows through the extraction material in the extraction cell 100 from the inlet to the outlet. In some examples, the steep time may defined as the time it takes for an initial portion or aliquot of the extraction medium to travel through the initial portion of the extraction material in the cell 100 through the filter at the outlet of the cell 100. In some examples, flow of this portion or aliquot of extraction material through the extraction medium through the cell 100 is continuous or substantially continuous. The steep time may include time in which the extraction medium is not being continuously introduced or not flowing into the extraction cell 100. In some examples, the steep time may include time in which the extraction medium is temporarily not moving through the extraction material. In addition, the steep time may include times when the flow rate is modulated or stopped for a short period of time. In this manner, the extraction cell 100 can be used to create a cold pressed extract more quickly than traditional methods for cold brew. In certain configurations, the interior aspect ratio AR may range from 0.5:1 to 2:1 or any value between these ranges and in certain embodiments the interior aspect ratio is 0.75:1. Without being bound to any particular theory of operation, Applicants have found that such aspect ratios are surprisingly useful in producing sufficiently strong cold pressed extracts with little or no steep time. These ranges are particularly advantageous for the extraction cell 100 for larger volumes.

The interior 109 of the extraction cell 100 can be characterized by a height. The height can range from 40 mm to 100 mm and in certain embodiments between 50 mm to 90 mm, which can be used in combination with the interior aspect ratio AR described above. The interior 109 of the extraction cell 100 can also be characterized by a width. The width can range from 50 mm to 120 mm and in certain embodiments 80 mm to 100 mm, which can be used in combination with the interior aspect ratio AR described above. These ranges are particularly advantageous for the extraction cell 100 for larger volumes.

In some examples, the extraction cell 100 can be tapered, such that a sidewall of the extraction cell 100 can have a slight taper from the bottom to the top of the extraction cell 100. In a tapered extraction cell 100, in some embodiments, the bottom diameter can be larger than the top diameter. In a tapered extraction cell 100, in some embodiments, the top diameter can be larger than the bottom diameter. In some examples, the extraction cell 100 can have a straight wall, such that there is no taper in the sidewall of the extraction cell 100. In the straight wall extraction cell 100, the top diameter can be equal to the bottom diameter.

The interior 109 of the extraction cell 100 can also be characterized by a volume. The volume can range from 100 ml to 1000 ml and in certain embodiments between 200 ml to 800 ml, which can be used in combination with the interior aspect ratio AR described above. These ranges of measurements are particularly suitable for the extraction cell 100 for larger volumes.

The extraction cell 100 for larger volumes can be similarly configured to operate described above, such as the extraction cell 100 described above in the context of a smaller volume. The extraction cell 100 can be configured such that adjacent fluid layers do not substantially mix. The extraction cell 100 can be configured to induce plug flow. The term plug flow is used in accordance with its plain and ordinary meaning, referring to a fluid transport model wherein a constant flow velocity is maintained across the radial axis of the chamber. Due to the substantially constant velocity of flow, mixing between adjacent fluid layers is substantially avoided. In certain embodiments, there is less than 25% mixing between layers and in certain embodiments less than 10% mixing between layers. In this manner, extraction medium may be expelled from a chamber by introduction of subsequent liquid flowing through the extraction cell 100, without substantial mixing. For instance, in certain embodiments of the present disclosure, the contents of the extraction cell 100 are expelled by initiating a flow of extraction medium through the first portion 103. Where the extraction medium achieves a constant velocity across the width of the interior of the extraction cell 100, a plug flow can be induced, and the contents of the extraction cell 100 (i.e., the prepared extract) may be expelled from the extraction cell 100. Since the extraction medium can exhibit a substantially constant velocity across the width of the extraction cell 100, undesirable mixing between the flow of extraction medium and the prepared extract of the extraction cell 100 can be avoided, and the prepared extract will not be diluted by the subsequent or later flow of extraction medium.

As described above, one or more inlet valves 111 may be disposed along the inlet conduit 101 and/or at the inlet 102. In this manner, it is possible to control the flow of extraction medium into the interior 109 of the extraction cell 100. Suitable valves include, for instance, umbrella valves, duckbill valves, or any other suitable temporary closure mechanism. By modulating the inlet valves 111, the flow of water into the interior 109 of the extraction cell 100 may be initiated, halted, regulated, or otherwise controlled depending on the desired extraction characteristics. Likewise, in some configurations, the inlet conduit 101 may be fitted with a suitable valve or filter to serve as a backflow inhibitor. Thus, it is impossible to prevent plant material, solvent, or even the extract itself from flowing back through the inlet 102 towards the inlet conduit 101, even if the contents of the extraction cell are subjected to substantial back-pressure. For instance, in the embodiment illustrated in FIG. 1, the inlet 102 can be fitted with a coarse filter 150. In this manner, extraction material can be prevented from flowing back towards the inlet conduit 101. In certain configurations, the coarse filter 150 may have a mean aperture diameter ranging from 20 to 150 μm, such as between 40 to 70 μm or between 20 to 40 μm. These ranges of measurements are particularly advantageous for the extraction cell 100 for larger volumes.

In the illustrated embodiment, the second portion 106 can comprise a filter 105. The filter 105 can separate heterogeneous extraction slurry into its constituent components to yield a substantially homogeneous extract. The filter 105 can be positioned near or adjacent to the outlet 107. In certain configurations, the filter 105 shares substantially the same size and geometry as the outlet 107. The resultant extract may then be isolated and/or reserved for further processing, packaging, or consumption. The filter 105 may be any suitable filtration construction. For instance, in certain configurations the filter 105 may be a fine filter, mesh filter, membrane filter, or other suitable filtration apparatus. Moreover, in certain configurations, the filter 105 may be selected such that the aperture size or pore size will capture the extraction material without adversely impacting the flow of the extract as the mixture flows towards the water outlet conduit 108. Alternatively, the aperture size of the filter 105 can be selected such that the flow of extract out of the extraction cell 100 is significantly impeded. In this manner, significant back pressure may be built within the interior 109 of the extraction cell 100 as additional flow of extraction medium are flowed into the interior 109 of the extraction cell 100 through inlet 102, even when outlet 107 and extract conduit 108 are opened, or otherwise configured to receive a flow of extract. In some implementations, the filter 105 may have a mean aperture diameter of 20 μm to 90 μm, such as between 40 μm to 70 μm or between 20 μm or 40 μm. The mean aperture diameter of the filter 105 can be used in combination with the extraction cell 100 with aspect ratios and/or volume ranges described above.

FIG. 3 depicts an interior view of an embodiment of the extraction cell's 100 second portion 106. As can be seen in FIG. 3, the filter 105 can be disposed adjacent to the outlet such that the filter 105 covers the outlet substantially completely. In this manner, the spent coffee grounds may be separated from the extraction slurry such that only the substantially homogenous extract is permitted to flow through the filter 105, into the outlet, and towards the extract outlet conduit. In certain configurations, the filter 105 can have a diameter D that is approximately 20% to 100% of the width W of interior 109 of the extraction cell 100, such as approximately 30% to 50% of the width W of the interior 109 of the extraction cell 100. The width W can be the top diameter or the bottom diameter of the extraction cell 100. In some embodiments, the diameter D of the filter is substantially equal to the diameter D of the outlet. Nevertheless, the diameter D of the filter 105 may be modified to accommodate the desired extraction characteristics. For instance, in certain configurations, the diameter of the filter 105 may be increased to reduce the back pressure exerted on the contents of the extraction cell. Alternatively, in certain configurations, the diameter D of the filter 105 may be reduced to slow the rate at which the extract may be displaced from the interior 109 of the extraction cell 100. The diameter of the filter 105 may be modified in isolation. However, in certain configurations, the diameter of the filter 105 may be modified in conjunction with corresponding modifications to the diameter of the outlet or cell. For example, in certain configurations the diameter D of the outlet and the filter 105 may have a diameter that is 20% to 100% of the cell inner diameter and in certain embodiments 50% to 80% of the cell inner diameter. In some examples, the area of the outlet and the filter 105 may have an area that is 3% to 100% of the area of the cell, in certain embodiments 70% to 90% of the area and in certain embodiments 40% to 60% of the area. These ranges are particularly advantageous for the extraction cell 100 for larger volumes. Likewise, the location of the filter 105 with respect to the second portion 106 may be varied. For instance, the filter 105 may be disposed substantially centered on the second portion 106. In alternate embodiments, the filter 105 may be offset such that the outer circumference of the filter intersects with the center of the second portion 106. The filter 105 diameter and/or area ratio described above can be used alone or in combination with the mean aperture diameter, the extraction cell 100 aspect ratios and/or volume ranges described above. These ranges are particularly advantageous for the extraction cell 100 for larger volumes.

With reference back FIG. 1, the flow may move through the material to create an extraction slurry within the interior 109 of the extraction cell 100. In this manner, the desirable compounds of the material to be extracted from the extraction material may be pulled into the extraction medium and dissolved to form an extract. The flow of extraction medium may be continuous to displace the extract from the interior 109 of the extraction cell 100. Embodiments and/or components the extraction cell 100 can be used in combination with the method described below, for example, with respect to FIGS. 2A-2D. In addition, the embodiments and/or components the extraction cell 100 can be used to create cold extracts according to the embodiments described below.

As described above, the flow of extraction medium can be stopped or discontinuous allowing the extraction slurry to steep within the interior 209 of the extraction cell 200. The stop time could be over a period ranging from 1 minute to 10 minutes and could be broken up into segments within the overall steep time of the extraction medium through the cell 100, 200. The overall steep time can be regulated with the flow rate, such that within less than 30 minutes of introducing the flow of extraction medium into the extraction cell and in certain embodiments, less than 20 minutes, extract can be extracted from the extraction material by the extraction medium. These ranges are particularly advantageous for the extraction cell 100 for larger volumes.

Example Extraction Method for Smaller Volumes

FIGS. 2A-2D schematically illustrate an embodiment of an upward flow filtration process for use in a extraction cell as described above with a extraction cell for smaller volumes. The extraction cell can be configured according to any of the embodiments described above and herein. Components of the extraction cell 200 in FIGS. 2A-2D have been given similar references numbers to the extraction cell 100 described above with similar components preceded by "2" instead of "1" as described above. For example, the interior 209 can correspond in certain embodiments to the interior 109 in the embodiments disclosed above. Additional detail and embodiments of such components with similar reference numbers can be found with reference to description above. To facilitate presentation, the methods below are discussed in the context of preparing a cold extraction of coffee or tea, from roasted ground coffee or espresso beans and loose leaf teas of packed tea pellets. However, it will be apparent to the skilled artisan that the methods may be employed to prepare a variety of different brews, including teas and various other infusions. As noted above, the process can include the use of an extraction medium (also referred to herein as solvent) not exceeding 100° C., and without using pressures exceeding dozens of atmospheres. For instance, in certain configurations described below, the extraction medium may be between 0° C. and 100° C. In some embodiments, the temperature of the extraction medium may be between 10° C. and 30° C. and in certain embodiments between 20° C. and 30° C. In certain embodiments, the pressure within the extraction chamber is between 0 and 16 bar(g). In certain configurations, the pressure is between 0.5-2.5 bar(g) In certain configurations, the temperature and pressure ranges mentioned above can be combined. In certain implementations, the extraction medium can be a liquid such as water but in certain implementations the extraction medium can be other liquids. In additional configurations, certain inert gasses may be used as well to displace the extraction medium. In certain implementations, the extraction medium is at ambient temperatures when added to the extraction cell as described below. In addition, while the process is described in the context of an upward flow orientation and upward flow, the cell 100, 200 can be orientated in other positions such the flow is directed downwards, horizontally or in between orientations. As noted above, ascending flow of the extraction medium upward through the cell 100 has been found to have certain advantages in producing a more uniform and consistent product with reduced processing time.

As shown in FIG. 2A, extraction material 221, which can be roasted, ground coffee or espresso bean and can be loaded into the interior 209 of the extraction cell 200. The extraction material 221 may be added until the interior 209 of the extraction cell 200 is filled partially or substantially completely. In certain embodiments, the extraction material is loaded until the density of the extraction material 221 in the cell 220 is between 0.2 g/ml-0.4 g/ml. In certain embodiments, the extraction material is ground coffee is loaded until the density of the extraction material 221 in the cell 220 is between 0.3 g/ml-0.33 g/ml. In certain embodiments, between 5 to 10 grams of extraction material 221 are loaded into the cell 100, 200, in certain embodiments 6-8 grams and in certain embodiments 7 grams of material are loaded into the cell 100, 200. In certain embodiments, between 6 to 9 grams of extraction material 221 are loaded into the cell 100, 200. In certain embodiments, extraction material 221 in the form of ground coffee that has been ground to a particle size between 200 μm and 400 μm, such as between 270 μm to 370 μm, is loaded into the cell 100, 200. In certain embodiments, the extraction material 221 in the form of ground coffee that has been ground to a mean particle diameter between 200 μm and 400 μm, such as between 270 μm to 370 μm, is loaded into the cell 100, 200. In such embodiments, this amount of extraction material can yield a shot size of espresso. In some embodiments, the shot size may be between 0.5 to 1 fl. oz. and in certain embodiments between 0.6 to 0.7 fl. oz. In some embodiments, the shot size may be between 15 g to 25 g and in certain embodiments between 18 g to 20 g.

As discussed above, the extraction material 221 can vary broadly within the context of this disclosure. For instance, in certain configurations the extraction material 221 may include coffee beans, such as roasted, ground coffee or espresso beans. In addition, the level of grind can also enhance extraction characteristics and improve the time to delivery of a final product. For instance, in certain configurations, extraction proceeds more quickly when finely ground coffee beans are used. In some embodiments, the coffee beans may be ground to a mean particle diameter of 200 μm to 400 μm and in certain embodiments between 250 μm to 500 μm or 270 μm to 370 μm. However, additional or alternate extraction materials may also be used. For instance, in certain configurations the fruits, leaves, roots, and/or bark of other plants and herbs may be extracted and different mean particle sizes or diameters can be used.

FIG. 2B depicts the exemplary extraction cell 100 filled substantially completely with the extraction material 221. As noted above, on certain embodiments, the extraction material is loaded until the density of the extraction material 221 in the cell 220 is between 0.2 g/ml-0.4 g/ml. In certain embodiments, the extraction material is ground coffee is loaded until the density of the extraction material 221 in the cell 220 is between 0.3 g/ml-0.33 g/ml. After the extraction material 221 has been loaded into the extraction cell 200, a flow 231 of an extraction medium may be introduced, as depicted in FIG. 2C. As with the extraction material 221, a wide variety of potential extraction mediums can be employed. To facilitate presentation, the present disclosure frequently refers to the use of water as the extraction medium, though it will be apparent to the skilled artisan that additional, or alternate extraction mediums such as gas, can be used in the methods disclosed herein.

FIG. 2C depicts a flow 231 of extraction medium introduced into the interior 209 of the extraction cell 200 through the first portion 203. In some embodiments, the extraction medium may be water. As noted above, in certain embodiments, the extraction medium, which can be water that is not temperature treated (e.g., not heated) before the water is delivered to extraction cell 200. That is, in certain embodiments the water is delivered to the extraction cell 200 at ambient temperatures. In certain embodiments, the extraction medium (e.g., water) does not exceed 100° C. and in certain configurations the extraction medium may be between 0° C. and 100° C. and in some embodiments, the temperature of the extraction medium may be between the ranges of 10° C. and 30° C., 15° C. and 30° C. or 20° C. and 30° C. As shown in FIG. 2C, the flow 231 of extraction medium flows from the inlet conduit 201, through the inlet 202, and into the interior 209 of the extraction cell 200. In the illustrated arrangement, the flow 231 of extraction medium flows generally upwards into the interior 209 of the extraction cell 200, first permeating the lowest layers of the extraction material 221 before proceeding vertically throughout the extraction cell 200. However, as noted above, the extraction cell 200 can be orientated differently such that the extraction medium flows downwardly, horizontally or in between a vertical and horizontal direction.

As the flow 231 of extraction medium flows into the interior 209 of the extraction cell 200, the extraction material 221 of the extraction cell 200 can be pressed towards the second portion 206. This includes the extraction material to be extracted, as well as any gasses resident within the interior 209 of the extraction cell 200. In some embodiments, the outlet 207 may be opened such that the upward flow of the extraction medium expels gases (such as air) resident in the extraction cell 200 through second portion 206, through the outlet 207, and towards the air conduit 213. In some embodiments, the outlet 207 may remain open as the extraction medium flows upward through the interior 209 of the extraction cell 200. In some examples, the outlet 207 may remain open and the pressure may be built within the interior 209 as the flow 231 travels within the interior 209 of the extraction cell 200.

In some embodiments, once sufficient air has been expelled from the extraction cell 200, the outlet 207 remains open or is not provided with a valve. With the outlet 207 open, the extraction medium may flow upward into the interior 209 of the extraction cell 200 and the pressure may build to a desired level within the interior 209. Once the extraction medium has traveled through the extraction material and reached the second portion 206 or outlet 207 (thus being transformed to extract 241), extract 241 may be retrieved from the outlet 207. In some examples, the outlet 207 may be temporally closed during the process and the pressure may be built within the interior 209 as the flow 231 travels within the interior 209 of the extraction cell 200. The outlet 207 may be opened or closed by opening and closing of the outlet valves 212.

In addition to displacing the resident air, the upward flow of extraction medium can provide certain advantages. First, the upward flow of extraction medium can more evenly wet the extraction material 221 within the extraction cell 200. Even wetting of the extraction material 221 can facilitate even extraction, preventing regions of the extraction material 221 from over-extracting while other regions remain under-extracted.

Second, the upward flow of the extraction material 221 can tamp the extraction material 221 against the second portion 206 of the interior 209 of the extraction cell 200. In this manner, efficient and autonomous extraction is facilitated by eliminated the need for additional tamping components or user intervention. Since the upward flow of the extraction material 221 provides the requisite tamping force, an extraction process may be initiated and left unattended, without requiring a user to stand by and tamp the coffee or espresso grounds after they have been loaded in the extraction cell, or after the extraction solvent has been introduced. Moreover, the degree to which the grounds are tamped can be controlled by the modulating amount of solvent introduced into the extraction cell, and thus, the internal pressure induced by the solvent.

Third, tamping of the extraction material 221 against the second portion 206 can aid even extraction. The upward flow can also naturally and evenly, using gravity, lift the extraction material 221 towards the second portion 206 of the extraction cell 200. Since the extraction material 221 is tamped against the second portion 206 of the extraction cell 200 and compacted, the risk of channeling is reduced. Channeling can occur where the interstitial spaces between extraction material 221 are irregular; as the extraction medium flows through the extraction material 221, the extraction medium may be diverted towards larger interstitial spaces. This phenomena may lead to over-extraction of the extraction material 221 adjacent to larger interstitial spaces, and under-extraction of the extraction material 221 adjacent to smaller spaces. Moreover, such channeling can inhibit plug flow formation by preventing or reducing the flow of extraction medium from achieving or maintaining a substantially constant velocity. Conversely, where an even, upward flow of extraction medium is employed, the extraction material 221 can tamped against the second portion 206 of the extraction cell 200, compressing the grounds into a cake. The compressed extraction material 221 exhibits more uniform interstitial spacing, facilitating uniform extraction, and yielding an extract having more refined flavor characteristics.

The user may control many aspects of the extraction process by tailoring the flow rate to suit a particular embodiment. For instance, the internal pressure—and the degree to which the extraction material 221 are tamped against the second portion 206—can be dependent on the rate at which extraction medium is introduced into the interior 209 of the extraction cell 200. In some embodiments, the flow rate ranges from 15 ml/min to 50 ml/min, such as between 20 ml/min to 40 ml/min. In certain configurations, the mean flow rate is 30 ml/min. In some examples, during the extraction process, the flow rate into the cell is constant or substantially constant. In some examples, the flow rate into the cell 100 varies within 50% to 100% during the extraction process and in certain embodiments the flow rate varies within 75% to 100% of the initial flow rate and in some embodiments within 90% to 100% during the extraction process. In certain embodiments, the flow rate of the extraction medium into and through the cell 100 is constant during the extraction process. In other examples, the flow rate may be modulated throughout the process. For example, the flow rate may be stopped and then ramped up during the process. For example, the flow rate may be continuous during the process. For example, the flow rate may be continuous and substantially constant during the process. For example, the flow rate may be continuous and may be modulated during the process.

In various embodiments, flow rates are set to achieve plug flow. Where a given flow rate is too high, the extraction solvent can exploit irregularities within the interstitial spaces of the coffee or espresso grounds to form channels through the cake. Such channels can be associated with uneven extraction. Similarly, where the flow rate is too low, the velocity of solvent can be insufficient to induce plug flow. As such, the desired flow rate can be affected by the geometry of the extraction cell, and the contents residing therein. Accordingly, in various configurations of the methods and devices described herein, the flow rate is gauged in relation to the volume of the extraction medium residing within the interior of the extraction cell. For instance, in certain configurations, the flow rate may be configured to flow through the available volume of the extraction cell and through the outlet 207 over a period ranging from 15 seconds to 75 seconds; in certain embodiments, between 15 to 60 seconds, and in certain embodiments less than 30 seconds or less than 60 seconds. In such configuration, the steep time which is defined as when a portion or aliquot of extraction medium is introduced into the cell 100 and contacts the initial portion of the extraction material and when this portion or aliquot of extraction material is extracted from the filter can be can be regulated such that the steep time of the portion or aliquot of extraction medium being withdrawn from the filter ranges between from 15 seconds to 75 seconds; in certain embodiments, between 15 to 60 seconds, and in certain embodiments the steep time is less than 30 seconds or less than 60 seconds. As noted above, the flow of extraction medium through the cell 100, 200 can be continuous or substantially continuous. In certain embodiments, this can be achieved by supplying a constant or substantially constant flow rate of extraction medium into the cell 100, 200 through the inlet. These ranges are particularly advantageous for the extraction cell 100 for smaller volumes.

As the flow 231 of water flows into the interior 209 of the extraction cell 200, an extraction slurry 235 is formed. FIG. 2D depicts the extraction slurry 235 residing within an extraction cell 200 as the extraction medium flows through the interior 209 of the extraction cell. The extraction slurry 235 is typically a heterogeneous mixture comprising the extraction material to be extracted in solution with the extraction medium. For instance, in certain configurations, the extraction slurry 235 may be roasted, ground coffee or espresso beans in solution with water. The strength of the resultant extract is affected by certain characteristics of the extraction slurry 235. For instance, the ratio of roasted, ground coffee or espresso beans to water has an effect on the final strength of the brewed extract 241. Similarly, the temperature of the extraction slurry 235, as well as the pressure under which it is maintained all have a similar effect on the ultimate beverage characteristics, as will be discussed in more detail below.

As shown in FIG. 2D and described above, the extraction slurry 235 can maintained within the interior 209 of the extraction cell 200 without steeping or with a steeping time that is less than 75 seconds and in some embodiment less than 60 seconds or 30 seconds and in certain embodiments between 15 and 60 seconds and in certain embodiments between 15 and 75 seconds. These ranges of measurements are particularly advantageous for the extraction cell 100 for smaller volumes.

The extraction slurry 235 is typically maintained at a substantially constant temperature and pressure throughout the process, though some variations are contemplated. For instance, in certain configurations, the flow 231 may have at temperature at approximately ambient temperatures. In such configurations, the extraction cell may be maintained at an ambient temperature or a low temperature. In such configurations, the temperature of the flow 231 may be at an ambient temperature or a low temperature. In certain configurations, the temperature of the flow 231 may be 0° C. to 100° C. In certain configurations, the temperature of the flow 231 may be 10° C. to 30° C. 15° C. to 30° C. or 20° C. to 30° C.

Likewise, as the flow of extraction medium 231 moves through the extraction slurry 235, the pressure within the extraction cell 200 is typically maintained. For instance, in certain configurations the flow of water may be flowed into the interior 209 of the extraction cell 200 until the internal pressure exceeds one atmosphere. Once the desired pressure has been built, the inlet valves may be open or remain open and the flow may continuously move upward through the extraction cell to displace extract 241 through an extract outlet conduit 208. The pressure within the extraction chamber may then be maintained at a substantially constant level as extraction medium is continuously introduced and extract 241 is continuously displaced and extracted. In certain embodiments, the pressure within the extraction chamber is between 0 and 16 bar(g). In certain configurations, the pressure is between 0.5 and 2.5 bar(g)

The extract 241 can retrieved from the extraction cell 200. As depicted in FIG. 2D, the extract 241 can be displaced by a continuous flow 231 of extraction medium into the interior 209 of the extraction cell 200. The continuous flow 231 of extraction medium flows upwards from the first portion 203, displacing the contents of the extraction cell 200 upwards towards the filter 205. The filter 205 serves to separate the heterogeneous extraction slurry 235 into its constitutions: the extract 241 and the spent extraction material 221. Specifically, the inlet valve 211 remains opened, and the continuous flow 231 of extraction medium is allowed to flow through the inlet conduit 201 into the interior 209 of the extraction cell 200 via the inlet 202.

In various configurations of the methods and devices described herein, the flow rate of the extraction medium is gauged in relation to the volume of the flow of extract. Likewise, in certain configurations a given flow rate will depend on the size of the extraction cell, the particle size or mean particle diameter of the material to be extracted, the diameter of the filter, and the aperture size of the filter.

Due to the flow rate, the cylindrical nature of the illustrated embodiment of the extraction cell 200, and the back pressure induced by the outlet valves 212 and filter 205, a plug flow can be induced as the continuous flow of extraction medium 231 is introduced into the interior 209 of the extraction cell 200. As discussed above, a plug flow is characterized by a substantially constant velocity across the radial profile of the extraction cell 200. The substantially constant velocity across the radial profile of the extraction cell can inhibit mixing adjacent layers—specifically, between a first portion of extraction medium and a second portion of extraction medium.

Displacing the extract 241 in this manner can increase efficiency because no or very little steep time is required and additional equipment is not required to remove the extract from the interior 209 of the extraction cell 200; displacing the extract simply utilizes the network of inlets and outlets used previously to introduce the extraction medium. Thus, the extract 241 can be expelled from the extraction cell 200 without undue dilution, and without necessitating additional retrieval procedures or components and without stopping the flow of extraction material into the cell 100, 200. Lacking superfluous retrieval conduits or mechanisms, consequential transfer losses are reduced, thus ensuring that high extraction yields may be maintained. Additionally, the extract 241 can be created and expelled from the extraction cell 200 quickly and without steeping. The lack of steep time conveniently allows the extract to be provided on demand, such as less than 75 seconds or less than 60 seconds or 30 seconds.

The extraction cycle is complete once the desired volume of extract 241 is collected. In some embodiments, the desired volume of extract 241 may be one shot, which may be between 10-50 mL, such as between 15-30 mL. These ranges of measurements are particularly advantageous for the extraction cell 100 for smaller volumes. In certain embodiments, the cycle may begin again by continuously introducing the extraction material. In other embodiments, the extraction material is discarded and the extraction cell 200 emptied so that the cycle may begin anew. The extract 241 can be finished product that can be delivered to a consumer for consumption. The extraction cell and method described herein can advantageously produce a desired extract without recirculation of the extraction medium through the extraction cell. According to certain embodiments, at least a portion of the extract 241 is delivered to the consumer for consumption after only a single pass through the extraction material 221. The extract can be produced by the extraction medium passing a single time through the extraction cell. The single pass advantageously simplifies the process and equipment while producing the desired extract. Additionally, the extraction material can be not subjected to prior extractions. As noted above, embodiments of the extraction methods can be used in combination with the extraction cell 100 described above with respect to FIGS. 1 and 3. In addition, the embodiments of the extraction method described with respect to FIGS. 2A-2D above can be used to create cold extracts according to the embodiments described below.

In certain embodiments, the extraction material 221 can include layering different extraction material such as providing different coffee blends to provide different beverage profiles. In addition, various additives or infusions can be added to the extraction material 221 to enhance the flavor of the final product. It is also anticipate that multiple extraction cells 221 can arranged in series or parallel to module capacity.

In certain embodiments, a plunger or piston may be used to accelerate the extraction process. For example, when the extraction medium has flown through the extraction material to form an extraction slurry, after a period of time, a plunger or piston may tamp or compress the extraction slurry to yield an extract. The use of a plunger or piston can speed up the extraction process.

Example Extraction Method for Larger Volumes

FIGS. 2A-2D can also schematically illustrate an embodiment of an upward flow filtration process for use in a extraction cell as described above with a extraction cell for larger volumes. The upward flow filtration process for use extraction cell 100 for larger volumes can be similarly configured to operate as described above, such as the upward flow filtration process described above in the context of a smaller volume.

The extraction cell can be configured according to any of the embodiments described above and herein. As noted above, the process can include the use of an extraction medium (also referred to herein as solvent) not exceeding 100° C., and without using pressures exceeding dozens of atmospheres. For instance, in certain configurations described below, the extraction medium may be between 0° C. and 100° C. In some embodiments, the temperature of the extraction medium may be between 10° C. and 30° C. and in certain embodiments between 19° C. and 22° C. In certain embodiments, the pressure within the extraction chamber is between 0 and 16 bar(g). In certain configurations, the pressure is between 0.5-2.5 bar(g) In certain configurations, the temperature and pressure ranges mentioned above can be combined. In certain implementations, the extraction medium can be a liquid such as water but in certain implementations the extraction medium can be other liquids. In additional configurations, certain inert gasses may be used as well to displace the extraction medium. In certain implementations, the extraction medium is at ambient temperatures when added to the extraction cell as described below. In addition, while the process is described in the context of an upward flow orientation and upward flow, the cell 100, 200 can be orientated in other positions such the flow is directed downwards, horizontally or in between orientations. As noted above, ascending flow of the extraction medium upward through the cell 100 has been found to have certain advantages in producing a more uniform and consistent product with reduced processing time.

As shown in FIG. 2A, extraction material 221, which can be roasted, ground coffee or espresso bean and can be loaded into the interior 209 of the extraction cell 200. The extraction material 221 may be added until the interior 209 of the extraction cell 200 is filled partially or substantially completely. In certain embodiments, the extraction material is loaded until the density of the extraction material 221 in the cell 220 is between 0.2 g/ml-0.4 g/ml. In certain embodiments, the extraction material is ground coffee is loaded until the density of the extraction material 221 in the cell 220 is between 0.3 g/ml-0.36 g/ml. In certain embodiments, between 25 grams to 400 grams of extraction material 221 are loaded into the cell 100, 200, in certain embodiments 30 grams to 150 grams and in certain embodiments 250 grams to 350 grams of material are loaded into the cell 100, 200. In such embodiments, this amount of extraction material can yield a larger amount cold brew extract. In some embodiments, the cold brew extract can be ready to drink (which does not require further dilution before consumption). In some embodiments, the cold brew extract can require further dilution before consumption. In some embodiments, the volume of cold brew extract yielded may be between 0.3 L to 4.5 L, in certain embodiments between 0.3 L to 2 L and in some embodiments between 3 L to 4.5 L. These ranges are particularly advantageous for the extraction cell 100 for larger volumes.

As discussed above, the extraction material 221 can vary broadly within the context of this disclosure. For instance, in certain configurations the extraction material 221 may include coffee beans, such as roasted, ground coffee or espresso beans. In addition, the level of grind can also enhance extraction characteristics and improve the time to delivery of a final product. For instance, in certain configurations, extraction proceeds more quickly when finely ground coffee beans are used. In some embodiments, the coffee beans may be ground to a mean particle diameter of 200 μm to 400 μm and in certain embodiments between 250 μm to 500 μm or 270 μm to 370 μm. However, additional or alternate extraction materials may also be used. For instance, in certain configurations the fruits, leaves, roots, and/or bark of other plants and herbs may be extracted and different mean particle sizes or diameters can be used.

FIG. 2B depicts the exemplary extraction cell 100 filled substantially completely with the extraction material 221. As noted above, on certain embodiments, the extraction material is loaded until the density of the extraction material 221 in the cell 220 is between 0.2 g/ml-0.4 g/ml. In certain embodiments, the extraction material is ground coffee is loaded until the density of the extraction material 221 in the cell 220 is between 0.3 g/ml-0.36 g/ml. These ranges are particularly advantageous for the extraction cell 100 for larger volumes. After the extraction material 221 has been loaded into the extraction cell 200, a flow 231 of an extraction medium may be introduced, as depicted in FIG. 2C. As with the extraction material 221, a wide variety of potential extraction mediums can be employed. To facilitate presentation, the present disclosure frequently refers to the use of water as the extraction medium, though it will be apparent to the skilled artisan that additional, or alternate extraction mediums such as gas, can be used in the methods disclosed herein.

FIG. 2C depicts a flow 231 of extraction medium introduced into the interior 209 of the extraction cell 200 through the first portion 203. In some embodiments, the extraction medium may be water. As noted above, in certain embodiments, the extraction medium, which can be water that is not temperature treated (e.g., not heated) before the water is delivered to extraction cell 200. That is, in certain embodiments the water is delivered to the extraction cell 200 at ambient temperatures. In certain embodiments, the extraction medium (e.g., water) does not exceed 100° C. and in certain configurations the extraction medium may be between 0° C. and 100° C. and in some embodiments, the temperature of the extraction medium may be between the ranges of 10° C. and 30° C., 15° C. and 25° C., or 19° C. and 22° C. These ranges are particularly advantageous for the extraction cell 100 for larger volumes. As shown in FIG. 2C, the flow 231 of extraction medium flows from the inlet conduit 201, through the inlet 202, and into the interior 209 of the extraction cell 200. In the illustrated arrangement, the flow 231 of extraction medium flows generally upwards into the interior 209 of the extraction cell 200, first permeating the lowest layers of the extraction material 221 before proceeding vertically throughout the extraction cell 200. However, as noted above, the extraction cell 200 can be orientated differently such that the extraction medium flows downwardly, horizontally or in between a vertical and horizontal direction.

As the flow 231 of extraction medium flows into the interior 209 of the extraction cell 200, the extraction material 221 of the extraction cell 200 can be pressed towards the second portion 206. This includes the extraction material to be extracted, as well as any gasses resident within the interior 209 of the extraction cell 200. In some embodiments, the outlet 207 may be opened such that the upward flow of the extraction medium expels gases (such as air) resident in the extraction cell 200 through second portion 206, through the outlet 207, and towards the air conduit 213. In some embodiments, the outlet 207 may remain open as the extraction medium flows upward through the interior 209 of the extraction cell 200. In some examples, the outlet 207 may remain open and the pressure may be built within the interior 209 as the flow 231 travels within the interior 209 of the extraction cell 200.

In some embodiments, once sufficient air has been expelled from the extraction cell 200, the outlet 207 remains open or is not provided with a valve. With the outlet 207 open, the extraction medium may flow upward into the interior 209 of the extraction cell 200 and the pressure may build to a desired level within the interior 209. Once the extraction medium has traveled through the extraction material and reached the second portion 206 or outlet 207 (thus being transformed to extract 241), extract 241 may be retrieved from the outlet 207. In some examples, the outlet 207 may be temporally closed during the process and the pressure may be built within the interior 209 as the flow 231 travels within the interior 209 of the extraction cell 200. The outlet 207 may be opened or closed by opening and closing of the outlet valves 212.

In addition to displacing the resident air, the upward flow of extraction medium can provide certain advantages. First, the upward flow of extraction medium can more evenly wet the extraction material 221 within the extraction cell 200. Even wetting of the extraction material 221 can facilitate even extraction, preventing regions of the extraction material 221 from over-extracting while other regions remain under-extracted.

Second, the upward flow of the extraction material 221 can tamps the extraction material 221 against the second portion 206 of the interior 209 of the extraction cell 200. In this manner, efficient and autonomous extraction is facilitated by eliminated the need for additional tamping components or user intervention. Since the upward flow of the extraction material 221 provides the requisite tamping force, an extraction process may be initiated and left unattended, without requiring a user to stand by and tamp the coffee or espresso grounds after they have been loaded in the extraction cell, or after the extraction solvent has been introduced. Moreover, the degree to which the grounds are tamped can be controlled by the modulating amount of solvent introduced into the extraction cell, and thus, the internal pressure induced by the solvent.

Third, tamping of the extraction material 221 against the second portion 206 can aid even extraction. The upward flow can also naturally and evenly, using gravity, lift the extraction material 221 towards the second portion 206 of the extraction cell 200. Since the extraction material 221 is tamped against the second portion 206 of the extraction cell 200 and compacted, the risk of channeling is reduced. Channeling can occur where the interstitial spaces between extraction material 221 are irregular; as the extraction medium flows through the extraction material 221, the extraction medium may be diverted towards larger interstitial spaces. This phenomena may lead to over-extraction of the extraction material 221 adjacent to larger interstitial spaces, and under-extraction of the extraction material 221 adjacent to smaller spaces. Moreover, such channeling can inhibit plug flow formation by preventing or reducing the flow of extraction medium from achieving or maintaining a substantially constant velocity. Conversely, where an even, upward flow of extraction medium is employed, the extraction material 221 can tamped against the second portion 206 of the extraction cell 200, compressing the grounds into a cake. The compressed extraction material 221 exhibits more uniform interstitial spacing, facilitating uniform extraction, and yielding an extract having more refined flavor characteristics.

The user may control many aspects of the extraction process by tailoring the flow rate to suit a particular embodiment. For instance, the internal pressure—and the degree to which the extraction material 221 are tamped against the second portion 206—can be dependent on the rate at which extraction medium is introduced into the interior 209 of the extraction cell 200. In some embodiments, the flow rate ranges from 50 ml/min to 200 ml/min, such as between 70 ml/min to 180 ml/min or between 80 ml/min to 150 ml/min. In certain configurations, the mean flow rate is 100 ml/min. In some examples, during the extraction process, the flow rate into the cell is constant or substantially constant. In some examples, the flow rate into the cell 100 varies within 50% to 100% during the extraction process and in certain embodiments the flow rate varies within 75% to 100% of the initial flow rate and in some embodiments within 90% to 100% during the extraction process. In certain embodiments, the flow rate of the extraction medium into and through the cell 100 is constant during the extraction process. In other examples, the flow rate may be modulated throughout the process. For example, the flow rate may be stopped and then ramped up during the process. For example, the flow rate may be continuous during the process. For example, the flow rate may be continuous and substantially constant during the process. For example, the flow rate may be continuous and may be modulated during the process. These ranges are particularly advantageous for the extraction cell 100 for larger volumes.

In various embodiments, flow rates are set to achieve plug flow. Where a given flow rate is too high, the extraction solvent can exploit irregularities within the interstitial spaces of the coffee or espresso grounds to form channels through the cake. Such channels can be associated with uneven extraction. Similarly, where the flow rate is too low, the velocity of solvent can be insufficient to induce plug flow. As such, the desired flow rate can be affected by the geometry of the extraction cell, and the contents residing therein. Accordingly, in various configurations of the methods and devices described herein, the flow rate is gauged in relation to the volume of the extraction medium residing within the interior of the extraction cell. For instance, in certain configurations, the flow rate may be configured to flow through the available volume of the extraction cell and through the outlet 207 over a period ranging from 4 minutes to 30 minutes; in certain embodiments, between 4 minutes to 15 minutes or between 20 minutes to 30 minutes, and in certain embodiments less than 30 minutes or less than 20 minutes. In such configuration, the steep time which is defined as when a portion or aliquot of extraction medium is introduced into the cell 100 and contacts the initial portion of the extraction material and when this portion or aliquot of extraction material is extracted from the filter can be can be regulated such that the steep time of the portion or aliquot of extraction medium being withdrawn from the filter ranges between 4 minutes to 30 minutes; in certain embodiments, between 4 minutes to 15 minutes or between 20 minutes to 30 minutes, and in certain embodiments less than 30 minutes or less than 20 minutes. As noted above, the flow of extraction medium through the cell 100, 200 can be continuous or substantially continuous. In certain embodiments, this can be achieved by supplying a constant or substantially constant flow rate of extraction medium into the cell 100, 200 through the inlet. These ranges are particularly advantageous for the extraction cell 100 for larger volumes.

As the flow 231 of water flows into the interior 209 of the extraction cell 200, an extraction slurry 235 is formed. FIG. 2D depicts the extraction slurry 235 residing within an extraction cell 200 as the extraction medium flows through the interior 209 of the extraction cell. The extraction slurry 235 is typically a heterogeneous mixture comprising the extraction material to be extracted in solution with the extraction medium. For instance, in certain configurations, the extraction slurry 235 may be roasted, ground coffee or espresso beans in solution with water. The strength of the resultant extract is affected by certain characteristics of the extraction slurry 235. For instance, the ratio of roasted, ground coffee or espresso beans to water has an effect on the final strength of the brewed extract 241. Similarly, the temperature of the extraction slurry 235, as well as the pressure under which it is maintained all have a similar effect on the ultimate beverage characteristics, as will be discussed in more detail below.

As shown in FIG. 2D and described above, the extraction slurry 235 can maintained within the interior 209 of the extraction cell 200 without steeping or with a steeping time that is less than 30 minutes and in some embodiment less than 20 minutes and in certain embodiments between 4 minutes to 15 minutes and in certain embodiments between 20 minutes to 30 minutes. These ranges of measurements are particularly advantageous for the extraction cell 100 for larger volumes. The extraction slurry 235 is typically maintained at a substantially constant temperature and pressure throughout the process, though some variations are contemplated. For instance, in certain configurations, the flow 231 may have at temperature at approximately ambient temperatures. In such configurations, the extraction cell may be maintained at an ambient temperature or a low temperature. In such configurations, the temperature of the flow 231 may be at an ambient temperature or a low temperature. In certain configurations, the temperature of the flow 231 may be 0° C. to 100° C. In certain configurations, the temperature of the flow 231 may be 10° C. to 30° C., 15° C. to 25° C., or 19° C. to 22° C. These ranges are particularly advantageous for the extraction cell 100 for larger volumes.

Likewise, as the flow of extraction medium 231 moves through the extraction slurry 235, the pressure within the extraction cell 200 is typically maintained. For instance, in certain configurations the flow of water may be flowed into the interior 209 of the extraction cell 200 until the internal pressure exceeds one atmosphere. Once the desired pressure has been built, the inlet valves may be open or remain open and the flow may continuously move upward through the extraction cell to displace extract 241 through an extract outlet conduit 208. The pressure within the extraction chamber may then be maintained at a substantially constant level as extraction medium is continuously introduced and extract 241 is continuously displaced and extracted. In certain embodiments, the pressure within the extraction chamber is between 0 and 16 bar(g). In certain configurations, the pressure is between 0.5 and 2.5 bar(g)

The extract 241 can retrieved from the extraction cell 200. As depicted in FIG. 2D, the extract 241 can be displaced by a continuous flow 231 of extraction medium into the interior 209 of the extraction cell 200. The continuous flow 231 of extraction medium flows upwards from the first portion 203, displacing the contents of the extraction cell 200 upwards towards the filter 205. The filter 205 serves to separate the heterogeneous extraction slurry 235 into its constitutions: the extract 241 and the spent extraction material 221. Specifically, the inlet valve 211 remains opened, and the continuous flow 231 of extraction medium is allowed to flow through the inlet conduit 201 into the interior 209 of the extraction cell 200 via the inlet 202.

In various configurations of the methods and devices described herein, the flow rate of the extraction medium is gauged in relation to the volume of the flow of extract. Likewise, in certain configurations a given flow rate will depend on the size of the extraction cell, the particle size or mean particle diameters of the material to be extracted, the diameter of the filter, and the aperture size of the filter.

Due to the flow rate, the cylindrical nature of the illustrated embodiment of the extraction cell 200, and the back pressure induced by the outlet valves 212 and filter 205, a plug flow can be induced as the continuous flow of extraction medium 231 is introduced into the interior 209 of the extraction cell 200. As discussed above, a plug flow is characterized by a substantially constant velocity across the radial profile of the extraction cell 200. The substantially constant velocity across the radial profile of the extraction cell can inhibit mixing adjacent layers—specifically, between a first portion of extraction medium and a second portion of extraction medium.

Displacing the extract 241 in this manner can increase efficiency because no or very little steep time is required and additional equipment is not required to remove the extract from the interior 209 of the extraction cell 200; displacing the extract simply utilizes the network of inlets and outlets used previously to introduce the extraction medium. Thus, the extract 241 can be expelled from the extraction cell 200 without undue dilution, and without necessitating additional retrieval procedures or components and without stopping the flow of extraction material into the cell 100, 200. Lacking superfluous retrieval conduits or mechanisms, consequential transfer losses are reduced, thus ensuring that high extraction yields may be maintained. Additionally, the extract 241 can be created and expelled from the extraction cell 200 quickly and without steeping. The lack of steep time conveniently allows the extract to be provided on demand, such as less than 75 seconds or less than 60 seconds or 30 seconds.

The extraction cycle is complete once the desired volume of extract 241 is collected. In some embodiments, the desired volume of extract 241 may be for a larger volume, which may be between 0.3 L to 4.5 L, in certain embodiments between 0.3 L to 2 L and in some embodiments between 3 L to 4.5 L. These ranges of measurements are particularly advantageous for the extraction cell 100 for larger volumes. In certain embodiments, the cycle may begin again by continuously introducing the extraction material. In other embodiments, the extraction material is discarded and the extraction cell 200 emptied so that the cycle may begin anew. The extract 241 can be finished product that can be delivered to a consumer for consumption. The extraction cell and method described herein can advantageously produce a desired extract without recirculation of the extraction medium through the extraction cell. According to certain embodiments, at least a portion of the extract 241 is delivered to the consumer for consumption after only a single pass through the extraction material 221. The extract can be produced by the extraction medium passing a single time through the extraction cell. The single pass advantageously simplifies the process and equipment while producing the desired extract. Additionally, the extraction material can be not subjected to prior extractions. As noted above, embodiments of the extraction methods can be used in combination with the extraction cell 100 described above with respect to FIGS. 1 and 3. In addition, the embodiments of the extraction method described with respect to FIGS. 2A-2D above can be used to create cold extracts according to the embodiments described below.

In certain embodiments, the extraction material 221 can include layering different extraction material such as providing different coffee blends to provide different beverage profiles. In addition, various additives or infusions can be added to the extraction material 221 to enhance the flavor of the final product. It is also anticipate that multiple extraction cells 221 can arranged in series or parallel to module capacity.

In certain embodiments, a plunger or piston may be used to accelerate the extraction process. For example, when the extraction medium has flown through the extraction material to form an extraction slurry, after a period of time, a plunger or piston may tamp or compress the extraction slurry to yield an extract. The use of a plunger or piston can speed up the extraction process.

Example Extraction Cell Control Systems

In certain configurations, preparation of an extract as described above may proceed automatically, or may be performed substantially manually. In various configurations, one or more sensors may be disposed within, or adjacent to, the extraction cell to detect various characteristics of the extraction process. For instance, such sensors may detect various characteristics such as the temperature within the extraction cell, the temperature of the extraction cell itself, the pressure within the extraction cell, the volume of extraction material within the extraction cell, the volume of solvent within the extraction cell, the duration of extraction, the rate at which solvent is introduced through the inlet, the rate at which extract is retrieved through the outlet, or various other characteristics.

Figure 4:
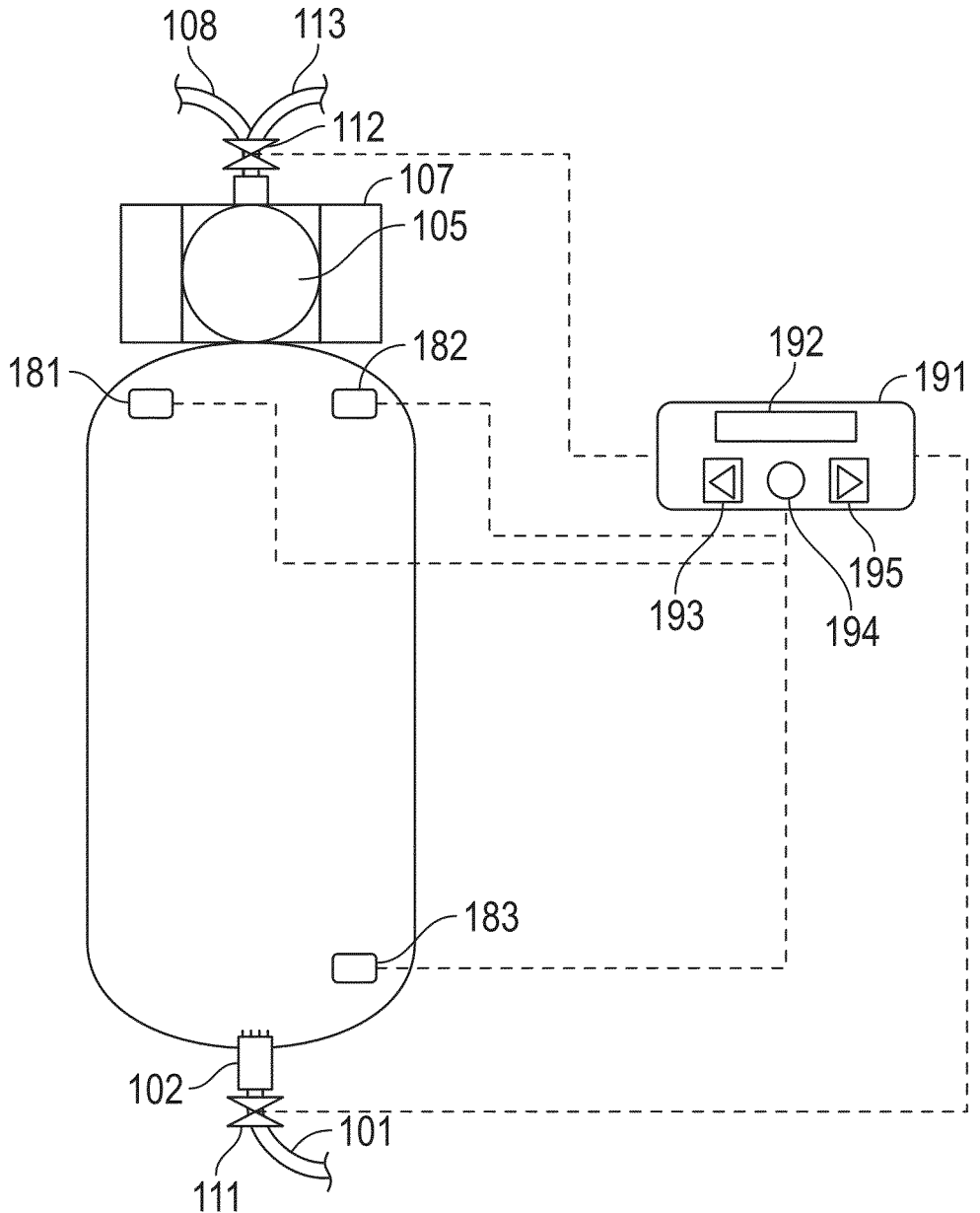
FIG. 4 is a schematic system of an extraction cell control system.

FIG. 4 depicts a schematic view of an extraction cell equipped with multiple sensors; a pressure sensor 181, a temperature sensor 182, and a flow sensor 183. Each of the pressure sensor 181, temperature sensor 182, and flow sensor 183 are communicably coupled to a controller 191. Likewise, the inlet valves 111 and outlet valves 112 are also communicably coupled to the controller 191. In this manner, each of the pressure sensor 181, the temperature sensor 191, the flow sensor 183, the inlet valves 111, and the outlet valves 112, may relay information to the controller 191.

As shown in FIG. 4, certain embodiments of the controller 191 may include a display apparatus, such as a screen 192. The screen 192 can display the aforementioned information gathered from the pressure sensor 181, the temperature sensor 182, the flow sensor 183, the inlet valves 111, and the outlet valves 112. For instance, in embodiment illustrated in FIG. 4, the controller may display information obtained from the temperature sensor, such as the temperature within the extraction cell. Likewise, the controller may display pressure, such as the pressure within the extraction cell. Similarly, the controller may display flow, such as the flow within the extraction cell. As discussed above, the inlet valve 111 and the outlet valve 112 may also relay pertinent information to the controller 191 to be depicted on the screen 192. In this manner, the operator may view various extraction characteristics. Although a screen is illustrated in FIG. 4, alternate or additional display configurations may be employed, such as an analog gauge or alternative digital read out.

In certain configurations, the controller may further include one or more dials. In this manner, the operator may affect various extraction characteristics. For instance, in the embodiment depicted in FIG. 4, the controller 191 includes a first button 193, a second button 194, and a third button 195. However, the buttons may be implemented in a variety of numbers or forms. For instance, in certain configurations the controller 191 may include one or more dials or switches in place of the aforementioned buttons.

With continued reference to FIG. 4, the buttons can be used to select a sensor (e.g., the pressure sensor 181, the temperature sensor 182, or the flow sensor 183) to control, such as scrolling through a menu with the first button 193 and the third button 195 and selecting a particular sensor with the second button 194. Similarly, the buttons can be manipulated to control e.g., the outlet valves 112 or the inlet valves 111. In this manner, an operator of the extraction cell 100 may manipulate the first button 193 to open the outlet valves 112, and further manipulate the third button 194 such that a flow of the extraction medium is allowed to enter the interior 109 of the extraction cell 100. In this manner, air or other gasses resident in the extraction cell may exit the interior 109 of the extraction cell 100 as the solvent begins to fill the chamber. In other embodiments, the first button 193 may be manipulated such that the outlet valves 112 are closed as the solvent is introduced into the interior 109 of the extraction cell 100, allowing pressure to build within the chamber.

In additional embodiments, the controller 191 may be configured to automatically control certain extraction parameters. For instance, in certain configurations the controller 191 may be configured to receive information from at least one of the temperature sensor 181, pressure sensor 182, and flow sensor 183 and to automatically modulate inlet valve 111 or outlet valve 112 to control the temperature or pressure within the interior 109 of the extraction cell 100. In this manner, the extraction process may be substantially automated.

Example Embodiment Extraction Cell System

In some examples as described in FIGS. 1-4 above, the extraction cell 100 can be used to produce extractions on a small scale, such as for an individual beverage on demand like a shot size of espresso as described above, or on a large scale, such as for a commercial scale as described above. In some examples, as described in FIG. 5, the extraction cell 100 can be used to a produce extractions on a large scale, such as to produce high volume, which can eliminate outages at high volume, enable faster brewing, reduce the cost of goods, and reduce labor. This enables high concentrate to be extracted at a high yield. The optimal extraction cell is important to ensure that the extract can be brewed quickly, which still maintaining a high concentration. The scaled up large extraction cell can advantageously produce more consistent yields. The scaled up large extraction cell can also advantageously produce an increased yield. The increased yield could be caused by the fact that larger extraction cells require more time to fill and require higher flow rate of extraction medium compared to smaller cells, with flow rates faster per gram of coffee in the scaled up large extraction cell. The comparatively smaller filter can provide significantly more backpressure causing a positive impact on yield, thereby driving up the concentration of the extraction. Additionally, the increased yield can be caused by the scaled up large extraction cell requiring more time to fill, such that the extraction medium has more time to steep as it travels through the extraction cell, leading to a higher yield.

Figure 5:
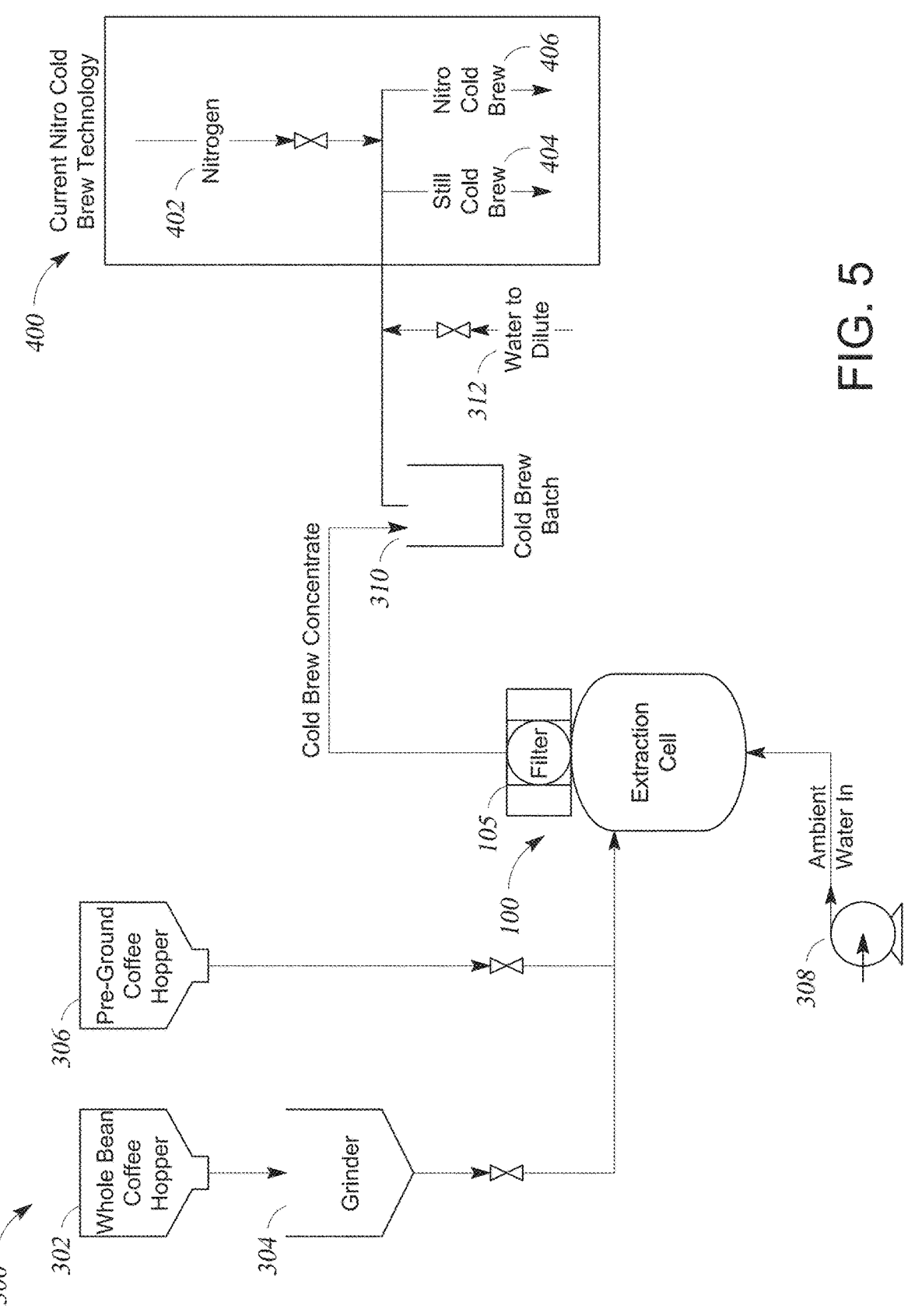
FIG. 5 is a schematic system of another embodiment of an extraction cell system.

FIG. 5 schematically illustrates an embodiment of an extraction cell system 300 for larger volumes. The extraction cell system 300 can include an extraction cell 100 for larger volumes. As previously described, the system 300 can also be decreased in scale to produce cold brew at a small scale, such as described above in FIGS. 1-4. This extraction cell system 300 can also be increased in scale to produce cold brew at a large scale, such as described in FIG. 5.

The extraction cell system can include an extraction cell 100 as similar to the embodiment described in FIGS. 1-4. The extraction cell 100 of the extraction cell system 300 can be suitable for a larger volumes. The system 300 can be used to produce cold brew. To facilitate presentation, the extraction cell system 300 is frequently described in the context of an extraction material in the form of tea leaves or ground coffee beans, to brew an extract that is a tea or coffee extract with an extraction medium that is water. However, as noted above, certain features and aspects of the present disclosure can be applied in other contexts as well.

As shown, the extraction cell system 300 includes one or more sources of extraction medium. The one or more sources of extraction medium can include pre-ground coffee hopper 306 and whole bean coffee hopper 302 that is fed to a grinder 304 to produce ground coffee. The grinder 304 or the pre-ground coffee hopper 306 can fill the extraction cell 100 with ground coffee as the extraction medium, such that the extraction medium is positioned within the interior of the extraction cell 100. The extraction cell 100 can be filled with an extraction medium as described above, such as through a removable cover or through removing a portion of the extraction cell 100. An extraction medium, such as ambient water, can be introduced into the extraction cell 100. The extraction medium can be introduced from a source of extraction medium 308 into a bottom portion of the extraction cell 100. The extraction medium can be water, such as ambient water, which can be considered a first flow of water. The extraction medium can be flowed upward toward the top portion of the extraction cell 100 and through the extraction medium within the extraction cell 100. The water flowing upward can extract desirable compounds of the extraction material and pulled into the extraction medium and dissolved to form an extract. The extract can then be pushed out through the filter 105 and to create extract or concentrate. The concentrate or extract can be dispensed outside of the extraction cell 100. The concentrate or extract can then be further diluted by a second flow of water 312. The second flow of water can come from the source of extraction medium 308 or another source (not shown). The diluted concentrate or extract can then be consumed as still cold brew. The diluted concentrate or extract can also be processed through a nitro cold brew system 400. In this nitro cold brew system 400, concentrate or extract can be infused with nitrogen 402 to produce nitro cold brew.

For example, the volume of the extraction cell 100 may range from 30 ml to 50 ml, such as between 35 ml to 45 ml and in certain embodiments a volume of 40 ml. The flow rate through the extraction cell 100 may range from 50 ml/min to 200 ml/min, such as between 80 ml/min to 150 ml/min and in certain embodiments a flow rate of 100 ml/min. The extraction medium may be configured to flow through the available volume of the extraction cell 100 over a period ranging from 45 seconds to 90 seconds, such as between 60 seconds and 80 seconds and in certain embodiments a period of 75 seconds. In some examples, the area of the outlet and the filter 105 may have an area that is 20% to 100% of the area of the cell, such as between 30% to 50% of the area of the cell and in certain embodiments 40% of the area of the cell. This cold extraction process can exhibit yields ranging from 10% to 20%. In some configurations, the yield may range from 16% to 18% and in certain embodiments a yield from 15% to 20% or a yield of 17.0%.

In some configurations, the volume of the extraction cell 100 may range from 50 ml to 150 ml, such as between 75 ml to 125 ml and in certain embodiments a volume of 100 ml. The flow rate through the extraction cell 100 may range from 20 ml/min to 50 ml/min, such as between 25 ml/min to 45 ml/min and in certain embodiments a flow rate between 30 ml/min to 40 ml/min. The extraction medium may be configured to flow through the available volume of the extraction cell 100 over a period ranging from 2 minutes to 8 minutes, such as between 3 minutes and 7 minutes and in certain embodiments a period between 4 minutes to 6 minutes. This cold extraction process can exhibit yields ranging from 10% to 20%. In some configurations, the yield may range from 17% to 19% and in certain embodiments a yield between 17.9% and 18.9%.

In some configurations, the volume of the extraction cell 100 may range from 200 ml to 300 ml, such as between 225 ml to 275 ml and in certain embodiments a volume of 250 ml. The flow rate through the extraction cell 100 may range from 15 ml/min to 50 ml/min, such as between 20 ml/min to 40 ml/min and in certain embodiments a flow rate between 25 ml/min to 40 ml/min. The extraction medium may be configured to flow through the available volume of the extraction cell 100 over a period ranging from 9 minutes to 17 minutes, such as between 10 minutes and 16 minutes and in certain embodiments a period between 11 minutes to 15 minutes. This cold extraction process can exhibit yields ranging from 10% to 20%. In some configurations, the yield may range from 18% to 19% and in certain embodiments a yield between 18.5% and 18.9%.

In some configurations, the volume of the extraction cell 100 may range from 400 ml to 500 ml, such as between 425 ml to 475 ml and in certain embodiments a volume of 450 ml. The flow rate through the extraction cell 100 may range from 15 ml/min to 55 ml/min, such as between 20 ml/min to 50 ml/min and in certain embodiments a flow rate between 25 ml/min to 45 ml/min. The extraction medium may be configured to flow through the available volume of the extraction cell 100 over a period ranging from 12 minutes to 27 minutes, such as between 13 minutes and 26 minutes and in certain embodiments a period between 14 minutes to 25 minutes. This cold extraction process can exhibit yields ranging from 10% to 20%. In some configurations, the yield may range from 18% to 21% and in certain embodiments a yield between 19% and 20.2%.

In some configurations, the volume of the extraction cell 100 may range from 700 ml to 800 ml, such as between 725 ml to 775 ml and in certain embodiments a volume of 750 ml. The flow rate through the extraction cell 100 may range from 55 ml/min to 90 ml/min, such as between 60 ml/min to 85 ml/min and in certain embodiments a flow rate between 65 ml/min to 80 ml/min. The extraction medium may be configured to flow through the available volume of the extraction cell 100 over a period ranging from 14 minutes to 22 minutes, such as between 15 minutes and 21 minutes and in certain embodiments a period between 17 minutes to 20 minutes. This cold extraction process can exhibit yields ranging from 15% to 25%. In some configurations, the yield may range from 20% to 21% and in certain embodiments a yield between 20.2% and 20.3%. In some embodiments, the extraction cell 100 may be tapered or not tapered.

In some configurations, the volume of the extraction cell 100 may range from 700 ml to 800 ml, such as between 725 ml to 775 ml and in certain embodiments a volume of 750 ml. The flow rate through the extraction cell 100 may range from 50 ml/min to 85 ml/min, such as between 55 ml/min to 80 ml/min and in certain embodiments a flow rate between 60 ml/min to 75 ml/min. The extraction medium may be configured to flow through the available volume of the extraction cell 100 over a period ranging from 15 minutes to 22 minutes, such as between 16 minutes and 21 minutes and in certain embodiments a period between 17 minutes to 20 minutes. This cold extraction process can exhibit yields ranging from 15% to 25%. In some configurations, the yield may range from 20% to 21% and in certain embodiments a yield between 20.6% and 20.9%. In some embodiments, the extraction cell 100 may be tapered or not tapered.

In some configurations, the volume of the extraction cell 100 may range from 950 ml to 1050 ml, such as between 975 ml to 1025 ml and in certain embodiments a volume of 1000 ml. The flow rate through the extraction cell 100 may range from 50 ml/min to 90 ml/min, such as between 55 ml/min to 85 ml/min and in certain embodiments a flow rate between 60 ml/min to 80 ml/min. The extraction medium may be configured to flow through the available volume of the extraction cell 100 over a period ranging from 19 minutes to 31 minutes, such as between 20 minutes and 30 minutes and in certain embodiments a period between 21 minutes to 29 minutes. This cold extraction process can exhibit yields ranging from 15% to 25%. In some configurations, the yield may range from 20% to 21% and in certain embodiments a yield between 20.0% and 20.6%. In some embodiments, the extraction cell 100 may be tapered or not tapered.

In some configurations, the volume of the extraction cell 100 may range from 950 ml to 1050 ml, such as between 975 ml to 1025 ml and in certain embodiments a volume of 1000 ml. The flow rate through the extraction cell 100 may range from 50 ml/min to 90 ml/min, such as between 55 ml/min to 85 ml/min and in certain embodiments a flow rate between 60 ml/min to 80 ml/min. The extraction medium may be configured to flow through the available volume of the extraction cell 100 over a period ranging from 18 minutes to 29 minutes, such as between 19 minutes and 28 minutes and in certain embodiments a period between 20 minutes to 27 minutes. This cold extraction process can exhibit yields ranging from 15% to 25%. In some configurations, the yield may range from 20% to 22% and in certain embodiments a yield of 21%. In some embodiments, the extraction cell 100 may be tapered or not tapered.

During the extraction process embodiments described herein, a portion of the extraction medium can flow continuously or substantially continuously through the extraction cell during the extraction process. During the extraction process embodiments described above, there can be a constant or substantially constant flow rate of a portion of the extraction medium into the extraction cell during an extraction process. During the extraction process embodiments described above, there can be a constant or substantially constant flow velocity maintained across the radial axis of the chamber of the extraction cell during an extraction process and as the extraction medium is being removed from the extraction cell.

The following examples are provided for illustrative purposes only, and are in no way intended to limit the scope of the present embodiments.

Example 1

In one example, 7.5 g of coffee beans or grounds was loaded into an extraction cell with a volume of 21 ml. A flow of extraction medium of water was introduced into and flowed through the extraction cell at a flow rate of 30 ml/min which was held substantially constant during the extraction process. The flow of extraction medium of water had a temperature of less than 30° C. The extract was extracted from the coffee beans or grounds by the extraction medium in less than 75 seconds. The extract had a volume of 18 mL. The extract had a concentration of 7.1 Brix. The extract had a TDS of 6.0% and 60 g/L.

Example 2

In a second example, 150 g of coffee beans or grounds was loaded into an extraction cell with a volume of 450 ml.

A flow of extraction medium of water was introduced into and flowed through the extraction cell at a flow rate of 50 ml/min which was held substantially constant during the extraction process. The flow of extraction medium of water had a temperature of less than 30° C. The extract was extracted from the coffee beans or grounds by the extraction medium in less than 13 minutes. The extract had a volume of 375 mL. The extract had a concentration of 8.7 Brix. The extract had a TDS of 7.4% and 74 g/L.

Example 3

In a third example, 260 g of coffee beans or grounds was loaded into an extraction cell with a volume of 750 ml. A flow of extraction medium was introduced into and flowed through the extraction cell at a flow rate of 60 ml/min which was held substantially constant during the extraction process. The flow of extraction medium of water had a temperature of less than 30° C. The extract was extracted from the coffee beans or grounds by the extraction medium in less than 19 minutes. The extract had a volume of 630 mL. The extract had a concentration of 9.7 Brix. The extract had a TDS of 8.2% and 82 g/L.

Example 4

In a fourth example, 350 g of coffee beans or grounds was loaded into an extraction cell with a volume of 1000 ml. A flow of extraction medium was introduced into and flowed through the extraction cell at a flow rate of 80 ml/min which was held substantially constant during the extraction process. The flow of extraction medium of water had a temperature of less than 30° C. The extract was extracted from the coffee beans or grounds by the extraction medium in less than 22 minutes. The extract had a volume of 875 mL. The extract can have a concentration of 9.9 Brix. The extract had a TDS of 8.4% and 84 g/L.

Example Embodiment Capsule Extraction Cell

FIGS. 6A-6B and 7A-7E disclose various embodiments for capsule or pods extraction cells 500. The use of capsules or pods can be advantageous for smaller volumes, such as for home use or producing single portions. To facilitate presentation, the capsule extraction cell 500 is frequently described in the context of an extraction material in the form of tea leaves or ground coffee beans, to brew an extract that is a tea or coffee extract with an extraction medium that is water. However, as noted above, certain features and aspects of the present disclosure can be applied in other contexts as well. For instance, the capsule extraction cell 500 may also be used for extracting tea leaves to brew a tea extract, juice, or other similar infusions or other extraction materials or extraction mediums instead of water can be used in certain arrangements.

Figure 6B:
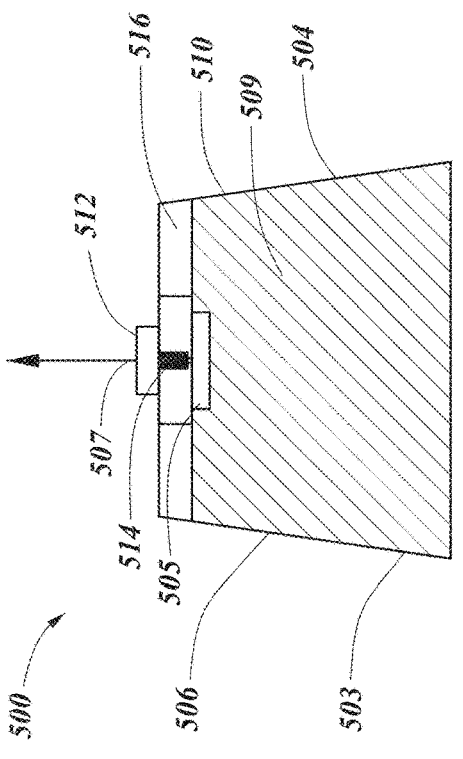
FIG. 6B schematically illustrates another embodiment of a top portion of a capsule extraction cell.
Figure 6A:
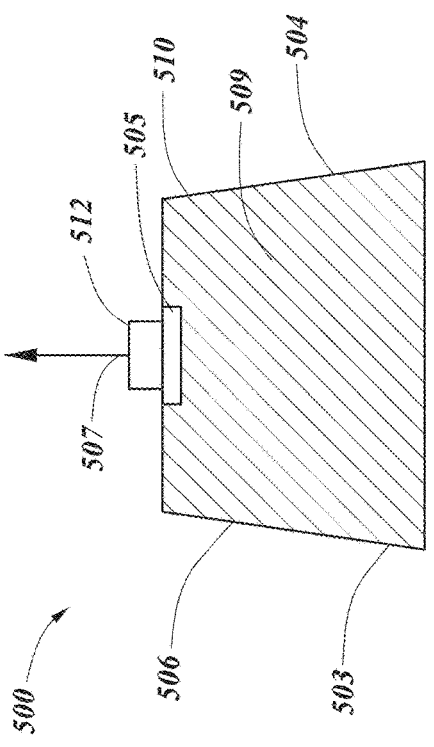
FIG. 6A schematically illustrates an embodiment of a top portion of a capsule extraction cell.

FIG. 6A schematically illustrates an embodiment of a top portion a capsule extraction cell 500. As shown, the capsule extraction cell 500 of FIG. 6A includes a first portion 503 and a second portion 506. In the illustrated embodiment, both the first portion 503 and the second portion 506 are cylindrical. In some examples, both the first portion 503 and the second portion 506 can each include a respective flat end portion. In some examples, both the first portion 503 and the second portion 506 can include a respective rounded end portion. Joining the first portion 503 to the second portion 506 is a sidewall 504 such that the capsule extraction cell 500 can have an overall cylindrical shape. In some embodiments, the sidewall 504 can be continuous from the top to the bottom of the capsule extraction cell 500 along a majority or all of the length of the capsule extraction cell 500. In this manner, the first portion 503, the second portion 506, and the sidewall 504 serve to define a boundary between an exterior 510 of the capsule extraction cell 500 and an interior 509 of the capsule extraction cell 500, thereby forming a generally liquid tight enclosure that may be filled with a desired extraction material and a suitable extraction medium to form an extraction slurry. In the illustrated embodiment, the first portion 503 corresponds to a lower or bottom portion of the capsule extraction cell 500 while the second portion 506 corresponds to an upper or top portion of the capsule extraction cell 500. Accordingly, in the description herein the first portion 503 can also be referred to as the bottom portion or lower portion. In a similar manner, the second portion 506 can be referred to as the top portion or upper portion.

In some examples, the capsule extraction cell 500 can be tapered, such that a sidewall 504 of the capsule extraction cell 500 can be slanted or angled from the first portion 503 to the second portion 506 of the capsule extraction cell 500. In a tapered capsule extraction cell 500, in some embodiments, the diameter or cross-sectional width of the bottom portion 503 can be larger than diameter or cross-sectional width of the top portion 506. In a tapered capsule extraction cell 500, in some embodiments, the diameter of the bottom portion 503 can be larger than the top portion 506. In some examples, the capsule extraction cell 500 can have a straight wall, such that there is no taper in the sidewall of the capsule extraction cell 500. In the straight wall capsule extraction cell 500, the top diameter can be equal to the bottom diameter.

The interior 509 of the capsule extraction cell 500 can be characterized by a length L and a width W, which can be a width of the top portion 506. The width W can be a cross-sectional width or diameter. The length L and width W of the top portion 506 of the capsule extraction cell define an interior aspect ratio AR (aspect ratio=L/W) of the capsule extraction cell 500. The interior aspect ratio AR of the extraction cell can allow a user to control the contact ratio of the extraction material in relation to the extraction medium. An advantage of certain embodiments of the capsule extraction cell 500 in combination with the methods disclosed herein is that a cold press extract can be produced with no or very little steeping time. That is, in certain embodiments, the extraction medium continuously or substantially continuously flows through the extraction material in the capsule extraction cell 500 from the inlet to the outlet. In some examples, the steep time may be defined as the time it takes for an initial portion or aliquot of the extraction medium to travel into the initial portion of the extraction material in the cell 500, through the interior of the extraction cell 500, and through the filter at the outlet of the cell 500. In some examples, flow of this portion or aliquot of extraction material through the extraction medium through the cell 500 is continuous or substantially continuous. The steep time may include time in which the extraction medium is not being continuously introduced or not flowing into the capsule extraction cell 500. In some examples, the steep time may include time in which the extraction medium is temporarily not moving through the extraction material. In addition, the steep time may include times when the flow rate is modulated or stopped for a short period of time. In this manner, the capsule extraction cell 500 can be used to create a cold pressed extract "on demand." In certain configurations, the interior aspect ratio AR may range from 0.75:1 to 2:1 or any value between these ranges and in certain embodiments the interior aspect ratio is 0.75:1.

Without being bound to any particular theory of operation, Applicants have found that such aspect ratios are surprisingly useful in producing sufficiently strong cold pressed extracts with little or no steep time. The interior 509 of the capsule extraction cell 500 can also be characterized by a volume. The volume can range from 15 ml to 60 ml and in certain embodiments between 35 ml to 50 ml which can be used in combination with the interior aspect ratio AR described above. These ranges of measurements are particularly suitable for the capsule extraction cell 500 for smaller volumes, such as for single use or individual coffee systems.

The capsule extraction cell 500 can be configured such that adjacent fluid layers do not substantially mix. The capsule extraction cell 500 can be configured to induce plug flow. The term plug flow is used in accordance with its plain and ordinary meaning, referring to a fluid transport model wherein a constant flow velocity is maintained across the radial axis of the chamber. Due to the substantially constant velocity of flow, mixing between adjacent fluid layers is substantially avoided. In certain embodiments, there is less than 25% mixing between layers and in certain embodiments less than 10% mixing between layers. In this manner, extract produced by flow of the extraction medium through the extraction material may be expelled from a chamber by introduction of subsequent liquid flowing through the capsule extraction cell 500, without substantial mixing. For instance, in certain embodiments, the extract produced within the capsule extraction cell 500 is expelled by initiating a flow of extraction medium through the first portion 503. Where the extraction medium achieves a constant velocity across the width of the interior of the capsule extraction cell 500, a plug flow can be induced, and the contents of the capsule extraction cell 500 (i.e., the prepared extract) may be expelled from the capsule extraction cell 500. Since the extraction medium can exhibit a substantially constant velocity across the width of the capsule extraction cell 500, undesirable mixing between the flow of extraction medium and the prepared extract of the capsule extraction cell 500 can be avoided, and the prepared extract will not be diluted by the subsequent or later flow of extraction medium.

The capsule extraction cell 500 may be made from any suitable material. For instance, the first portion 503, the second portion 506, and the sidewall 504 may each independently comprise a metal (such as aluminum), ceramic, plastic, glass, or other substantially solid compound. For instance, in some configurations, the first portion 503, the second portion 506, and the sidewall 504, may be constructed from a substantially opaque metallic compound. In additional configurations, at least the sidewall 504 or a portion of the sidewall 504 may be comprised of a substantially transparent or at least partially translucent compound, such as a glass or plastic. Advantageously, in such configurations, it may be possible for a user to view the contents of the capsule extraction cell 500 and to determine the progress of the extraction based on the appearance of the contents residing within.

Top Portion

In the illustrated embodiment, the second portion or top portion 506 can include a filter 505. The filter 505 can separate heterogeneous extraction slurry into its constituent components to yield a substantially homogeneous extract. The filter 505 can be positioned near or adjacent to an outlet 507. In certain configurations, the filter 505 shares substantially the same size and geometry as the outlet 507. The resultant extract may then be isolated and/or reserved for further processing, packaging, or consumption. The filter 505 may be any suitable filtration construction. For instance, in certain configurations the filter 505 may be a fine filter, mesh filter, membrane filter, or other suitable filtration apparatus. In some configurations, the filter 505 may be a made of paper, woven metal, woven silk, chemically etched film, or other suitable materials. Moreover, in certain configurations, the filter 505 may be selected such that the aperture size or pore size will capture the extraction material without adversely impacting the flow of the extract as the mixture flows towards an outlet conduit. Alternatively, the aperture size of the filter 505 can be selected such that the flow of extract out of the capsule extraction cell 500 is significantly impeded. In this manner, significant back pressure may be built within the interior 509 of the capsule extraction cell 500 as additional flow of extraction medium are flowed into the interior 509 of the capsule extraction cell 500, even when outlet 507 is opened or otherwise configured to receive a flow of extract. In some implementations, the filter 505 may have a mean aperture diameter of 20 µm to 90 µm, such as between 40 µm to 70 µm or between 20 µm or 40 µm. In some implementations, the filter 505 may have a weight of 30 g/m$^2$ to 100 g/m$^2$. The mean aperture diameter or weight of the filter 505 can be used in combination with the capsule extraction cell 500 with aspect ratios and/or volume ranges described above.

As shown in FIG. 6A, the top portion 506 can include a filter 505 mounted at the top portion 506 of the capsule extraction cell 500. The filter 505 can be positioned within the interior 509 of the capsule extraction cell 500. The filter 505 can cover a portion of or all of the top surface of the capsule extraction cell 500. The top portion 506 can include a small hole or outlet 507 which exposes the filter 505. The interior 509 of the capsule extraction cell 500 can be loaded with extraction material, such as coffee grounds.

The coffee system, which can be an individual or single serve coffee machine or system, can receive the capsule extraction cell 500. For example, the coffee system can include an opening or space shaped to receive the capsule extraction cell 500. When the capsule extraction cell 500 is inserted into the coffee system, a portion of the machine can close on or engage with the capsule extraction cell 500. The machine can engage the capsule extraction cell 500 such that a gasket 512 seals against the capsule extraction cell 500, such as against a surface of the second portion 506 and/or the filter 505 through the outlet 507. The second portion 506 can include an aperture to allow a flow of extract out of the capsule extraction cell 500. The aperture of the capsule extraction cell 500 can be covered with the filter 505.

As will be described further below, the extraction medium flows upward from the first portion 503 of the capsule extraction cell 500 to the second portion 506 of the capsule extraction cell 500. The extraction medium can flow upward through the coffee grounds positioned within the interior 509 of the capsule extraction cell 500, through the filter 505 and aperture of the second portion 506, and the sealed gasket 512, such that the resultant extract flows out of the second portion 506 to dispense into a cup. The extract can flow from the second portion 506 to the sealed gasket 512 towards an outlet conduit which provides a path for extract residing within the interior 509 of the capsule extraction cell 500 to be displaced or otherwise removed from the interior 509 of the capsule extraction cell 500 through the second portion 506 of the capsule extraction cell 500. The outlet conduit can also include a generally elongate, hollow section of piping or tubing.

As shown in FIG. 6B, the second portion 506 can include a filter 505 mounted at the top of the capsule extraction cell 500. The filter 505 can be positioned within the interior 509 of the capsule extraction cell 500. The filter 505 can cover a portion of or all of the top surface of the capsule extraction cell 500. The filter 505 can cover the aperture of the second portion 506 of the capsule extraction cell 500. The second portion 506 can include a first surface or layer and a second surface or layer to define a void 516 in between the first and second surfaces or layers. The first surface can be the outer surface of the second portion 506 and positioned above the void 516. The second surface can be positioned below the first surface to define a void 516. The second surface can define a boundary between the void 516 and the interior 509 of the capsule extraction cell 500. The interior of 509 of the capsule extraction cell 500 can be loaded with coffee grounds.

The coffee system, which can be an individual or single serve coffee machine or system, can receive the capsule extraction cell 500. The coffee system can include one or more needles and gaskets to engage with the capsule extraction cell 500. The system can engage the capsule extraction cell 500 such that one or more needles punctures the capsule extraction cell 500 and such that a gasket seals against the capsule extraction cell 500, such as against a bottom surface. As shown in FIG. 6B, the coffee system can include a needle 514 and a gasket 512. When the capsule extraction cell 500 is inserted into the coffee system, a portion of the machine can close on the capsule extraction cell 500. The system can engage the capsule extraction cell 500 such that the needle 514 engages the first surface of the capsule extraction cell 500 and be positioned in the void 516 of the top portion 506 and such that the gasket 512 seals against the needle 514 and the first surface of the capsule extraction cell 500. The needle 514 puncturing the first surface of the capsule extraction cell 500 can create an opening or outlet 507 at the top portion 506 of the capsule extraction cell 500.

As will be described further below, the extraction medium flows upward from the bottom portion 503 to the top portion 506 of the capsule extraction cell 500. The extraction medium can flow upward through the coffee grounds positioned within the interior 509 of the capsule extraction cell 500, through the filter 505, through the void 516, through the needle 514 and the sealed gasket 512, such that the resultant extract flows out to dispense into a cup. The extract can flow from the sealed gasket 512 towards an outlet conduit which provides a path for extract residing within the interior 509 of the capsule extraction cell 500 to be displaced or otherwise removed from the interior 509 of the capsule extraction cell 500 through the second portion 506 of the capsule extraction cell 500.

As shown in FIGS. 6A-6B, the second portion 506 can also include an outlet 507. The second portion 506 includes an outlet 507 to allow an extract to be dispensed out of the capsule extraction cell 500 through the second portion 506 (which as explained above can be the top portion 506). The outlet can include an opening and gasket as described in FIG. 6A or a needle and gasket configuration as described in FIG. 6B. The one or more needles can serve to produce one or more openings in the second portion 506. As with the inlet discussed above, the outlet can be in fluid communication with an extract outlet conduit.

Bottom Portion

Figures 7A, 7B, 7C:
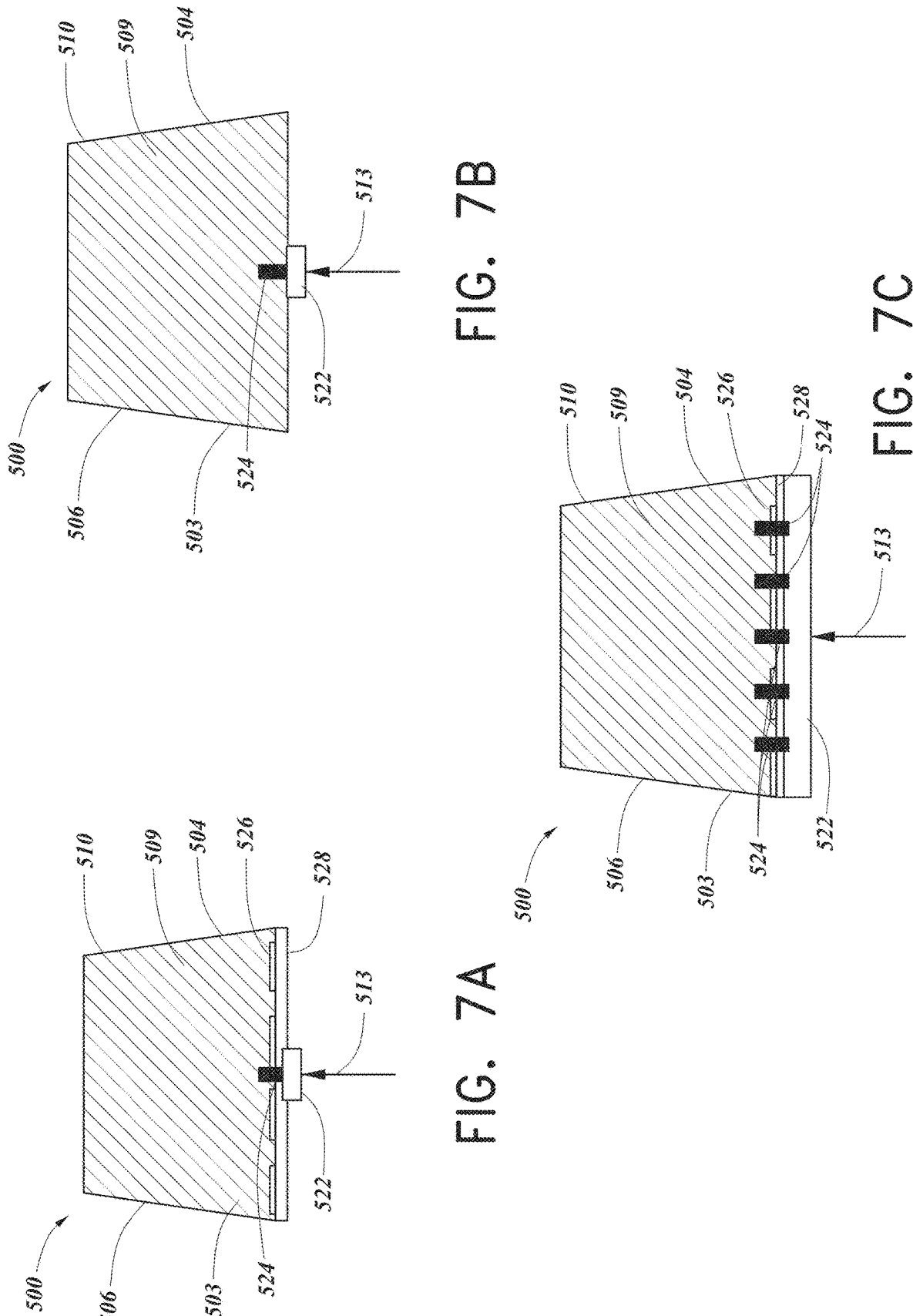
FIG. 7A schematically illustrates an embodiment of a bottom portion of a capsule extraction cell.
FIG. 7B schematically illustrates another embodiment of a bottom portion of a capsule extraction cell.
FIG. 7C schematically illustrates yet another embodiment of a bottom portion of a capsule extraction cell.

As shown in FIG. 7A, the first or bottom portion 503 can include foil 528 that can be fixed to the bottom of the capsule extraction cell 500 to enclose the interior 509. The interior 509 of the capsule extraction cell 500 can be loaded with extraction material, such as coffee grounds. The foil 528 can be permanently or temporarily fixed to the bottom of the capsule extraction cell 500. The bottom portion 503 can also include a support plate 526 which can hold or support the coffee bed positioned within the interior 509 of the capsule extraction cell 500. The support plate 526 can be positioned at the bottom of the interior 509 such that the support plate 526 is positioned above the foil 528.

The coffee system, which can be an individual or single serve coffee machine or maker, can receive the capsule extraction cell 500. When the capsule extraction cell 500 is inserted into the coffee system, a portion of the machine can close on the capsule extraction cell 500. The machine can engage the capsule extraction cell 500 such that a needle 524 pierces the foil 528 to form an inlet 513 for a flow of extraction medium. The machine can also engage the capsule extraction cell 500 such that the gasket 522 seals against the foil 528.

The extraction medium can flow through the sealed gasket 522, the needle 524 and inlet 513 formed to enter the interior 509 of the capsule extraction cell 500, such that the extraction medium flows upward through the extraction material positioned within the interior 509 of the capsule extraction cell 500. The extraction medium can then flow through the top portion 506 of the capsule extraction cell 500 as described above, such as in FIGS. 6A-6B.

As shown in FIG. 7B, the bottom portion 503 can include a bottom surface which encloses the interior 509 of the capsule extraction cell 500. The extraction material can be loaded in the interior 509 of the capsule extraction cell 500 and supported by the bottom surface of the capsule extraction cell 500. The bottom surface of the capsule extraction cell 500 can be made of the same material as the sidewalls 504 of the capsule extraction cell 500, such as metal or plastic. The coffee system, which can be an individual or single serve coffee machine or maker, can receive the capsule extraction cell 500. When the capsule extraction cell 500 is inserted into the coffee system, a portion of the machine can close on the capsule extraction cell 500. The system can engage the capsule extraction cell 500 such that a needle 524 pierces the bottom surface of the capsule extraction cell 500 to form an inlet 513 for a flow of extraction medium. The machine can also engage the capsule extraction cell 500 such that the gasket 522 seals against the foil 528.

The extraction medium can flow through the sealed gasket 522 and the needle 524 and inlet 513 to enter the interior 509 of the capsule extraction cell 500, such that the extraction medium flows upward through the extraction material positioned within the interior 509 of the capsule extraction cell 500. The extraction medium can then flow through the top portion of the capsule extraction cell 500 as described above, such as with FIGS. 6A-6B.

As shown in FIG. 7C, the bottom portion 503 can include foil 528 that can be fixed to the bottom of the capsule extraction cell 500. The interior of 509 of the capsule extraction cell 500 can be loaded with extraction material, such as coffee grounds. The foil 528 can be permanently or temporarily fixed to the bottom of the capsule extraction cell 500. The bottom portion 503 can also include a support plate 526 which can hold or support the coffee bed positioned within the interior 509 of the capsule extraction cell 500. The support plate 526 can be positioned at the bottom of the interior 509 such that the support plate 526 is positioned above the foil 528.

The coffee system, which can be an individual or single serve coffee machine or maker, can receive the capsule extraction cell 500. When the capsule extraction cell 500 is inserted into the coffee system, a portion of the machine can close on the capsule extraction cell 500. The machine can engage the capsule extraction cell 500 such that a plurality of needles 524 pierce the foil 528 to form a plurality of inlets for a flow of extraction medium. The machine can also engage the capsule extraction cell 500 such that the gasket 522 seals against the foil 528.

The extraction medium can flow upward through the sealed gasket 522, the plurality of needles 524, the corresponding inlets formed into the interior 509 of the capsule extraction cell 500, and through the extraction material positioned therein. The extraction medium can then flow through the top portion 506 of the capsule extraction cell 500 as described above, such as with FIGS. 6A-6B.

Figure 7E:
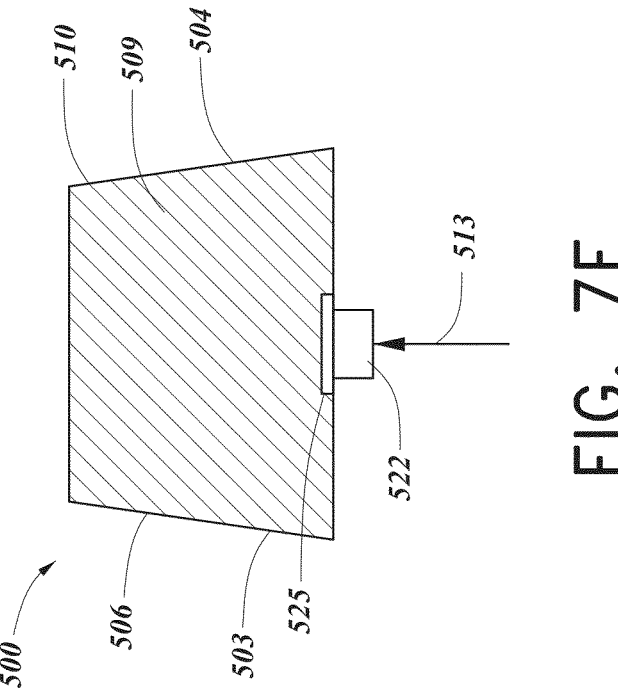
FIG. 7E schematically illustrates yet another embodiment of a bottom portion of a capsule extraction cell.
Figure 7D:
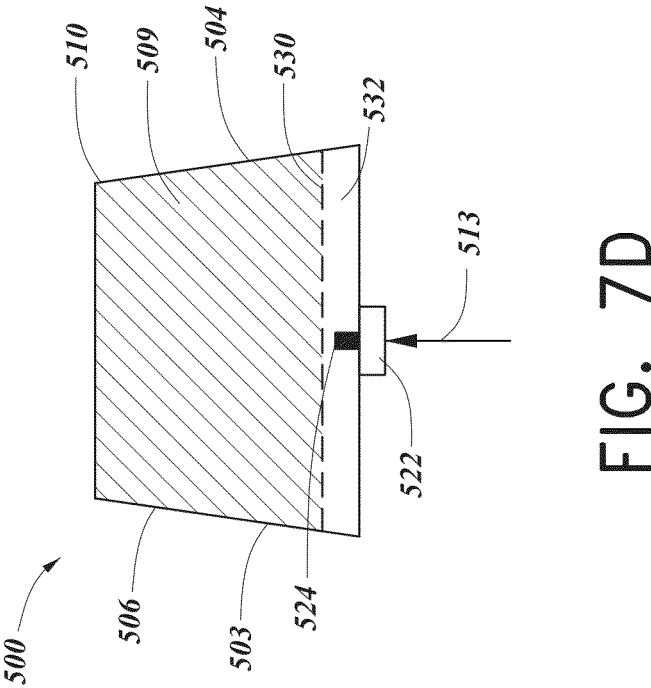
FIG. 7D schematically illustrates yet another embodiment of a bottom portion of a capsule extraction cell.

As shown in FIG. 7D, the bottom portion 503 can include a diffusion plate 530 that can be fixed to the bottom of the capsule extraction cell 500. The diffusion plate 530 can be configured to support or hold the extraction material positioned within the interior 509 of the capsule extraction cell 500. The diffusion plate 530 can be a plate with a plurality of holes that are configured to evenly distribute the extraction medium along the width of the interior 509 and along the bed of extraction material positioned within the interior 509 of the capsule extraction cell 500. The diffusion plate 530 can be positioned within the interior 509 of the capsule extraction cell 500 such that there is a void 532 between the diffusion plate 530 and the bottom surface of the capsule extraction cell 500.

The coffee system, which can be an individual or single serve coffee machine or maker, can receive the capsule extraction cell 500. When the capsule extraction cell 500 is inserted into the coffee system, a portion of the machine can close on the capsule extraction cell 500. The machine can engage the capsule extraction cell 500 such that a needle 524 pierces the bottom surface of the capsule extraction cell 500 to form an inlet 513. The needle 524 can be positioned in the void 532. The needle 524 can be configured to avoid piercing the diffusion plate 530. The system can be further configured to seal a gasket 522 against the bottom of the capsule extraction cell 500.

The extraction medium can flow through inlet 513 such that it flows the sealed gasket 522, the needle 524, through the void 532. The extraction medium then flows through the holes of the diffusion plate 530 such that the extraction medium is evenly distributed through the diffusion plate 520 and into the interior 509 of the capsule extraction cell 500. The extraction medium can then flow upward through the extraction material positioned within the interior 509 of the capsule extraction cell 500. The extraction medium can then flow through the top portion 506 of the capsule extraction cell 500 as described above, such as with FIGS. 6A-6B.

As shown in FIG. 7E, the bottom portion 503 can include a filter 525 mounted at the bottom of the capsule extraction cell 500. The filter 525 can be similar to the filter 505 as described above. The filter 525 can be positioned within the interior 509 of the capsule extraction cell 500. The filter 525 can cover a portion of or all of the bottom surface of the capsule extraction cell 500. The inlet 513 of the bottom portion 503 can include a small hole or aperture which exposes the filter 525. The interior 509 of the capsule extraction cell 500 can be loaded with extraction material, such as coffee grounds.

The coffee system, which can be an individual or single serve coffee machine or maker, can receive the capsule extraction cell 500. When the capsule extraction cell 500 is inserted into the coffee system, a portion of the machine can close on the capsule extraction cell 500. The machine can engage the capsule extraction cell 500 such that a gasket 522 seals against the bottom of the capsule extraction cell 500.

The extraction medium can flow through the sealed gasket 522 and opening to enter the interior 509 of the capsule extraction cell 500, such that the extraction medium flows upward through the filter 525 and the extraction material positioned within the interior 509 of the capsule extraction cell 500. The extraction medium can then flow through the top portion of the capsule extraction cell 500 as described above, such as with FIGS. 6A-6B.

In some embodiments, such as in any of the above embodiments, the capsule extraction cell 500 can further include a lip or flange on the bottom portion 503, such as around the perimeter of the bottom surface of the capsule extraction cell 500. The flange or lip around the perimeter of the bottom surface can engage with the individual or single serve coffee machine, such as within an opening shaped or configured to receive the capsule extraction cell 500.

The capsule extraction cell 500 can include any embodiment of the top portion 506, such as described in FIGS. 6A-6B, in combination with any embodiment of the bottom portion 503, such as described in FIGS. 7A-7E.

With continued reference to FIGS. 7A-7E, in the illustrated embodiments, the first portion 503 can include one or more inlets 513 to allow an extraction medium to be introduced into the capsule extraction cell 500 through the first portion 503 (which as explained above can be the bottom portion 503). The inlet 513 can include a needle and gasket configuration as described in FIGS. 7A-7B and 7D, a plurality of needles and gasket as described in FIG. 7C, or an opening and gasket as described in FIG. 7E. The one or more needles 524 can serve to produce one or more openings in the first portion 503 which can act as one or more inlets 513 for a flow of extraction medium. The inlet 513, in turn, can be in fluid communication with an inlet conduit. The inlet conduit may comprise a generally elongate, hollow section of piping or tubing serving to provide a path for the flow of an extraction medium (such as water or gas) towards the inlet 513 from any suitable source. In this manner, the inlet conduit is in fluid communication with the interior 509 of the capsule extraction cell 500 through the inlet 513, such as through the one or more needles and gasket or through the opening and gasket. Thus, a supply of water—or any other extraction medium—may be introduced into the interior 509 of the capsule extraction cell 500 through the inlet conduit, the inlet conduit 513 of the first portion 503. While one inlet is illustrated in FIGS. 7A-7B and 7D-7E, more than one inlet 513 can be used or the inlet 513 can be divided into sub-inlets. For example, as shown in FIG. 7C, there can be more multiple inlets.

In the embodiment illustrated in FIG. 7E, the bottom portion 503 can be fitted with a filter 505, which may be a coarse filter. In this manner, extraction material can be prevented from flowing back towards the inlet conduit. In certain configurations, the coarse filter 505 may have a mean aperture diameter ranging from 20 to 150 μm, such as between 40 to 70 μm or between 20 to 40 μm. In certain configurations, the coarse filter 505 may have weight ranging from 30 g/m² to 100 g/m².

Figure 8:
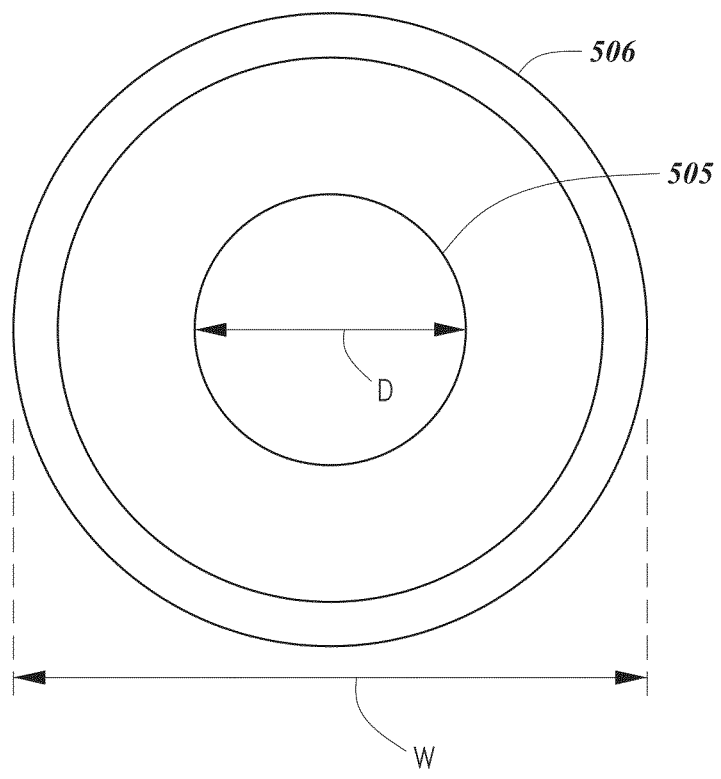
FIG. 8 schematically illustrates an interior view of a top portion and filter of the extraction cell of FIGS. 6A-6B.

FIG. 8 depicts an interior view of an embodiment of the extraction cell's 500 second portion 506. As can be seen in FIG. 8, the filter 505 can be disposed adjacent to the aperture such that the filter 505 covers the aperture substantially completely. In this manner, the spent coffee grounds may be separated from the extraction slurry such that only the substantially homogenous extract is permitted to flow through the filter 505, into the aperture or outlet, and towards the extract outlet conduit. In certain configurations, the filter 505 can have a diameter D that is approximately 7% to 12% of the width W of interior 509 of the capsule extraction cell 500, and in certain embodiments 10% of the width W of interior 509 of the capsule extraction cell 500. In some embodiments, the diameter D of the filter is substantially equal to the diameter D of the aperture. Nevertheless, the diameter D of the filter 505 may be modified to accommodate the desired extraction characteristics. For instance, in certain configurations, the diameter of the filter 505 may be increased to reduce the back pressure exerted on the contents of the capsule extraction cell 500. Alternatively, in certain configurations, the diameter D of the filter 505 may be reduced to slow the rate at which the extract may be displaced from the interior 509 of the capsule extraction cell 500. The diameter of the filter 505 may be modified in isolation. However, in certain configurations, the diameter of the filter 505 may be modified in conjunction with corresponding modifications to the diameter of the aperture or cell. For example, in certain configurations the diameter D of the aperture and the filter 505 may have a diameter that is 7% to 12% of the cell inner diameter and in certain embodiments 10% of the cell inner diameter. In some examples, the area of the outlet and the filter 505 may have an area that is 7% to 12% of the area of the cell.

Likewise, the location of the filter 505 with respect to the second portion 506 may be varied. For instance, the filter 505 may be disposed substantially centered on the second portion 506. In alternate embodiments, the filter 505 may be offset such that the outer circumference of the filter intersects with the center of the second portion 506. The filter 505 diameter and/or area ratio described above can be used alone or in combination with the mean aperture diameter, the capsule extraction cell 500 aspect ratios and/or volume ranges described above.

Embodiments and/or components the capsule extraction cell 500 can be used in combination with the method described below. In addition, the embodiments and/or components the capsule extraction cell 500 can be used to create cold extracts according to the embodiments described below.

As will be explained below, the illustrated arrangement has certain advantages. For instance, in some configurations, the first portion 503 and/or the second portion 506 may be removed either partially or completely to facilitate the introduction of a desired extraction material. In certain configurations, at least one of the first portion 503 or second portion 506 may be implemented with an opening through which an extraction material can be loaded into the interior 509 of the capsule extraction cell 500, the opening can then be and sealed with a cover, such as foil. In some embodiments, the first and second portion 503, 506 can be permanently attached to each other or integrally formed with each other. It is also possible for the capsule extraction cell 500 to have more than two portions. For instance, as described above, the second portion 506 may be implemented as a removable or permanently enclosed, though various other implementations may be used. As another example, the first portion 503 can be implemented as foil fixed to the bottom surface of the capsule extraction cell 500 or as a removable cover. For example, the extraction material can be loaded into the capsule extraction cell 500 through the open bottom portion. The extraction material can be then sealed into the interior 509 of the capsule extraction cell 500 by fixing the foil to the bottom surface of the capsule extraction cell 500. In other examples, the first portion 503 or the second portion 506 can be configured to be continuous or integral with the sidewall 504.

Moreover, in certain arrangements, the orientation of the capsule extraction cell 500 can be modified such that the orientation of the first portion 503 and the second portion 506 are reversed or located in other positions such as positioning the capsule extraction cell 500 on its side such that the first portion 503 and the second portion 506 are located at the same or near the same elevation. While the orientation can be modified from the orientation illustrated in FIGS. 6A-6B and 7A-7E, ascending flow of the extraction medium upward through the cell 500 has been found to have certain advantages in producing a more uniform and consistent product with reduced processing time.

Example Extraction Method for Capsule Extraction Cell

To facilitate presentation, the methods are discussed in the context of preparing a cold extraction of coffee or tea, from roasted ground coffee or espresso beans and loose leaf teas of packed tea pellets. However, it will be apparent to the skilled artisan that the methods may be employed to prepare a variety of different brews, including teas and various other infusions. The process can include the use of an extraction medium (also referred to herein as solvent) not exceeding 100° C., and without using pressures exceeding dozens of atmospheres. For instance, in certain configurations described below, the extraction medium may be between 0° C. and 100° C. In some embodiments, the temperature of the extraction medium may be between 10° C. and 30° C. and in certain embodiments between 20° C. and 30° C. In certain embodiments, the pressure within the extraction chamber is between 0 and 16 bar(g). In certain configurations, the pressure is between 0-2 bar(g). In certain configurations, the temperature and pressure ranges mentioned above can be combined. In certain implementations, the extraction medium can be a liquid such as water but in certain implementations the extraction medium can be other liquids. In additional configurations, certain inert gasses may be used as well to displace the extraction medium. In certain implementations, the extraction medium is at ambient temperatures when added to the extraction cell as described below. In addition, while the process is described in the context of an upward flow orientation and upward flow, the capsule extraction cell 500 can be oriented in other positions such the flow is directed downwards, horizontally or in between orientations. As noted above, ascending flow of the extraction medium upward through the capsule extraction cell 500 has been found to have certain advantages in producing a more uniform and consistent product with reduced processing time.

As previously described, and as shown in FIGS. 6A-6B and 7A-7E, the extraction material, which can be roasted, ground coffee or espresso bean, can be loaded or pre-loaded into the interior 509 of the capsule extraction cell 500. The extraction material may be added until the interior 509 of the capsule extraction cell 500 is filled partially or substantially completely. In certain embodiments, between 10 to 20 grams of extraction material are loaded into the cell 500, in certain embodiments 10 grams and in certain embodiments 12 grams of material are loaded into the cell 500. In certain embodiments, extraction material in the form of ground coffee that has been ground to a particle size between 200 μm and 400 μm, such as between 270 μm to 370 μm, is loaded into the cell 500. In certain embodiments, extraction material in the form of ground coffee that has been ground to a mean particle diameter between 200 μm and 400 μm, such as between 270 μm to 370 μm, is loaded into the cell 500. In such embodiments, this amount of extraction material can yield a single serving of cold brew coffee. In some embodiments, the single serving size may be between 6 to 10 fl. oz. and in certain embodiments be 8 fl. oz.

As discussed above, the extraction material can vary broadly within the context of this disclosure. For instance, in certain configurations the extraction material may include coffee beans, such as roasted, ground coffee or espresso beans. In addition, the level of grind can also enhance extraction characteristics and improve the time to delivery of a final product. For instance, in certain configurations, extraction proceeds more quickly when finely ground coffee beans are used. In some embodiments, the coffee beans may be ground to a mean particle diameter of 200 μm to 400 μm and in certain embodiments between 250 μm to 500 μm or 270 μm to 370 μm. However, additional or alternate extraction materials may also be used. For instance, in certain configurations the fruits, leaves, roots, and/or bark of other plants and herbs may be extracted and different mean particle sizes or diameters can be used.

As noted above, on certain embodiments, the extraction material is loaded until the density of the extraction material in the cell 500 is between 0.2 g/ml-0.4 g/ml. In certain embodiments, the extraction material is ground coffee is loaded until the density of the extraction material in the cell 500 is between 0.3 g/ml-0.33 g/ml.

After the extraction material has been loaded into the extraction cell 500, a flow of an extraction medium may be introduced, as previously described. As with the extraction material, a wide variety of potential extraction mediums can be employed. To facilitate presentation, the present disclosure frequently refers to the use of water as the extraction medium, though it will be apparent to the skilled artisan that additional or alternate extraction mediums such as gas, can be used in the methods disclosed herein.

In some embodiments, the extraction medium may be water. As noted above, in certain embodiments, the extraction medium can be water that is not temperature treated (e.g., not heated) before the water is delivered to capsule extraction cell 500. That is, in certain embodiments the water is delivered to the capsule extraction cell 500 at ambient temperatures. In certain embodiments, the extraction medium (e.g., water) does not exceed 100° C. and in certain configurations the extraction medium may be between 0° C. and 100° C. and in some embodiments, the temperature of the extraction medium may be between the ranges of 10° C. and 30° C., 15° C. and 30° C. or 20° C. and 30° C. The flow of extraction medium flows from the inlet conduit, through the inlet 513, and into the interior 509 of the capsule extraction cell 500. In the illustrated arrangement, the flow of extraction medium flows generally upwards into the interior 509 of the capsule extraction cell 500, first permeating the lowest layers of the extraction material before proceeding vertically throughout the capsule extraction cell 500. However, as noted above, the capsule extraction cell 500 can be orientated differently such that the extraction medium flows downwardly, horizontally or in between a vertical and horizontal direction.

As described above, the extraction medium may flow from an inlet 513 conduit through the inlet 513 of the capsule extraction cell 500, which may be in the form of a needle and/or opening at the bottom portion 503 of the capsule extraction cell 500. The flow of extraction medium may move upward through the extraction material to create an extraction slurry within the interior 509 of the capsule extraction cell 500. In this manner, the desirable compounds of the material to be extracted from the extraction material may be pulled into the extraction medium and dissolved to form an extract. The flow of extraction medium may be continuous to displace the extract from the interior 509 of the capsule extraction cell 500. As described above, the extract can then flow through the filter 505 and through the outlet 507 of the capsule extraction cell 500, which may be a needle and/or an opening at the top portion 506 of the capsule extraction cell 500, and to the outlet conduit, to be dispensed into a cup.

The flow of extraction medium can be stopped or discontinuous allowing the extraction slurry to steep within the interior 509 of the capsule extraction cell 500. The stop time could be over a period ranging from 1 second to 20 seconds and could be broken up into segments within the overall steep time of the extraction medium through the capsule extraction cell 500. The overall steep time can be regulated with the flow rate, such that within less than 3 minutes of introducing the flow of extraction medium into the extraction cell and in certain embodiments, less than 2 minutes, extract can be extracted from the extraction material by the extraction medium.

As the flow of extraction medium flows into the interior 509 of the capsule extraction cell 500, the extraction material of the capsule extraction cell 500 can be pressed towards the second portion 506. This includes the extraction material to be extracted, as well as any gases resident within the interior 509 of the capsule extraction cell 500. In some embodiments, the outlet 507 may be opened such that the upward flow of the extraction medium expels gases (such as air) resident in the capsule extraction cell 500 through second portion 506, through the outlet 507. In some embodiments, the outlet 507 may remain open as the extraction medium flows upward through the interior 509 of the capsule extraction cell 500. In some examples, the outlet 507 may remain open and the pressure may be built within the interior 509 as the flow travels within the interior 509 of the capsule extraction cell 500.

In some embodiments, once sufficient air has been expelled from the capsule extraction cell 500, the extraction medium may flow upward into the interior 509 of the capsule extraction cell 500 and the pressure may build to a desired level within the interior 509. Once the extraction medium has traveled through the extraction material and reached the second portion 506 (thus being transformed to extract), extract may be retrieved from the outlet 507.

In addition to displacing the resident air, the upward flow of extraction medium can provide certain advantages. First, the upward flow of extraction medium can more evenly wet the extraction material within the capsule extraction cell 500. Even wetting of the extraction material can facilitate even extraction, preventing regions of the extraction material from over-extracting while other regions remain under-extracted.

Second, the upward flow of the extraction material can tamp the extraction material against the second portion 506 of the interior 509 of the capsule extraction cell 500. In this manner, efficient and autonomous extraction is facilitated by upward flow and eliminates the need for additional tamping components or user intervention. Since the upward flow of the extraction material provides the requisite tamping force, an extraction process may be initiated and left unattended, without requiring a user to stand by and tamp the coffee or espresso grounds after they have been loaded in the capsule extraction cell, or after the extraction solvent has been introduced. Moreover, the degree to which the grounds are tamped can be controlled by the modulating amount of solvent introduced into the extraction cell, and thus, the internal pressure induced by the solvent.

Third, tamping of the extraction material against the second portion 506 can aid even extraction. Since the extraction material is tamped against the second portion 506 of the capsule extraction cell 500 and compacted, the risk of channeling is reduced. Channeling can occur where the interstitial spaces between extraction material are irregular; as the extraction medium flows through the extraction material, the extraction medium may be diverted towards larger interstitial spaces. This phenomenon may lead to over-extraction of the extraction material adjacent to larger interstitial spaces, and under-extraction of the extraction material adjacent to smaller spaces. Moreover, such channeling can inhibit plug flow formation by preventing or reducing the flow of extraction medium from achieving or maintaining a substantially constant velocity. Conversely, where an even, upward flow of extraction medium is employed, the extraction material can tamp against the second portion 506 of the capsule extraction cell 500, compressing the grounds into a cake. The compressed extraction material exhibits more uniform interstitial spacing, facilitating uniform extraction, and yielding an extract having more refined flavor characteristics.

The user may control many aspects of the extraction process by tailoring the flow rate to suit a particular embodiment. For instance, the internal pressure—and the degree to which the extraction material is tamped against the second portion 506—can be dependent on the rate at which extraction medium is introduced into the interior 509 of the capsule extraction cell 500. In some embodiments, the flow rate ranges from 15 ml/min to 50 ml/min, such as between 20 ml/min to 40 ml/min. In certain configurations, the mean flow rate is 30 ml/min. In some examples, during the extraction process, the flow rate into the cell is constant or substantially constant. In some examples, the flow rate into the cell 500 varies within 50% to 100% during the extraction process and in certain embodiments the flow rate varies within 75% to 100% of the initial flow rate and in some embodiments within 90% to 100% during the extraction process. In certain embodiments, the flow rate of the extraction medium into and through the cell 500 is constant during the extraction process. In other examples, the flow rate may be modulated throughout the process. For example, the flow rate may be stopped and then ramped up during the process. For example, the flow rate may be continuous during the process. For example, the flow rate may be continuous and substantially constant during the process. For example, the flow rate may be continuous and may be modulated during the process.

In various embodiments, flow rates are set to achieve plug flow. Where a given flow rate is too high, the extraction solvent can exploit irregularities within the interstitial spaces of the coffee or espresso grounds to form channels through the cake. Such channels can be associated with uneven extraction. Similarly, where the flow rate is too low, the velocity of solvent can be insufficient to induce plug flow. As such, the desired flow rate can be affected by the geometry of the extraction cell, and the contents residing therein. Accordingly, in various configurations of the methods and devices described herein, the flow rate is gauged in relation to the volume of the extraction medium residing within the interior of the extraction cell. For instance, in certain configurations, the flow rate may be configured to flow through the available volume of the extraction cell and through the outlet 507 over a period of less than 3 minutes; in certain embodiments less than 2.5 minutes, and in certain embodiments less than 2 minutes. In such configuration, the steep time which is defined as when a portion or aliquot of extraction medium is introduced into the cell 500 and contacts the initial portion of the extraction material and when this portion or aliquot of extraction material is extracted from the filter can be can be regulated such that the steep time of the portion or aliquot of extraction medium being withdrawn from the filter is less than 3 minutes; in certain embodiments, less than 2.5 minutes, and in certain embodiments the steep time is less 2 minutes. As noted above, the flow of extraction medium through the cell 500 can be continuous or substantially continuous. In certain embodiments, this can be achieved by supplying a constant or substantially constant flow rate of extraction medium into the cell 500 through the inlet.

As the flow of water flows into the interior 509 of the capsule extraction cell 500, an extraction slurry is formed. The extraction slurry is typically a heterogeneous mixture comprising the extraction material to be extracted in solution with the extraction medium. For instance, in certain configurations, the extraction slurry may be roasted, ground coffee or espresso beans in solution with water. The strength of the resultant extract is affected by certain characteristics of the extraction slurry. For instance, the ratio of roasted, ground coffee or espresso beans to water has an effect on the final strength of the brewed extract. Similarly, the temperature of the extraction slurry, as well as the pressure under which it is maintained all have a similar effect on the ultimate beverage characteristics, as will be discussed in more detail below.

The extraction slurry can maintained within the interior 509 of the capsule extraction cell 500 without steeping or with a steeping time that is less than 3 minutes and in some embodiment less than 2.5 minutes and in certain embodiments less than 2 minutes.

The extraction slurry is typically maintained at a substantially constant temperature and pressure throughout the process, though some variations are contemplated. For instance, in certain configurations, the flow may have at temperature at approximately ambient temperatures. In such configurations, the capsule extraction cell may be maintained at a temperature or a low temperature. In such configurations, the temperature of the flow may be at an ambient temperature or a low temperature. In certain configurations, the temperature of the flow may be 0° C. to 100° C. In certain configurations, the temperature of the flow may be 10° C. to 30° C. 15° C. to 30° C. or 20° C. to 30° C.

Likewise, as the flow of extraction medium moves through the extraction slurry, the pressure within the capsule extraction cell 500 is typically maintained. For instance, in certain configurations the flow of water may be flowed into the interior 509 of the capsule extraction cell 500 until the internal pressure exceeds one atmosphere. Once the desired pressure has been built, the flow may continuously move upward through the capsule extraction cell 500 to displace extract through an extract outlet conduit. The pressure within the extraction chamber may then be maintained at a substantially constant level as extraction medium is continuously introduced and extract is continuously displaced and extracted. In certain embodiments, the pressure within the extraction chamber is between 0 and 16 bar(g). In certain configurations, the pressure is between 0 and 2 bar(g)

The extract can be retrieved from the capsule extraction cell 500. The extract can be displaced by a continuous flow of extraction medium into the interior 509 of the capsule extraction cell 500. The continuous flow of extraction medium flows upwards from the first portion 503, displacing the contents of the capsule extraction cell 500 upwards towards the filter 505. The filter 505 serves to separate the heterogeneous extraction slurry into its constitutions: the extract and the spent extraction material. The continuous flow of extraction medium is allowed to flow through the inlet conduit into the interior 509 of the capsule extraction cell 500 via the inlet.

In various configurations of the methods and devices described herein, the flow rate of the extraction medium is gauged in relation to the volume of the flow of extract. Likewise, in certain configurations a given flow rate will depend on the size of the extraction cell, the mean particle diameter or particle size of the material to be extracted, the diameter of the filter, and the aperture size or weight of the filter.

Due to the flow rate, the cylindrical nature of the illustrated embodiment of the capsule extraction cell 500, and the back pressure induced by the filter 505, a plug flow can be induced as the continuous flow of extraction medium is introduced into the interior 509 of the capsule extraction cell 500. As discussed above, a plug flow is characterized by a substantially constant velocity across the radial profile of the capsule extraction cell 500. The substantially constant velocity across the radial profile of the extraction cell can inhibit mixing adjacent layers—specifically, between a first portion of extraction medium and a second portion of extraction medium.

Displacing the extract in this manner can increase efficiency because no or very little steep time is required and additional equipment is not required to remove the extract from the interior 509 of the capsule extraction cell 500; displacing the extract simply utilizes the network of inlets and outlets used previously to introduce the extraction medium. Thus, the extract can be expelled from the capsule extraction cell 500 without undue dilution, and without necessitating additional retrieval procedures or components and without stopping the flow of extraction material into the cell 500. Lacking superfluous retrieval conduits or mechanisms, consequential transfer losses are reduced, thus ensuring that high extraction yields may be maintained. Additionally, the extract can be created and expelled from the capsule extraction cell 500 quickly and without steeping. The lack of steep time conveniently allows the extract to be provided on demand, such as less than 3 minutes or less than 2.5 minutes or 2 minutes.

The extraction cycle is complete once the desired volume of extract is collected. In some embodiments, the desired volume of extract may be one portion, which may be between 6 to 10 fl. oz. and in certain embodiments be 8 fl. oz. These ranges of measurements are particularly advantageous for the capsule extraction cell 500 for smaller volumes. In certain embodiments, the cycle may begin again by inserting another capsule extraction cell 500. The extract can be finished product that can be delivered to for consumption. According to certain embodiments, at least a portion of the extract is delivered to the consumer for consumption after only a single pass through the extraction material. As noted above, embodiments of the extraction methods can be used in combination with the capsule extraction cell 500 described above with respect to FIGS. 6A-6B and 7A-7E. In addition, the embodiments of the extraction method described with above can be used to create cold extracts according to the embodiments described below.

In certain embodiments, the extraction material can include layering different extraction material such as providing different coffee blends to provide different beverage profiles. In addition, various additives or infusions can be added to the extraction material to enhance the flavor of the final product. It is also anticipated that multiple extraction cells can arranged in series or parallel to module capacity.

Additionally, the interior 509 of the capsule extraction cell 500 may be fitted with one or more sensors to monitor the internal characteristics of the capsule extraction cell 500. For instance, in certain configurations, the interior 509 of the capsule extraction cell 500 may include a temperature sensor, which allows the user to monitor the temperature of the contents residing within the interior 509 of the capsule extraction cell 500. Moreover, in certain configurations, it may be advantageous to dispose multiple pressure sensors within the interior 509 of the capsule extraction cell 500 such that the internal pressure can be monitored. In certain configurations, the one or more sensors may be coupled with the controller to automate certain aspects of the extraction. For instance, in some configurations, a pressure sensor may be disposed within the capsule extraction cell 500 and communicably coupled with a controller. In this manner, the pressure within the capsule extraction cell 500 may be monitored as the cell fills with extraction medium. As noted herein, in certain embodiment, the flow into and out of the capsule extraction cell 500 can be controlled manually and/or semi-manually.

Example Embodiment Capsule Extraction Cell System

Figure 9:
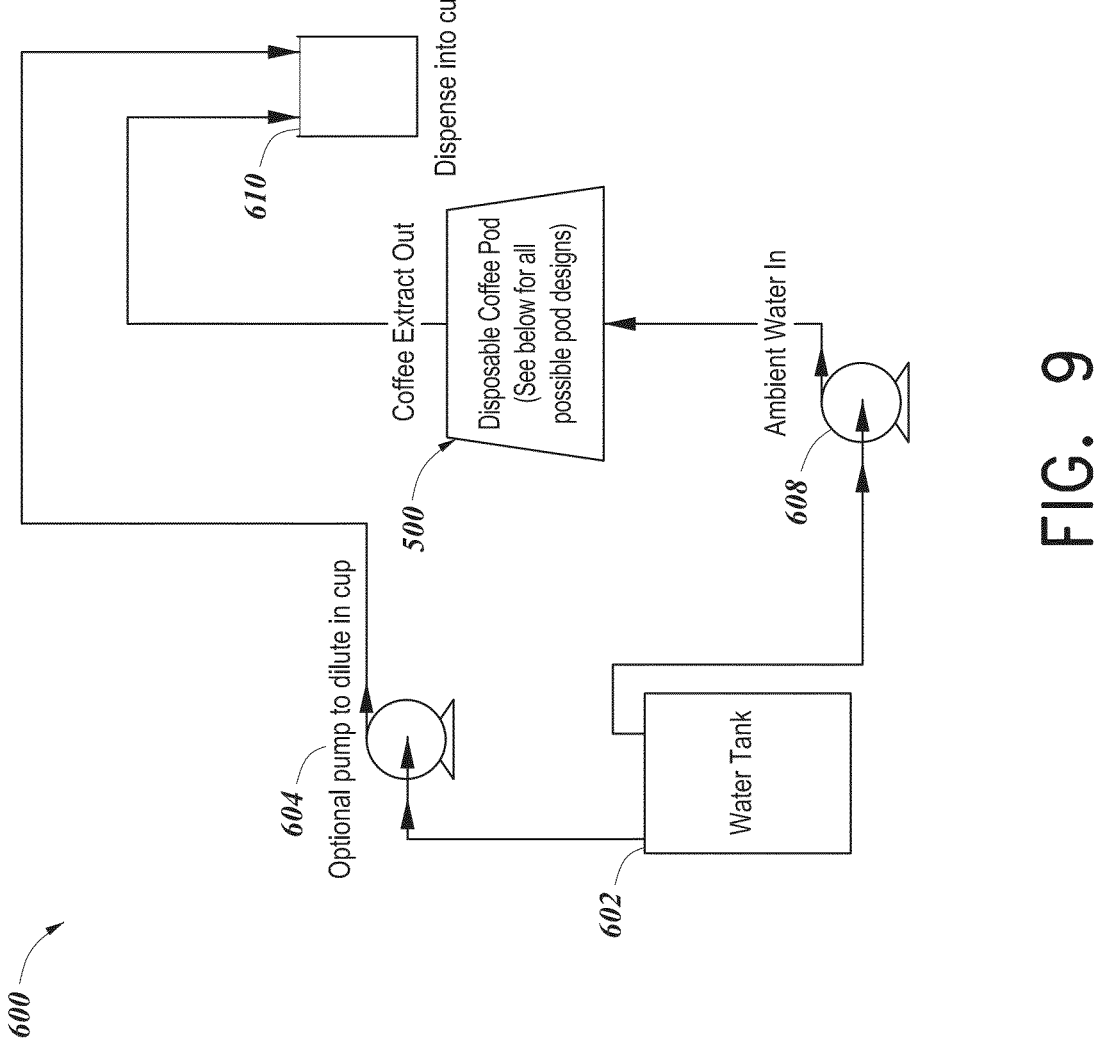
FIG. 9 is a schematic system of a capsule extraction cell control system.

In some examples as described in FIGS. 6A-6B, 7A-7E, and 8 above, the capsule extraction cell 500 can be used to produce extractions on a small scale, such as for an individual beverage on demand like a single serving size as described above. FIG. 9 schematically illustrates an embodiment of a capsule extraction cell system 600 such as for single use or individual coffee systems.

The capsule extraction cell system 300 can include an extraction cell 500 as similar to the embodiment described above in FIGS. 6A-6B, 7A-7E and 8. The system 600 can be used to produce cold brew. To facilitate presentation, the capsule extraction cell system 600 is frequently described in the context of an extraction material in the form of tea leaves or ground coffee beans, to brew an extract that is a tea or coffee extract with an extraction medium that is water. However, as noted above, certain features and aspects of the present disclosure can be applied in other contexts as well.

The capsule extraction cell system 600 can include a space configured to receive the capsule extraction cell 600. The capsule extraction cell system 600 can further include an engagement mechanism which closes and seals the pod or cell 500. The engagement mechanism can include a needle to pierce the capsule extraction cell 500 and create an opening for the inlet at the bottom portion 503 of the capsule extraction cell 500 to receive the flow of extraction medium. The engagement mechanism can include a gasket to seal against the capsule extraction cell 500.

As shown, the capsule extraction cell system 600 includes a source of extraction medium. The source of extraction medium can be a tank or reservoir 602 that is filled with extraction medium. A pump 608 can operate to lead the extraction medium from the tank 602 to the bottom of the capsule extraction cell 500. In this manner, the extraction medium, such as ambient water, can be introduced into the capsule extraction cell 500 via the pump 608. As previously described, the pump 608 can operate to pump the first flow of extraction medium at a flow rate ranging from 10 ml/min to 50 ml/min, such as between 20 ml/min to 40 ml/min and in certain embodiments a flow rate of 30 ml/min. The extraction medium can be introduced from a source of extraction medium, such as the tank 602, into a bottom portion of the capsule extraction cell 500. The extraction medium can be water, such as ambient water, which can be considered a first flow of water. The extraction medium can be flowed upward from the bottom portion toward the top portion of the capsule extraction cell 500 and through the extraction medium within the capsule extraction cell 500. The water flowing upward can extract desirable compounds of the extraction material and pulled into the extraction medium and dissolved to form an extract. The extract can then be pushed out through the filter 505 and to create extract or concentrate. The concentrate or extract can be dispensed outside of the capsule extraction cell 500.

In some embodiments, the system 600 can optionally include a second pump 304. The concentrate or extract dispensed from the capsule extraction cell 500 can then be further diluted by a second flow of water via a second pump 604. The second flow of water can come from the tank 602 or another source. The second pump 604 can operate to pump the first flow of extraction medium at a flow rate ranging from 50 ml/min to 150 ml/min, such as between 80 ml/min to 150 ml/min and in certain embodiments a flow rate of 100 ml/min. The diluted concentrate or extract can then be consumed as still cold brew.

The extraction cell system 600 use of ambient water advantageously does not require a water heater or cooler. This advantageously allows the use of drinkable water that is easily accessible to consumers, such as water straight from the tap, which can be used to fill the tank 602 and used throughout the system without further additional treatment.

During the extraction process embodiments described herein, a portion of the extraction medium can flow continuously or substantially continuously through the extraction cell during the extraction process. During the extraction process embodiments described above, there can be a constant or substantially constant flow rate of a portion of the extraction medium into the extraction cell during an extraction process. During the extraction process embodiments described above, there can be a constant or substantially constant flow velocity maintained across the radial axis of the chamber of the extraction cell during an extraction process and as the extract is being formed and removed from the extraction cell.

Example Embodiment Extraction Cell System for White Coffee

Figure 10:
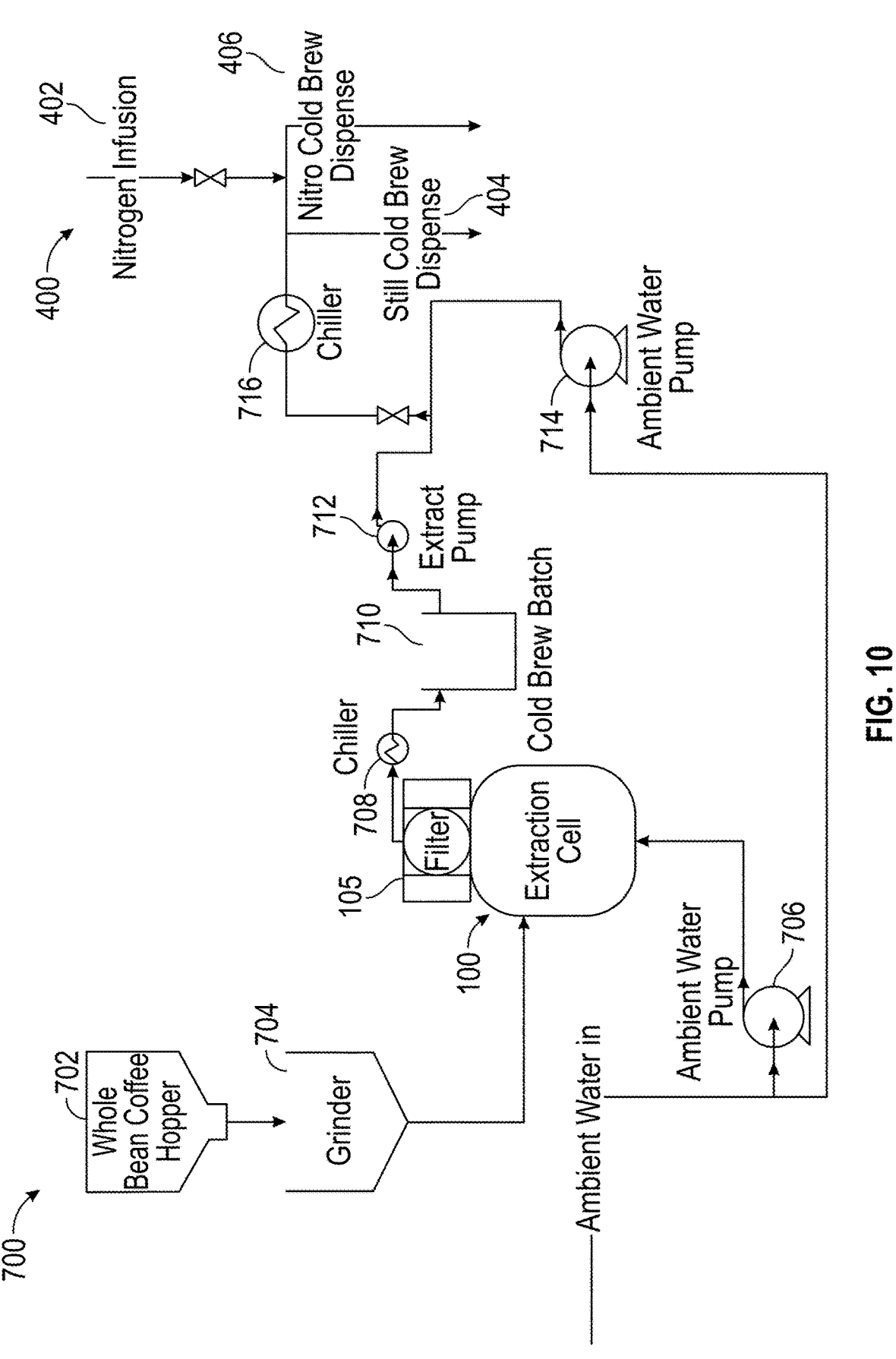
FIG. 10 is a schematic system of an extraction cell system for white coffee with nitrogen infusion.

In some examples as described in FIGS. 1-4 above, the extraction cell 100 can be used to produce extractions from white coffee, which can be coffee that has been roasted at lower temperatures and for less time, such as between 250° F. to 290° F. for 4 to 7 minutes, resulting in a very light coffee bean. In some examples, as shown in FIG. 10, the extraction cell 100 can be used to a produce extractions from white coffee, which can produce lighter colored extract and provide a different taste profile or texture compared to other roasts. For example, white coffee extracts from the process can have a very mild flavor and a natural sweetness. The color of the coffee extracts from this process can have a grey or light green color. The optimal extraction cell is important to ensure that the white coffee extract can be brewed quickly and efficiently, while still maintaining a high concentration and the desired characteristics of the extract (such as taste, color, and texture).

FIG. 10 schematically illustrates an embodiment of an extraction cell system 700 for white coffee with a nitrogen infusion. The extraction cell system 700 can include an extraction cell 100 for larger volumes or smaller volumes, as described herein. As previously described, the system 700 can also be decreased in scale to produce cold brew at a small scale, such as described above in FIGS. 1-4. This extraction cell system 700 can also be increased in scale to produce cold brew at a large scale, such as described in FIG. 5.

The extraction cell system 700 can include an extraction cell 100 as similar to the embodiment described in FIGS. 1-4. The system 700 can be used to produce cold brew. To facilitate presentation, the extraction cell system 700 is frequently described in the context of an extraction material in the form of white coffee, to brew an extract that is a white coffee extract with an extraction medium that is water. However, as noted above, certain features and aspects of the present disclosure can be applied in other contexts as well.

As shown, the extraction cell system 700 includes one or more sources of extraction medium. The one or more sources of extraction medium can include a whole bean white coffee hopper 702 that is fed to a grinder 704 to produce white ground coffee. White coffee whole beans can be particularly hard due to the high water content, which can make it difficult to grind. To address this, the white coffee beans can be loaded into a grinder 704 with a high grind torque or a high starting force. Alternatively, the grinder 704 can be started or running before whole bean white coffee is loaded into the grinder 704. This will allow the running grinder 704 to have a high force when the whole bean white coffee is loaded into the running grinder 704 which can provide an adequate starting force to grind the whole bean white coffee. In some examples, the preground white coffee grounds can be loaded into the grinder 704. The grinder 704 can then further grind the preground white coffee grounds.

The grinder 704 can then fill the extraction cell 100 with ground white coffee as the extraction medium, such that the extraction medium is positioned within the interior of the extraction cell 100. The extraction cell 100 can be filled with an extraction medium as described above, such as through a removable cover or through removing a portion of the extraction cell 100. An extraction medium, such as ambient water, can be introduced into the extraction cell 100 through a water pump 706. The extraction medium can be introduced from a source of extraction medium into a bottom portion of the extraction cell 100. The extraction medium can be water, such as ambient water, which can be considered a first flow of water. The extraction medium can be flowed upward toward the top portion of the extraction cell 100 and through the extraction medium within the extraction cell 100. The water flowing upward can extract desirable compounds of the extraction material and pulled into the extraction medium and dissolved to form a white coffee extract or concentrate. The white coffee extract or concentrate can then be pushed out through the filter 105 and to create the white coffee extract or concentrate. The white coffee concentrate or extract can be dispensed outside of the extraction cell 100.

In some embodiments, the extraction medium may be water. As noted above, in certain embodiments, the extraction medium, which can be water that is not temperature treated (e.g., not heated) before the water is delivered to extraction cell 100. That is, in certain embodiments the water is delivered to the extraction cell 100, such as from the first water pump 706, at ambient temperatures. In certain embodiments, the extraction medium (e.g., water) does not exceed 100° C. and in certain configurations the extraction medium may be between 0° C. and 100° C. and, in some embodiments, the temperature of the extraction medium may be between the ranges between 10° C. and 30° C., 15° C. and 30° C., or 20° C. and 30° C.

The white coffee extract or concentrate from the extraction cell 100 can then be cooled or chilled in a chiller 708. In some examples, the white coffee extract or concentrate can be chilled to a temperature of 5° C. to 15° C., and in certain embodiments, between 10° C. to 12° C. The chilled white coffee extract or concentrate can then be dispensed into a reservoir 710.

The white coffee extract or concentrate can then be dispensed from the reservoir 710 to outside of the reservoir 710 through an extract pump 712. The white coffee concentrate or extract can then be further diluted by a second flow of water through a second water pump 714. The second flow of water, such as ambient water, can come from the same source of extraction medium as the first water pump 706 or another source (not shown).

The white coffee extract or concentrate from the extraction cell 100 can then be cooled or chilled in a second chiller 716. In some examples, the white coffee extract or concentrate can be chilled to a temperature of less than 10° C., and in certain embodiments, less than 5° C. The chilled white coffee extract or concentrate can then be processed through a nitrogen infusion system 400. The diluted white coffee concentrate or extract can also be processed through a nitro cold brew system 400. In this nitro cold brew system 400, white coffee concentrate or extract can be infused with nitrogen 402 to produce nitro white coffee cold brew 406. The use of the first and/or second chillers 708, 716 can chill the white coffee concentrate or extract before infusion with nitrogen, which can advantageously allow the white coffee concentrate or extract to be at the desired temperature to allow it to be infused with the nitrogen gas and allows the resultant nitro white coffee cold brew 406 to be served at the desired temperature without the use of ice. In some embodiments, the white coffee concentrate or extract can be infused with other types of gas, such as carbon dioxide or mixed gases.

The diluted white coffee concentrate or extract can also be consumed as still white coffee cold brew 404, without being infused with nitrogen or any other gas. Similarly, the use of the first and/or second chillers 708, 716 can chill the still white coffee cold brew 404 before being dispensed, which can advantageously allow the still white coffee cold brew 404 to be served at the desired temperature without the use of ice.

Figure 11:
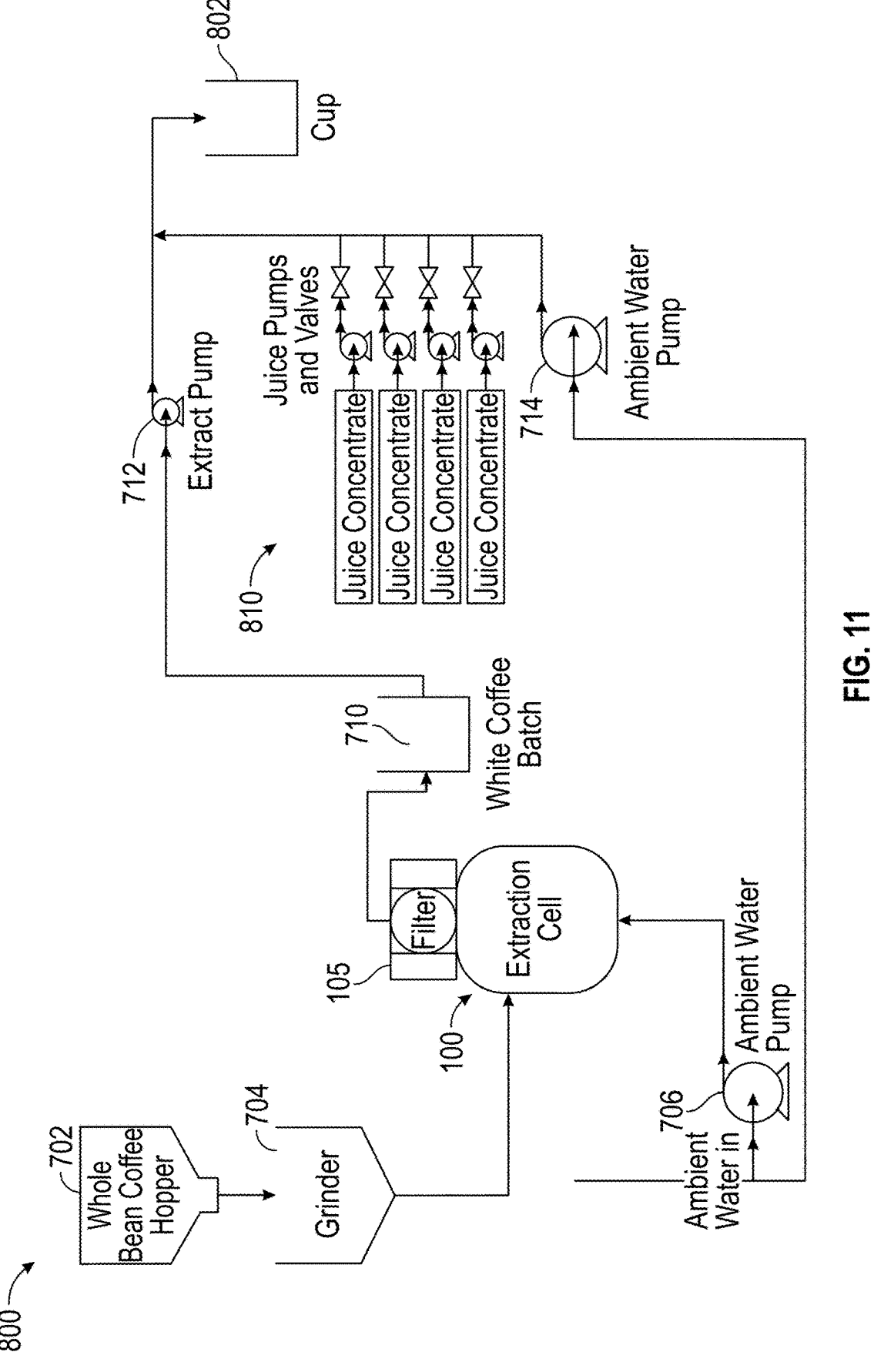
FIG. 11 is a schematic system of an extraction cell system for white coffee with juice infusion.

FIG. 11 is a schematic system of an extraction cell system 800 for white coffee with juice infusion. The extraction cell system 800 for white coffee with juice infusion can include similar or identical components to the extraction cell system 700 for white coffee with nitrogen infusion. Components of the extraction cell system 800 in FIG. 11 have been given the same references numbers to the extraction cell system 700 in FIG. 10 described above. For example, the extraction cell system 800 can include a whole bean white coffee hopper 702, a grinder 704, a first water pump 706, an extraction cell 100 with a filter 105, a reservoir 710, an extract pump 712, and a second water pump 714. The extraction cell system 800 can operate similarly with these components as the extraction ell system 700. However, as shown in FIG. 11, the use of chillers is not required, such that the resultant white coffee extract or concentrate can be produced at room temperatures. In some embodiments, chillers may be optionally incorporated in various parts of the system. For example, a chiller can be used between the extraction cell 100 and the reservoir 710 or before the diluted white coffee extract is infused with juice.

The white coffee extract or concentrate can then be dispensed from the reservoir 710 to outside of the reservoir 710 through an extract pump 712. The white coffee concentrate or extract can then be further diluted by a second flow of water through a second water pump 714. The second flow of water, such as ambient water, can come from the same source of extraction medium as the first water pump 706 or another source (not shown). The white coffee extract or concentrate can then be processed through a juice infusion system 810. The juice infusion system 810 can include one or more juice or juice concentrates, teas, or other liquids. The juice infusion system 810 can include pump and valves to dispense liquids such as juice, juice concentrate, or tea. As shown, the juice, juice concentrate or tea can be diluted with a second flow of water through the second water pump 714. The white coffee extract or concentrate can be thus infused with a juice. The infusion with juice can occur inline before being dispensed into a cup 802 or the infusion can occur in the cup 802.

The volume of the extraction cell 100 in either of these extraction cell systems 700, 800 for white coffee may range from 30 ml to 150 ml, such as between 40 ml to 120 ml and in certain embodiments a volume of 80 ml. In certain configurations, the interior aspect ratio AR may range from 0.5:1 to 1:1 or any value between these ranges and in certain embodiments the interior aspect ratio is 0.75:1. In certain configurations, the filter 105 of the extraction cell 100 may have a mean aperture diameter ranging from 75 to 200 μm, such as between 80 to 175 μm or between 90 to 150 μm. The flow rate through the extraction cell 100 may range from 20 ml/min to 100 ml/min, such as between 50 ml/min to 90 ml/min and in certain embodiments a flow rate of 70 ml/min. The extraction medium may be configured to flow through the available volume of the extraction cell 100 over a period ranging from 30 seconds to 75 seconds, such as between 40 seconds and 60 seconds and in certain embodiments a period of 50 seconds. In some configurations, the yield may range from 6% to 15% and in certain embodiments a yield from 8% to 12% or a yield of 10%.

During the extraction process embodiments described herein, a portion of the extraction medium can flow continuously or substantially continuously through the extraction cell during the extraction process. During the extraction process embodiments described above, there can be a constant or substantially constant flow rate of a portion of the extraction medium into the extraction cell during an extraction process. During the extraction process embodiments described above, there can be a constant or substantially constant flow velocity maintained across the radial axis of the chamber of the extraction cell during an extraction process and as the extraction medium is being removed from the extraction cell.

As previously described, the extraction material, which can be white coffee grounds, can be loaded into the interior of the extraction cell 100. In certain embodiments, the extraction material is loaded until the density of the extraction material of the ground white coffee in the extraction cell 100 is between 0.2 g/ml-0.4 g/ml. In certain embodiments, the extraction material is ground white coffee and is loaded until the density of the extraction material in the extraction cell 100 is between 0.3 g/ml-0.35 g/ml and in certain embodiments a density of 0.34 g/ml. In certain embodiments, between 15 to 30 grams of white coffee extraction material loaded into the extraction cell 100, and in certain embodiments 20 to 22 grams and in certain embodiments 21 grams of material are loaded into the extraction cell 100. In certain embodiments, white coffee extraction material in the form of ground white coffee that has been ground to a particle size between 600 μm and 1000 μm, such as between 700 μm to 900 μm, is loaded into the extraction cell 100. In such embodiments, this amount of extraction material can yield an extract output between 30 g to 40 g, and in certain embodiments between 33 g to 37 g. The white coffee extract or concentrate can have a concentration between 5 Brix to 9 Brix, and in some embodiments between 5.5 Brix to 8.5 Brix and in certain embodiments between 5.7 Brix to 8.3 Brix. The white coffee extract or concentrate can have a TDS between 4% to 8% and in some embodiments between 5% to 7%. The white coffee extract or concentrate can have a TDS between 40 g/L to 80 g/L and in some embodiments between 50 g/L to 70 g/L.

Cold Extracts

Preparing an edible extract can be a time consuming process. The process of extraction includes pulling desirable compounds contained within a material of interest into an extraction medium. Extracts can be characterized by the concentration of dissolved compounds within the extraction medium, often measured as TDS (total dissolved solids). However, depending on the solubility of the desirable compounds, the process of extraction can often take hours or even days. As such, traditional methods employ high temperatures to increase the rate of extraction and reduce the time required to prepare a brewed beverage. However, high temperatures can increase the rate at which undesirable components are extracted from the plant material, which can impart off flavors, or other undesirable characteristics.

Although extractions may be performed at lower temperatures, however, such efforts often result in weak, watery extracts lacking the flavor and aroma of brews that are prepared in accordance with traditional methods due to the abundant presence of water without dissolved extraction material and the lower TDS content and can also require large amount of extraction material resulting in poor yields. TDS is a measure of organic and inorganic substance in a solvent. For example, the TDS can be a measure of coffee compounds that have been extracted by water into the beverage. The TDS can be a measure of concentration of the beverage produced. TDS can be expressed as a percentage or as grams per liter (g/L). When expressed as a percentage, TDS represents the mass of all the solids dissolved in the solution divided by the mass of the solution. When expressed as grams per liter (g/L), TDS represents the mass (in grams) of solids dissolved in a liter of solution. By way of example, traditional hot espressos prepared at high temperatures and pressures exhibit a TDS content of 50-70 g/L, in contrast with cold brew preparations having a TDS content of 200 g/L to 400 g/L. By way of example, traditional hot espressos prepared at high temperatures and pressures exhibit a TDS content of 8-11%. In contrast, cold brew preparations may have a TDS content of 3%-4%, and in certain embodiments 3.2% to 3.6%. Cold brew preparations can have a TDS further diluted down to between 1% to 2%, and in certain embodiments 1.7%.

Subjecting the material to multiple rounds of extraction in an attempt to increase TDS content or yields can be similarly ineffective or lead to undesirable results. Yield is generally related to TDS according to Equation 1.

$$\% \ Yield = \frac{TDS * Extract \ Volume}{Extraction \ Material \ Mass} \times 100 \qquad \text{Equation 1}$$

Given the above relationship, manufacturers may attempt to increase their yield by repeatedly extracting the same mass of coffee or espresso beans, increasing the total extract volume without increasing the mass of extracted material. Thus, the total yield is artificially inflated.

Conversely, the extract produced according to certain embodiments described can exhibits a high TDS content and high yield, without relying on high temperatures and extreme pressures which are prone to over extracting undesirable compounds. Specifically, the cold extraction preparations described herein are surprisingly concentrated, exhibiting high TDS content without sacrificing overall yield. Moreover, the high TDS content of the cold extracts prepared in accordance with this disclosure do not sacrifice yield, and do not require high temperatures or multiple rounds of extraction which can result in off-flavors and undesirable characteristic.

By way of example, the upward flow process described herein allows the flow of extraction medium to remain in substantially complete contact with the extraction material. As such, extraction proceeds efficiently, with little room for residual extraction material to remain dry or unspent. Thus, the resultant extract includes more dissolved solids. The absence of dry extraction material results in a stronger, bolder flavor when compared to traditional cold preparations. Importantly, due to the limited amount of dry extraction material producing the extract, and due to the more intense coffee flavor, high concentration cold extracted espressos, coffees and teas may be prepared through the upward filtration cold extraction process described herein. Moreover, due to the upward flow filtration and plug flow displacement process, high concentrations can be achieved without sacrificing overall yield. Surprisingly, due to the high TDS content of the cold extracts, the extracts described herein may be added to a wide variety of beverages. For instance, in certain configurations, the techniques and methods described herein may be used to prepare a beverage which may be consumed by itself, or in conjunction with additional beverage components such as milk, non-dairy and/or plant based additives, water, or juices to prepare cold brew Americanos, mochas, lattes, macchiatos, cappuccinos, or the like including Frappuccinos.

The techniques and methods described herein may be used to prepare a smaller volume of cold extract. For instance, in some implementations the extraction material is ground roasted coffee or espresso with a mean diameter 250 µm to 500 µm. Utilizing an extraction cell 100, 200, 500 and methods according to embodiments described above, in single pass through the extraction material during a cold extraction process can exhibit yields ranging from 10% to 20%. In some configurations, the yield may range from 16% to 18% and in certain embodiments a yield of 17.4%. In some configurations, the yield may range from 13% to 17% and in certain embodiments a yield of 15%. In still further embodiments, the extracts prepared can be prepared with the use of an extraction medium) not exceeding 100° C., and in certain configurations, the extraction medium may be between 0° C. and 100° C. and in certain configurations, the extraction medium may be between 10° C. and 30° C. and in certain embodiments between 20° C. to 30° C. In the aforementioned configurations, the extraction process can be conducted at pressures between 0 and 16 bar(g) and in certain configurations the pressure can between 0.5 and 2.5 bar(g) or between 0 to 2 bar(g). In some implementations, the coffee or espresso used to produce the extract is maintained at a temperature less than 50° C. after roasting, until the extract is displaced from the extraction cell. In still further embodiments, the extract medium used to produce the extract is maintained at a pressure between 0-16 bar(g) after the extraction material is introduced into the extraction cell, until the extract is displaced from the extraction cell. In the above configurations the extraction material can be exposed to the extraction medium for a period of less than 75 seconds and in certain embodiments less than 60 seconds or 30 seconds and in certain embodiments between 15 and 75 seconds and in certain embodiments between 15 and 60 seconds. In certain embodiment the extraction medium continuously flows through the extraction cell without being inhibited by an exit valve. In some configurations, the extraction material can be exposed to the extraction medium for a period of less than 3 minutes and in certain embodiments less than 2.5 minutes and in certain embodiments less than 2 minutes. In certain embodiment the extraction medium continuously flows through the extraction cell without being inhibited by an exit valve. These ranges of measurements are particularly advantageous for the extraction cell 100 for smaller volumes or for capsule extraction cell 500 for smaller volumes, such as for single use coffee maker.

The techniques and methods described herein may be used to prepare a larger volume of cold extract. For instance, in some implementations the extraction material is ground roasted coffee or espresso with a mean diameter 250 µm to 500 µm. Utilizing an extraction cell 100, 200 and method according to embodiments described above, in single pass through the extraction material during a cold extraction process can exhibit yields ranging from 15% to 22%. In some configurations, the yield may range from 16% to 20% and in certain embodiments a yield ranging from 18% to 19%. In still further embodiments, the extracts prepared can be prepared with the use of an extraction medium) not exceeding 100° C., and in certain configurations, the extraction medium may be between 0° C. and 100° C. and in certain configurations, the extraction medium may be between 10° C. and 30° C. and in certain embodiments between 19° C. to 22° C. In the aforementioned configurations, the extraction process can be conducted at pressures between 0 and 16 bar(g) and in certain configurations the pressure can between 0.5 and 2.5 bar(g). In some implementations, the coffee or espresso used to produce the extract is maintained at a temperature less than 50° C. after roasting, until the extract is displaced from the extraction cell. In still further embodiments, the extract medium used to produce the extract is maintained at a pressure between 0-16 bar(g) after the extraction material is introduced into the extraction cell, until the extract is displaced from the extraction cell. In the above configurations the extraction material can be exposed to the extraction medium for a period 4 minutes to 30 minutes; in certain embodiments, between 4 minutes to 15 minutes or between 20 minutes to 30 minutes, and in certain embodiments less than 30 minutes or less than 20 minutes. In certain embodiment the extraction medium continuously flows through the extraction cell without being inhibited by an exit valve. These ranges of measurements are particularly advantageous for the extraction cell 100 for larger volumes.

The cold extracts prepared in accordance with this disclosure may exhibit less acidity for a sweeter, smoother flavor in comparison to traditional hot extractions. As such, these extracts are suitable for mixing in a wide variety of beverage bases. For instance, in certain configurations, cold extracts prepared in accordance with this disclosure may be consumed alone, or mixed with additional beverages or ingredients such as milk, citrus, teas, and sparkling sodas. In additional configurations, the cold extract may be isolated and further processed or stored. For example, in some configurations, the cold extract may be delivered into a barrel for aging or storage. In certain configurations, whiskey barrels made from oak, or other suitable woods may be used for storage and aging.

During the extraction process embodiments described above, a portion of the extraction medium can flow continuously or substantially continuously through the extraction cell during the extraction process. During the extraction process embodiments described above, there can be a constant or substantially constant flow rate of a portion of the extraction medium into the extraction cell during an extraction process. During the extraction process embodiments described above, there can be a constant or substantially constant flow velocity maintained across the radial axis of the chamber of the extraction cell during an extraction process and as the extraction medium is being removed from the extraction cell.

In certain embodiments, the embodiments of the extraction cell 100, 200, 500 described above can be used to create cold extracts according to the embodiments described above can be used to create a cold brewed coffee extract with a final product concentration of between 7 and 11 Brix and in certain embodiments 9 Brix. In some examples, the cold extract created can have a product concentration of between 3 to 7 Brix or between 6.5 to 10 Brix. The concentration can be further diluted to a concentration of between 1 and 2 Brix, and in certain embodiments 1.5 Brix. Brix can be measured using a refractometer (RFM340+). Correlation factor is TDS=0.85(Bx). An extract with such properties can be formed utilizing an extraction cell 100, 200, 500 and methods according to embodiments described above.

In certain embodiments, such as for smaller volumes with extraction cells 100, 200 or smaller volumes produced with capsule extraction cell 500, the extract is formed in single pass through the extraction material during a cold extraction process can exhibition yields ranging from 10% to 20%. In some configurations, the yield may range from 16% to 18% and in certain embodiments a yield of 17.4%. In some configurations, the yield may range from 13% to 17% and in certain embodiments a yield of 15%. In still further embodiments, the extracts prepared can be prepared with the use of an extraction medium) not exceeding 100° C., and in certain configurations, the extraction medium may be between 0° C. and 100° C. and in certain configurations, the extraction medium may be between 10° C. and 30° C. and in certain embodiments between 20° C. to 30° C.

In certain embodiments, such as for larger volumes, the extract is formed in single pass through the extraction material during a cold extraction process can exhibition yields ranging from 15% to 22%. In some configurations, the yield may range from 16% to 20% and in certain embodiments a yield ranging from 18% to 19%. In still further embodiments, the extracts prepared can be prepared with the use of an extraction medium) not exceeding 100° C., and in certain configurations, the extraction medium may be between 0° C. and 100° C. and in certain configurations, the extraction medium may be between 10° C. and 30° C. and in certain embodiments between 19° C. to 22° C.

In certain embodiments, the embodiments of the extraction cell 200 described above can be used to create cold extracts according to the embodiments described above. In addition, in certain embodiments, the embodiments of the extraction cell 200 and the methods described with respect to FIGS. 7A-7E can be used in combination to create the extracts described above.

In certain embodiments, the embodiments of the capsule extraction cell 500 described above can be used to create cold extracts according to the embodiments described above. In addition, in certain embodiments, the embodiments of the capsule extraction cell 500 and the methods described with respect to FIG. 9 can be used in combination to create the extracts described above.

Certain Terminology

As used herein, the term "beverage" has its ordinary and customary meaning, and includes, among other things, any edible liquid or substantially liquid substance or product having a flowing quality (e.g., juices, coffee beverages, teas, milk, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. Numbers preceded by a term such as "about" or "approximately" include the recited numbers and should be interpreted based on the circumstances (e.g., as accurate as reasonably possible under the circumstances, for example. For example, "about 1 gram" includes "1 gram." In the embodiments described in this application, terms such as "about" or "approximately" within the specification or claims that precede values or ranges can be omitted such that this application specifically includes embodiments of the recited values or ranges with the terms "about" or "approximately" omitted from such values and ranges such that they can also be claimed without the terms "about" or "approximately" before the disclosed range. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

The following example embodiments identify some possible permutations of combinations of features disclosed herein, although other permutations of combinations of features are also possible.

Summary

Although this disclosure describes certain embodiments and examples of beverage systems and methods, many aspects of the above-described systems and methods may be combined differently and/or modified to form still further embodiments or acceptable examples. All such modifications and variations are intended to be included herein within the scope of this disclosure.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage dispensing systems and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A method of preparing a white coffee extract, the method comprising:

loading an extraction material into an extraction cell having a first portion and a second portion, wherein the extraction material comprises ground coffee with a density between 0.2 g/ml-0.4 g/ml and a mean particle diameter between 700 μm to 900 μm;

introducing a flow of extraction medium through the first portion of the extraction cell;

within less than 60 seconds of introducing a portion of the flow of extraction medium into the extraction cell, withdrawing from a filter at the second portion of the extraction cell, the white coffee extract that has been extracted from the extraction material by the portion of the flow of extraction medium introduced into the extraction cell, wherein the extraction material comprises ground white coffee;

flowing the white coffee extract from the extraction cell to a first chiller without diluting the white coffee extract;

chilling the white coffee extract with the first chiller;

flowing the chilled white coffee extract from the first chiller and into a reservoir;

flowing the chilled white coffee extract out of the reservoir with an extract pump;

diluting the chilled white coffee extract; and chilling the diluted and chilled white coffee extract with a second chiller prior to dispensing for consumption.

2. The method of claim 1, wherein a yield of the white coffee extract is between 8% and 12%.

3. The method of claim 1, wherein the white coffee extract has a concentration between 5.5 and 8.5 Brix.

4. The method of claim 1, wherein the extraction medium is not heated before being introduced into the extraction cell.

5. The method of claim 1, wherein the extraction medium is water having a temperature between 10° C. and 30° C.

6. The method of claim 1, wherein the white coffee extract that has been extracted from the extraction material by the portion of the flow of extraction medium introduced into the extraction cell is retrieved between 40 and 60 seconds after introduction of the portion of the flow of extraction medium is introduced into the extraction cell.

7. The method of claim 1, wherein introducing the extraction medium through the first portion of the extraction cell comprises introducing the extraction medium at a flow rate that achieves plug flow.

8. The method of claim 1, wherein the extraction material has not been subjected to prior extractions.

9. The method of claim 1, wherein an internal chamber of the extraction cell has a length and an average width along the length, and wherein a ratio of the length to the average width of the extraction cell is between 0.5:1 and 1:1.

10. The method of claim 1, wherein loading the extraction material into the extraction cell comprises loading between 15 to 30 grams of ground white coffee into the extraction cell.

11. The method of claim 1, wherein the density of the extraction material is between 0.3 g/ml to 0.35 g/ml.

12. The method of claim 1, wherein introducing the flow of extraction medium through the first portion of the extraction cell comprises introducing the extraction medium at a flow rate of between 50 ml/min to 90 ml/min.

13. The method of claim 1, wherein the first portion is a bottom portion of the extraction cell and the second portion is a top portion of the extraction cell.

14. The method of claim 1, wherein the extraction medium flows upwardly through the extraction cell from the first portion to the second portion.

15. The method of claim 1, wherein the filter at the second portion has a mean aperture diameter of 80 μm to 175 μm.

16. The method of claim 1, further comprising starting a grinder before loading whole bean white coffee to the grinder to produce the ground white coffee.

17. The method of claim 1, comprising, after chilling the diluted and chilled white coffee extract with the second chiller but before dispensing for consumption, infusing the diluted and chilled white coffee extract with nitrogen.

18. A method of preparing an extract, the method comprising:

loading an extraction material into an extraction cell having a first portion and a second portion, wherein the extraction material comprises ground coffee with a density between 0.2 g/ml-0.4 g/ml and a mean particle diameter between 700 μm to 900 μm;

introducing a flow of extraction medium through the first portion of the extraction cell;

within less than 60 seconds of introducing a portion of the flow of extraction medium into the extraction cell, withdrawing from a filter at the second portion of the extraction cell, the extract that has been extracted from the extraction material by the portion of the flow of extraction medium introduced into the extraction cell;

flowing the extract from the extraction cell to a first chiller without diluting the extract;

chilling the extract with the first chiller;

flowing the chilled extract from the first chiller and into a reservoir;

flowing the chilled extract out of the reservoir with an extract pump;

diluting the chilled extract; and chilling the diluted and chilled extract with a second chiller prior to dispensing for consumption.

19. The method of claim 18, comprising, after chilling the diluted and chilled extract with the second chiller but before dispensing for consumption, infusing the diluted and chilled extract with nitrogen.

* * * * *